(12) United States Patent
Hayashi

(10) Patent No.: US 7,881,591 B2
(45) Date of Patent: Feb. 1, 2011

(54) INFORMATION RECORDING/REPRODUCING APPARATUS

(75) Inventor: Chikashi Hayashi, Takatsuki (JP)

(73) Assignee: Panasonic Corporation, Osaka (JP)

(*) Notice: Subject to any disclaimer, the term of this patent is extended or adjusted under 35 U.S.C. 154(b) by 1389 days.

(21) Appl. No.: 11/353,239

(22) Filed: Feb. 14, 2006

(65) Prior Publication Data
US 2006/0188218 A1   Aug. 24, 2006

(30) Foreign Application Priority Data
Feb. 14, 2005   (JP)   ............... 2005-035922

(51) Int. Cl.
H04N 5/783   (2006.01)
H04N 5/93    (2006.01)
G11B 27/00   (2006.01)

(52) U.S. Cl. ............... 386/343; 386/351; 386/278; 386/290

(58) Field of Classification Search ............. 386/52–55, 386/68–82, 124–126
See application file for complete search history.

(56) References Cited

U.S. PATENT DOCUMENTS

| 6,018,435 | A  |    | 1/2000  | Uno et al.          |        |
|-----------|----|----|---------|---------------------|--------|
| 7,272,295 | B1 | *  | 9/2007  | Christopher ........ | 386/46 |
| 7,346,264 | B2 | *  | 3/2008  | Jun et al. .......... | 386/68 |
| 7,457,513 | B2 | *  | 11/2008 | Fujita et al. ....... | 386/46 |
| 7,512,313 | B2 | *  | 3/2009  | Dunton .............. | 386/52 |
| 2002/0037152 | A1 | * | 3/2002 | Kato et al. ......... | 386/46 |
| 2003/0014768 | A1 |   | 1/2003 | Ishihara et al.     |        |
| 2003/0093790 | A1 | * | 5/2003 | Logan et al. ....... | 725/38 |
| 2003/0210887 | A1 |   | 11/2003 | Engle et al.        |        |
| 2004/0109671 | A1 |   | 6/2004 | Kuno et al.         |        |
| 2004/0226035 | A1 |   | 11/2004 | Hauser, Jr.         |        |

FOREIGN PATENT DOCUMENTS

| JP | 2002-223408 A |  8/2002 |
| JP | 2002-329384 A | 11/2002 |
| JP | 2003-297058   | 10/2003 |
| JP | 2003-309813   | 10/2003 |
| JP | 2003-319312 A | 11/2003 |
| JP | 2004-015485   |  1/2004 |

OTHER PUBLICATIONS

English translation of Chinese Office Action issued in Chinese Patent Application No. CN 200610007715.5 dated Sep. 11, 2009.

* cited by examiner

*Primary Examiner*—Peter-Anthony Pappas
*Assistant Examiner*—Marc Dazenski
(74) *Attorney, Agent, or Firm*—McDermott Will & Emery LLP

(57) ABSTRACT

The information recording/reproducing apparatus of the present invention comprises: a reproduction period list reader for reading out a reproduction period list from a recording medium; a specific-time skipping device that skips a reading-out position of information from the recording medium over a prescribed time; and a reproduction period list modifier that deletes a skip period from a reproduction period in a reproduction period list using a skip start point and a skip end point in the reproduction period list that is read out by the reproduction period list reader when specific-time skip is carried out by the specific-time skipping device during reproduction of the information from the recording medium.

18 Claims, 49 Drawing Sheets

F I G. 9
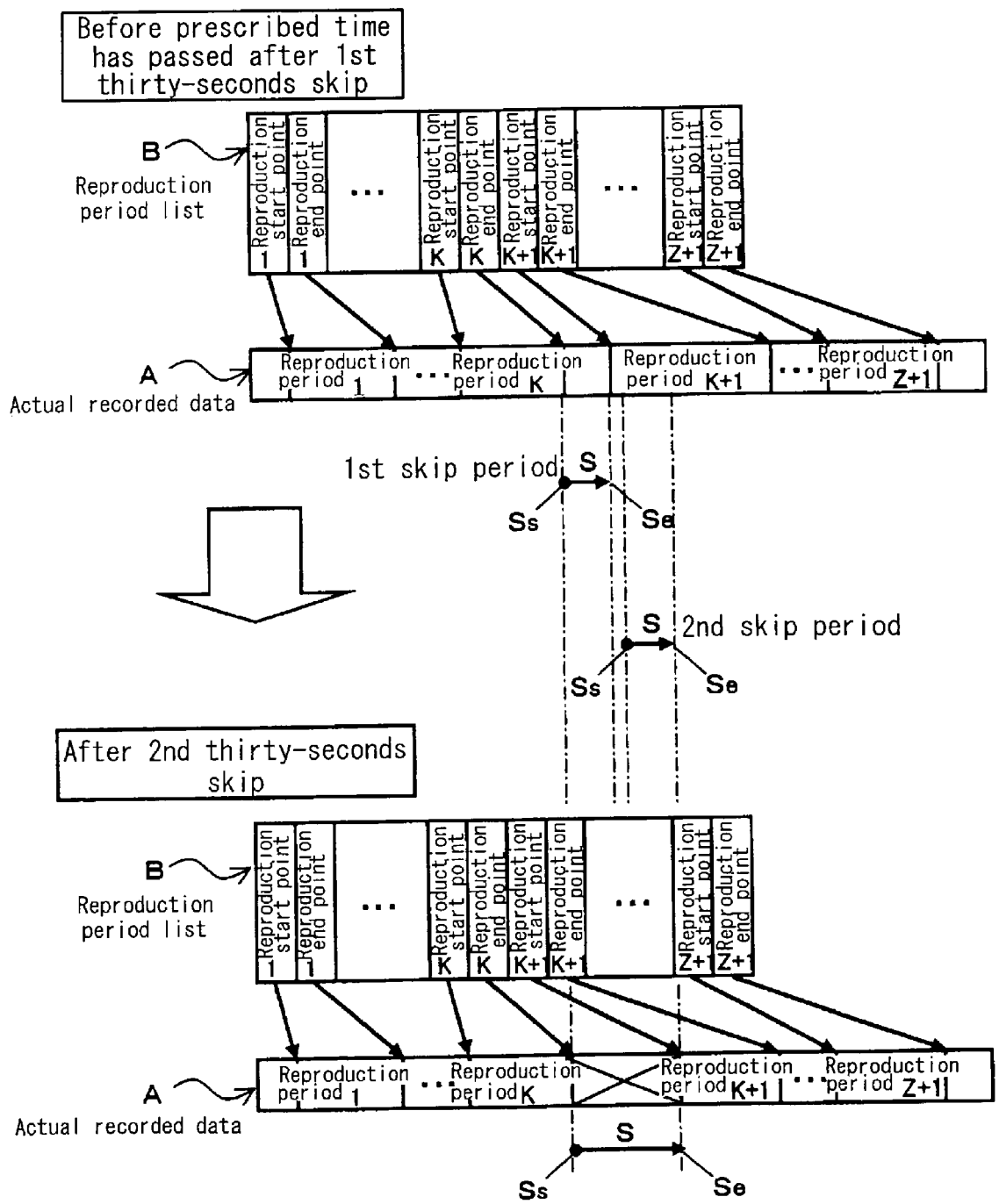

F I G. 1 5
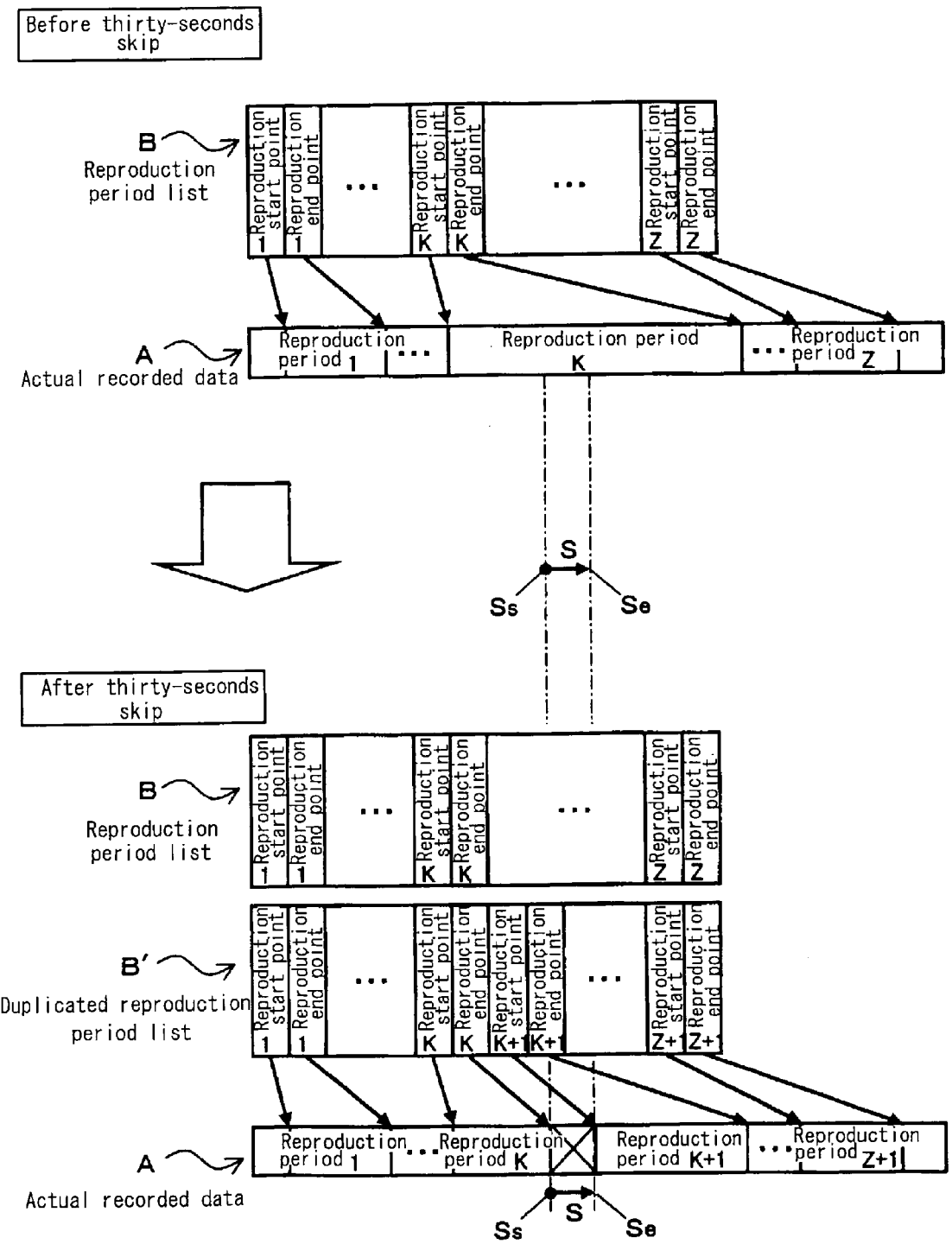

F I G. 3 5
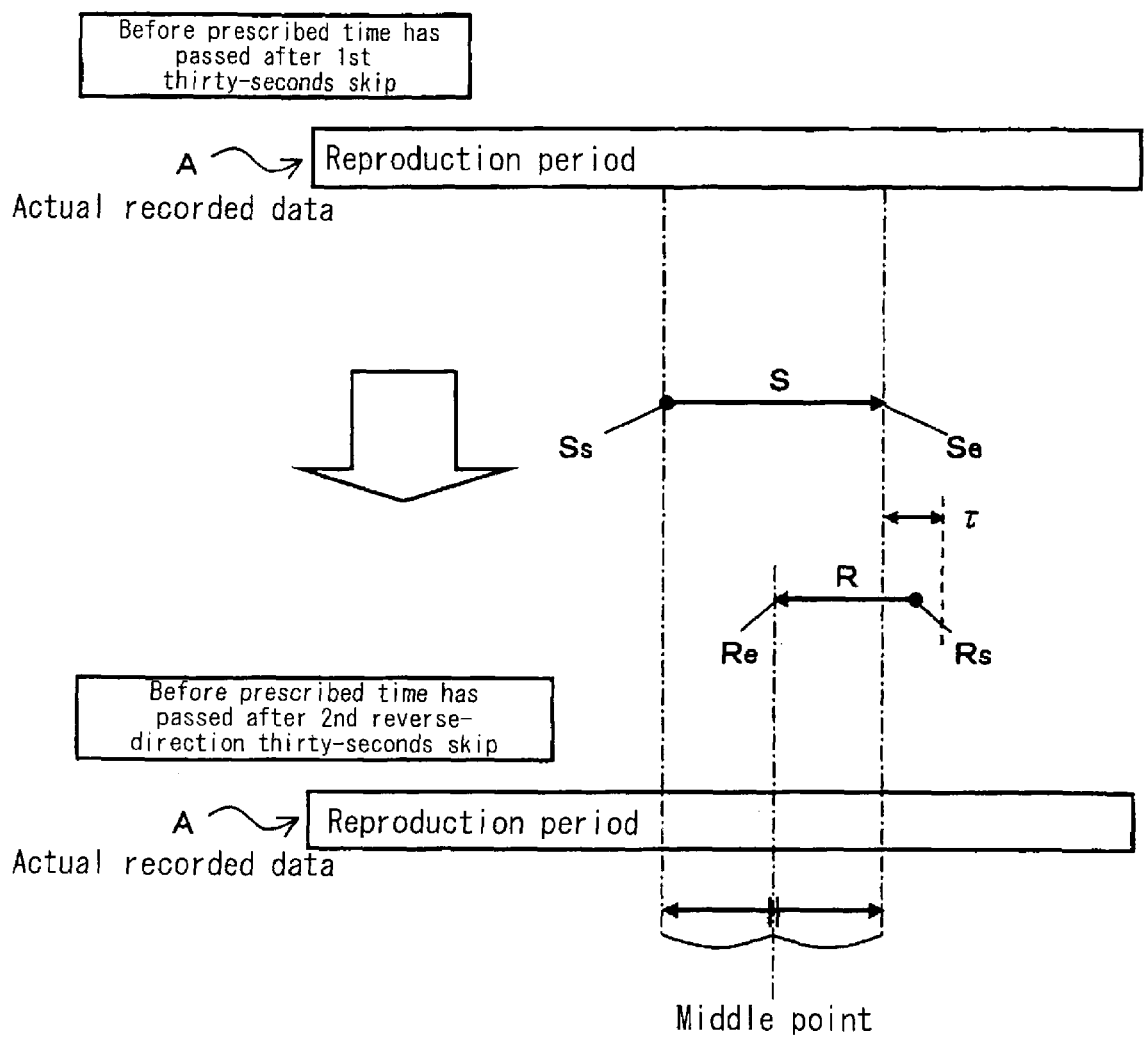

F I G. 3 7
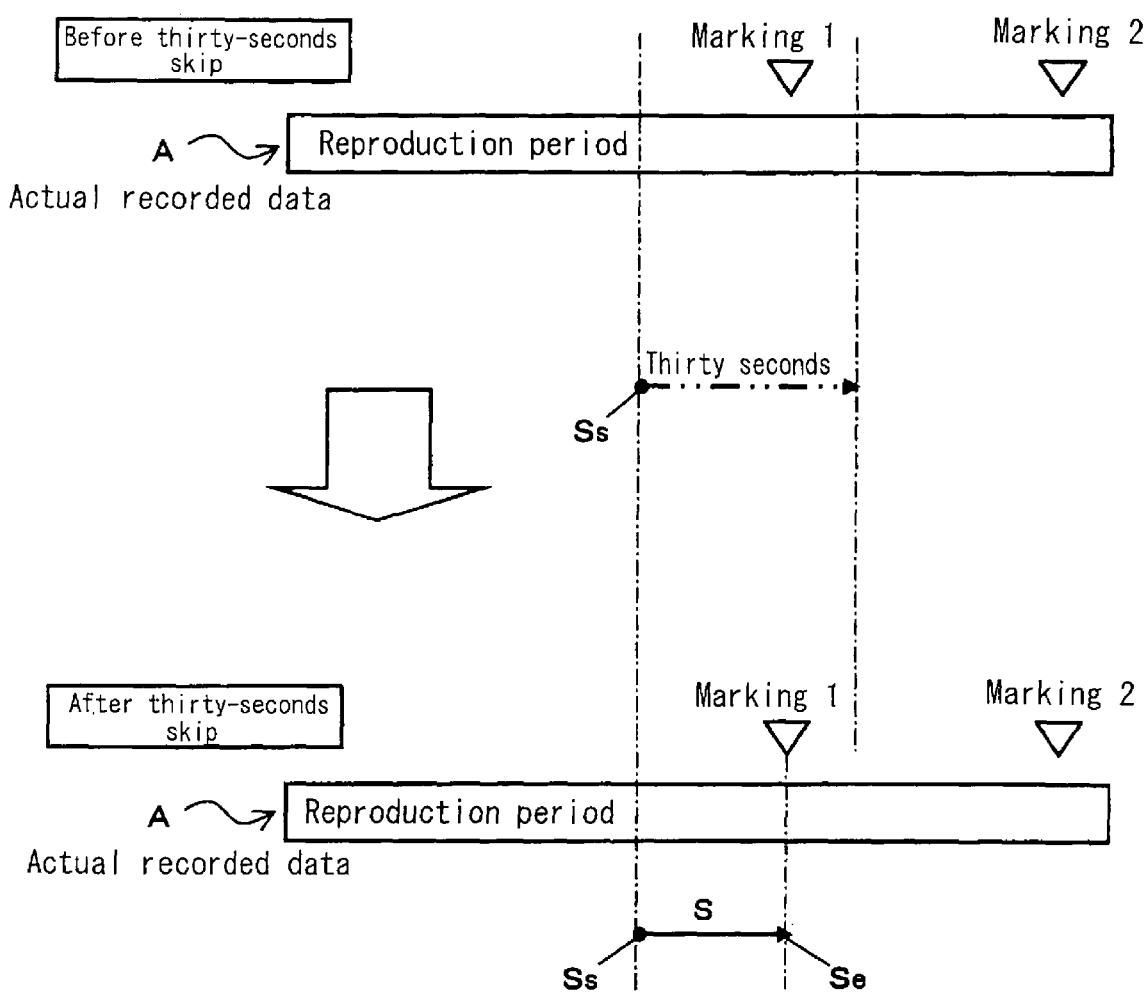

F I G. 4 0
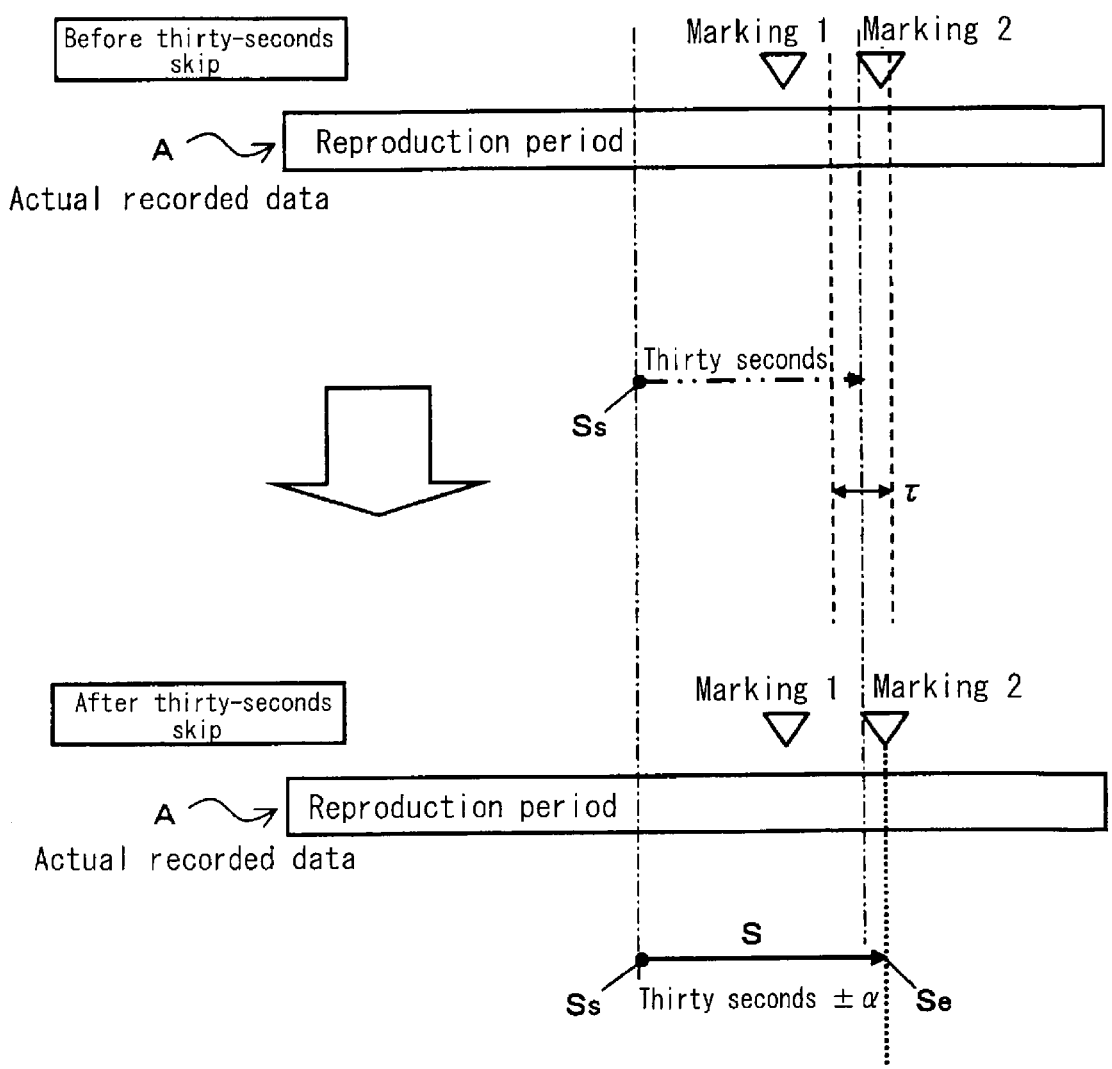

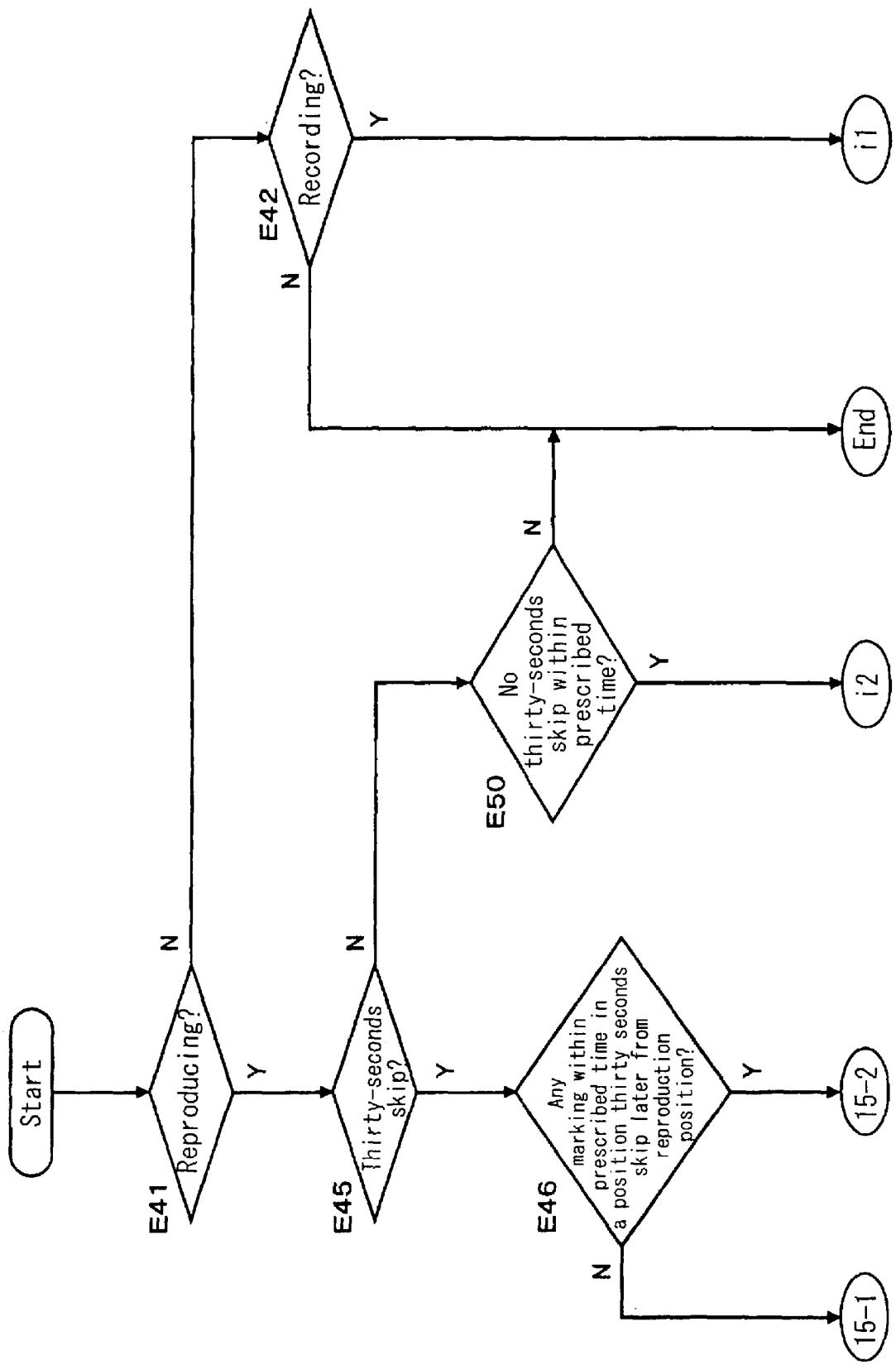

F I G. 4 3
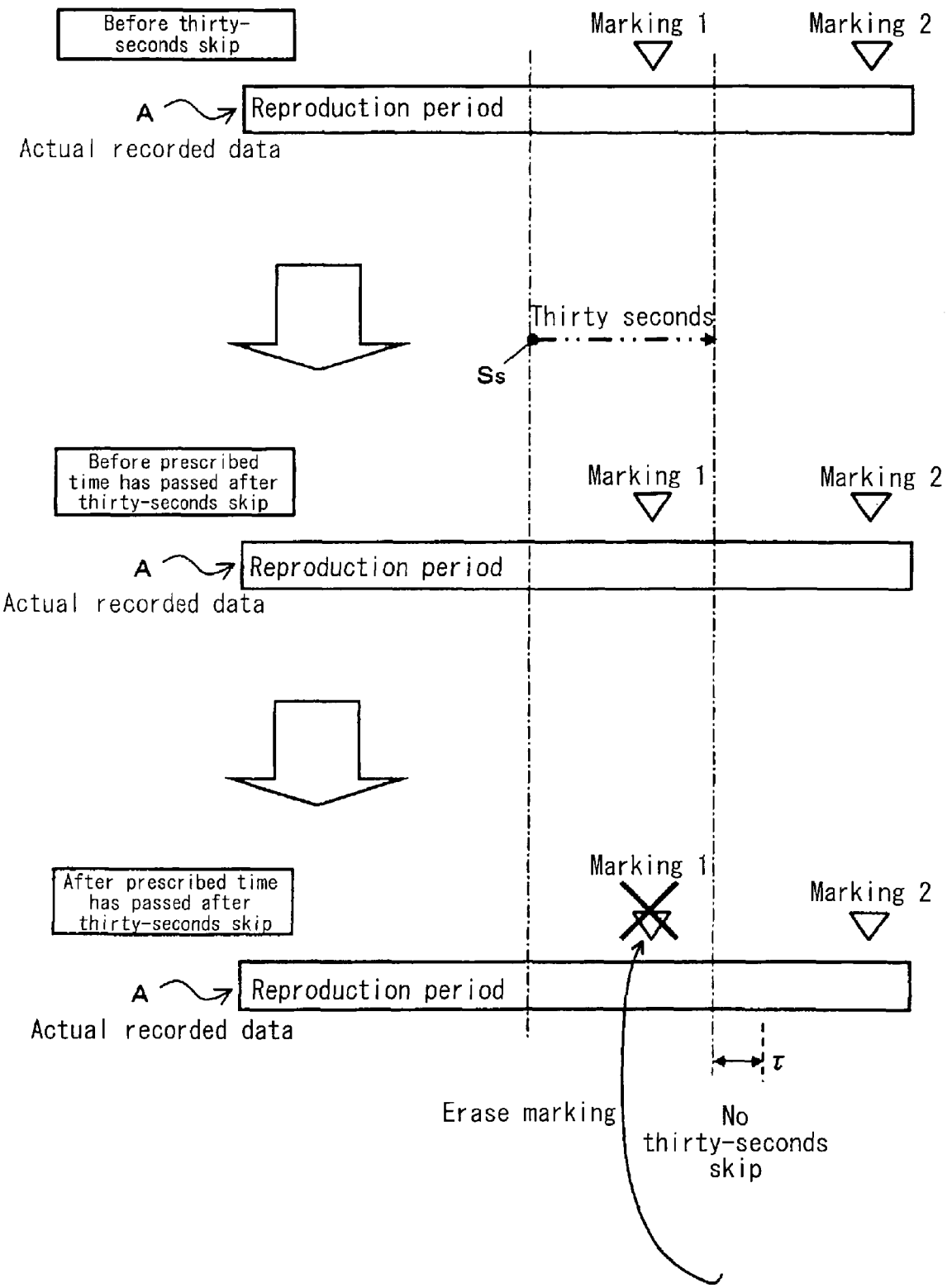

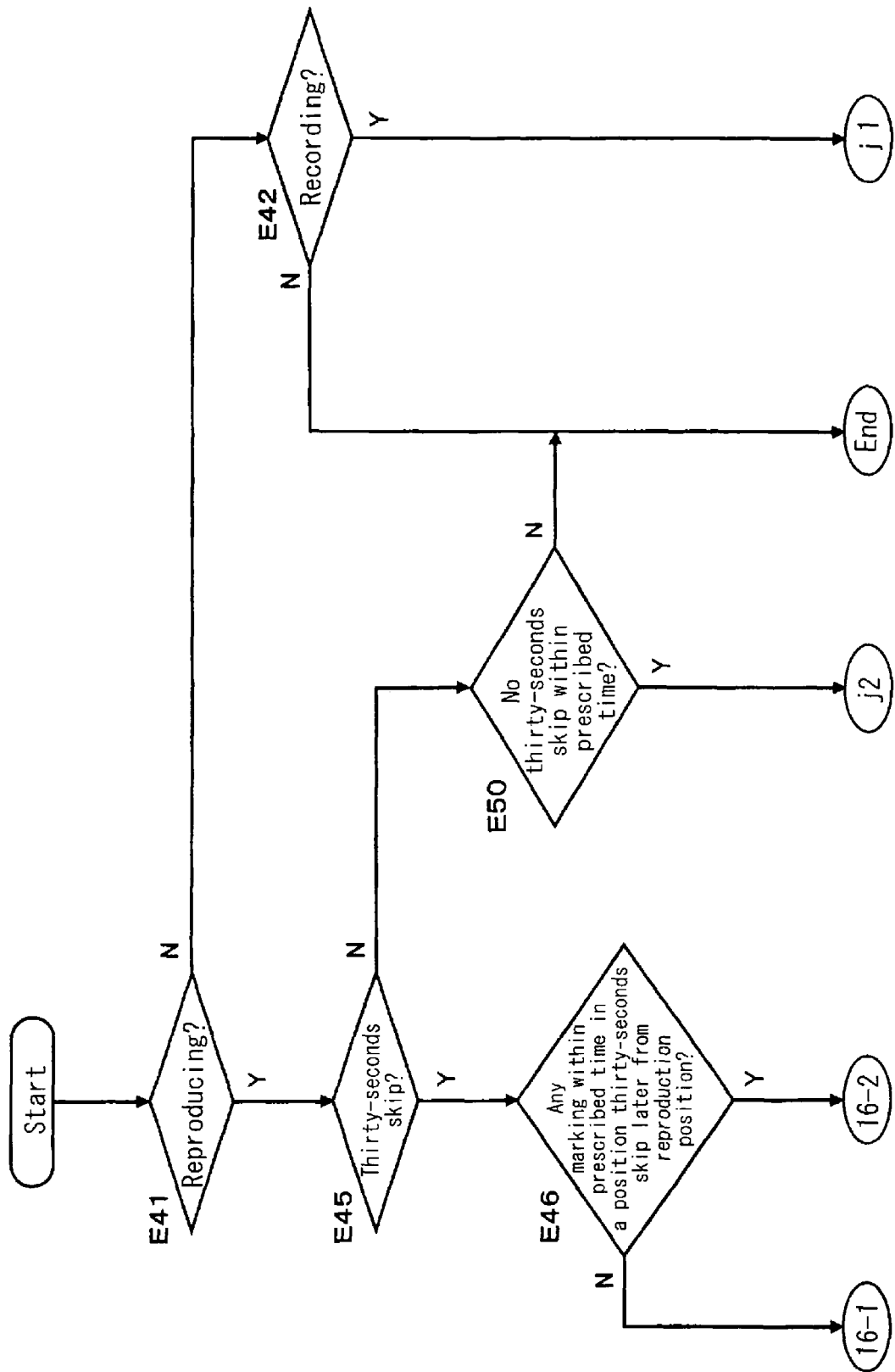

INFORMATION RECORDING/REPRODUCING APPARATUS

BACKGROUND OF THE INVENTION

1. Field of the Invention

The present invention relates to reproducing and editing techniques of a random-accessible information recording/reproducing apparatus.

2. Description of the Related Art

As disclosed in Japanese Published Patent Document (Unexamined Patent Publication 2002-223408), for example, in a conventional information recording/reproducing apparatus for recording, reproducing, and editing information such as video, audio, etc., it is possible to skip a part that is undesired to be reproduced through specific-time skip such as "thirty-seconds skip" when reproducing information. Furthermore, as disclosed in Japanese Published Patent Document (Unexamined Patent Publication 2003-319312), it is possible with a conventional information recording/reproducing apparatus to skip the same part for every reproduction by going through editing such as designating a reproduction start point/reproduction end point, deleting the recorded data, etc.

With the above-described related art, in order to skip the same part when the information is reproduced, it is necessary to go through a complicated editing work, e.g. skipping action for a specific time for every reproduction, designating a reproduction start point/reproduction end point, deleting the recorded data, etc. Moreover, it is not possible to search the exact cue of a scene a user really desires to see by simply carrying out specific-time skip.

SUMMARY OF THE INVENTION

The main object of the present invention therefore is to achieve accurate search of a scene while improving the operability when carrying out specific-time skip during reproduction of information performed by a random-accessible information recording/reproducing apparatus.

In order to overcome the aforementioned problems, the information recording/reproducing apparatus of the present invention comprises: a reproduction period list reader for reading out a reproduction period list from a recording medium; a specific-time skipping device that skips a reading-out position of information from the recording medium over a prescribed time; and a reproduction period list modifier that deletes a skip period from a reproduction period in the reproduction period list using a skip start point and a skip end point in the reproduction period list that is read out by the reproduction period list reader when specific-time skip is carried out by the specific-time skipping device during reproduction of information from the recording medium.

In this case, the reproduction period list is automatically modified based on the information of the skip that is carried out once by a user. With this, it becomes unnecessary for the user to go through a troublesome work, i.e. to carry out specific-time skip for every reproduction, for skipping the same part when reproducing the information. Furthermore, the user can be released from a complicated editing work, e.g. designating reproduction start point and reproduction end point, deleting recorded data, etc.

When the specific-time skip is carried out during reproduction of information and the specific-time skip is carried out again within a prescribed time, the reproduction period list modifier may delete the second skip period and a period between an end point of the first specific-time skip and a start point of the second specific-time skip from the reproduction period.

In this case, the period reproduced while the user determines to perform the second skip after carrying out the first skip can also be skipped automatically thereafter when the information is reproduced.

When reverse-direction specific-time skip is carried out during reproduction of information and a reverse-direction skip period or a part thereof is not included in the reproduction period list, the reproduction period list modifier may alter the reproduction period list to include a period between an end point of the reverse-direction specific-time skip and a start point of the reverse-direction specific-time skip in the reproduction period.

For the reverse-direction skip, the end point of the reverse-direction skip is on the upper reach side than the start point thereof in terms of the forward direction, which is in a relation opposite to the case of normal skip (in normal skip, the skip end point comes on the lower reach side than the skip start point).

In this case, the period where the reverse-direction specific-time skip is carried out is the information the user originally desires to reproduce, so that the period thereof is not reflected for modifying the reproduction period list. That is, it allows the reverse-direction skip period not to be deleted from the reproduction period.

If there is already an existing reproduction period list when modifying the reproduction period list, the reproduction period list modifier may duplicate the existing reproduction period list and then modify one of the reproduction period lists.

In this case, the skip information can be reflected upon the reproduction period list while keeping the reproduction period list formed by the user. Therefore, it becomes possible to avoid accidental deletion of the reproduction period list that is formed by the user.

The information recording/reproducing apparatus of the present invention may also be in a structure, comprising: a specific-time skipping device that skips a reading-out position of information from a recording medium over a prescribed time; and a recorded information editor for deleting recorded information that corresponds to a skip period from the recording medium using a skip start point and a skip end point when specific-time skip is carried out during reproduction of information.

In this case, recorded information that corresponds to the skip period is deleted from the recording medium using the skip start point and the skip end point when the specific-time skip is carried out during reproduction of the information. Thus, by simply carrying out the specific-time skip once during the information reproduction, the part that is skipped for the specific time can be automatically skipped thereafter when the information is reproduced without performing any other special editing work. Further, it becomes possible to delete the recording source at the same time.

When the specific-time skip is carried out during reproduction of information and the specific-time skip is carried out again within a prescribed time, the recorded information editor may delete recorded information that corresponds to the second skip period and recorded information that corresponds to a period between an end point of the first specific-time skip and a start point of the second specific-time skip from the recording medium.

In this case, the period reproduced while the user determines to perform the second skip after carrying out the first skip can also be skipped automatically thereafter when the information is reproduced. In addition, the recording resource can be deleted simultaneously. This is effective for the case where the period reproduced while the user determines to carry out the second skip after performing the first skip is the information the user originally does not desire to reproduce.

The recorded information editor may manage recorded-information deletion-set-period information and, when specific-time skip is carried out during reproduction of information, register a period of the skip to the recorded-information deletion-set-period information and delete recorded information that corresponds to recorded-information deletion-set period from the recording medium after a prescribed time.

In this case, even though deletion of the skip period has been set by carrying out the specific-time skip, it is possible for the user to cancel the deletion of the recorded information that corresponds to the skip period from the recording medium as long as it is within the prescribed time.

When the specific-time skip is carried out during reproduction of information and reverse-direction specific-time skip is carried out within a prescribed time, the recorded information editor may delete, among the recorded-information deletion-set period, a period between an end point of the reverse-direction specific-time skip and a start point of the reverse-direction specific-time skip from the recorded-information deletion-set period.

In this case, even though deletion of the skip period has been set by carrying out the specific-time skip, it is possible for the user to cancel the deletion of the recorded information that corresponds to the skip period from the recording medium by carrying out the reverse-direction specific-time skip thereafter.

The recorded information editor may manages recorded-information deletion-set-period information and, when specific-time skip is carried out during reproduction of information, register a period of the skip to the recorded-information deletion-set-period information and delete recorded information that corresponds to recorded-information deletion-set period from the recording medium when there is a deletion command from a user.

In this case, it is possible for the user to collect the recorded-information deletion-set-period information based on the skip information and delete the unnecessary recorded information from the recording medium collectively. Thus, it is possible to avoid automatic deletion of the information that corresponds to the skip period from the recording medium while the user is not aware of it.

When reverse-direction specific-time skip is carried out during reproduction of information, the recorded information editor may delete, among the recorded-information deletion-set period, a period between an end point of the reverse-direction specific-time skip and a start point of the reverse-direction specific-time skip from the recorded-information deletion-set period.

In this case, even though a period is registered to be set as a target of collective deletion, it is possible by the reverse-direction specific-time skip to cancel the deletion of the part the user desires to reproduce and collectively delete other part that is unnecessary.

The information recording/reproducing apparatus of the present invention may comprise: an information recording/reproducing device for recording and reproducing information to/from a recording medium; and a specific-time skipping device that skips a reading-out position of information from the recording medium over a prescribed time, wherein when the specific-time skip is carried out during reproduction of information and the specific-time skip is carried out again within the prescribed time, the specific-time skipping device may set the second specific-time skip amount as same as first specific-time skip amount when directions of the first skip and the second skip are in the same direction, and set the second specific-time skip amount less than the first specific-time skip amount when directions of the first skip and the second skip are in reverse directions.

In this case, it is possible to perform accurate search of the part the user originally desires to reproduce by simply repeating the specific-time skip.

The information recording/reproducing apparatus of the present invention may comprise: an information recording/reproducing device for recording and reproducing information to/from a recording medium; and a specific-time skipping device that skips a reading-out position of information from the recording medium over a prescribed time, wherein when the specific-time skip is carried out during reproduction of information and the specific-time skip is carried out again within the prescribed time, the specific-time skipping device may perform specific-time skip having second specific-time skip start point as a first specific-time skip end point when directions of the first skip and the second skip are in the same direction, and skip to a specific point between the first specific-time skip start point and the first specific-time skip end point when directions of the first skip and the second skip are in reverse directions.

In this case, it becomes possible to perform more accurate search while saving the time for determining the cue of the part the user originally desires to reproduce by the second specific-time skip.

The information recording/reproducing apparatus of the present invention may comprise: a scene-change detector for detecting a scene-change point when recording video information to a recording medium; a marking device for marking the scene-change point detected by the scene-change detector; a specific-time skipping device that skips a reading-out position of information from the recording medium over a prescribed time; and a marking searcher for searching the marked point when reproducing information, wherein during specific-time skip, the specific-time skipping device may skip to a point that is specific-time later from a currently reproduced part when the marking searcher does not find a marked point closest to a point that is specific-time later from the currently reproduced part and, when the marking searcher finds the marked point closest to the point that is specific-time later from the currently reproduced part, the specific-time skipping device may skip to the marked point.

In this case, if the scene-change point detected during recording of information is marked and the specific-time skip is carried out during reproduction of the information, skip is carried out not only to the point specific-time later but also to the marked point that is closest to the point specific-time later from the currently reproduced part. Thus, it is possible to search the cue of the scene the user really desires to see.

Furthermore, the information recording/reproducing apparatus of the present invention may comprise: a scene-change detector for detecting a scene-change point when recording video information to a recording medium; a marking device for marking the scene-change point detected by the scene-change detector; a specific-time skipping device that skips a reading-out position of information from the recording medium over a prescribed specific time; and a marking searcher for searching the marked point when reproducing information.

During specific-time skip, the specific-time skipping device may skip to a point that is specific-time later from a currently reproduced part when the marking searcher does not find a marked point within a prescribed time of a point that is specific-time later from the currently reproduced part and, when the marking searcher finds a marked point within the prescribed time of the point that is specific-time later from the currently reproduced part, the specific-time skipping device may skip to the marked point that is closest to the currently reproduced part.

In this case, if the scene-change point detected during recording of information is marked and the specific-time skip is carried out during reproduction of the information, skip is carried out not only to the point specific-time later but also to a marked point that is closest to the point specific-time later from the currently reproduced part when there is the marked point within the prescribed time of the point that is specific-time later from the currently reproduced part. Thus, it is possible to prohibit skipping to the distant-time point rather than to the specific-time point when carrying out the specific-time skip. Moreover, such effect can be achieved while enabling an accurate search of the scene-change point.

It is preferable for the information recording/reproducing apparatus of the present invention to further comprise a marking eraser that erases the marking from the marked point that is in a range between skip start point and skip end point after a prescribed time when the specific-time skip is carried out during reproduction of information.

In this case, among the markings automatically applied to the scene-change points at the time of recording the information, the user can automatically erase the unnecessary marking by simply carrying out the specific-time skip.

It is preferable for the information recording/reproducing apparatus of the present invention to comprise, instead of the scene-change detector, a brilliance-difference judging device for detecting a point where a difference of video brilliance between a previous frame exceeds a prescribed value when recording information.

In this case, it is possible to perform accurate search of the point where the difference of the video brilliance between the previous frame exceeds the prescribed value when the specific-time skip is carried out.

It is preferable for the information recording/reproducing apparatus of the present invention to comprise, instead of the scene-change detector, an audio mode switching detector for detecting a change of an audio signal from/to monaural, stereo, dual sound.

In this case, it is possible to perform accurate search of the point where the audio signal switches from/to monaural, stereo, dual sound when the specific-time skip is carried out.

It is preferable for the information recording/reproducing apparatus of the present invention to comprise, instead of the scene-change detector, a silence detector for detecting a part where an audio signal is silent for a prescribed time.

In this case, it is possible to perform accurate search of the point where the audio signal is silent for the prescribed time when the specific-time skip is carried out.

With the present invention, it is possible to perform accurate search of a scene the user really desires to see while improving the operability when carrying out specific-time skip during reproduction of information performed by a random-accessible information recording/reproducing apparatus. The information recording/reproducing apparatus of the present invention comprising such structures is effective for improving the convenience of the reproducing work and editing work by the specific-time skip.

BRIEF DESCRIPTION OF THE DRAWINGS

Other objects of the present invention will become clear from the following description of the preferred embodiments and the appended claims. Those skilled in the art will appreciate that there are many other advantages of the present invention possible by embodying the present invention.

FIG. 9 is an illustration for describing an example of the action of the DVD recorder according to the second embodiment of the present invention;

FIG. 15 is an illustration for describing an example of the action of the DVD recorder according to the fourth embodiment of the present invention;

FIG. 35 is an illustration for describing an example of the action of the DVD recorder according to the twelfth embodiment of the present invention;

FIG. 37 is an illustration for describing an example of the action of the DVD recorder according to the thirteenth embodiment of the present invention;

FIG. 40 is an illustration for describing an example of the action of the DVD recorder according to the fourteenth embodiment of the present invention;

FIG. 41 is a flowchart for showing action of a DVD recorder according to a fifteenth embodiment of the present invention;

FIG. 43 is an illustration for describing an example of the action of the DVD recorder according to the fifteenth embodiment of the present invention;

FIG. 44 is a flowchart for showing action of a DVD recorder according to a sixteenth embodiment of the present invention;

DETAILED DESCRIPTION OF THE INVENTION

Figure 1:
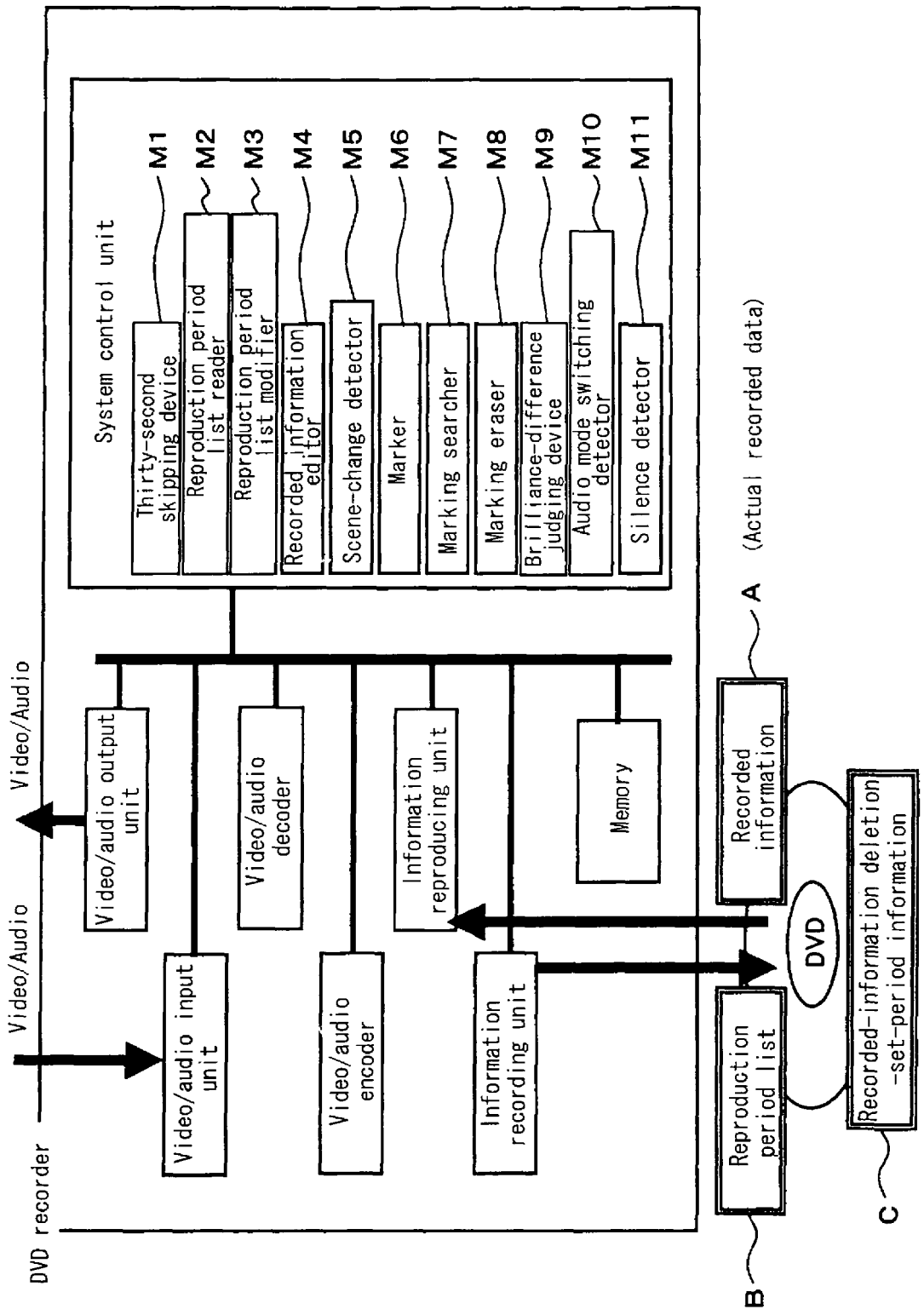
FIG. 1 is a block diagram for showing the structure of a DVD recorder as a typical example of a random-accessible information recording/reproducing apparatus according to embodiments of the present invention.

Embodiments of the information recording/reproducing apparatus according to the present invention will be described in detail hereinafter by referring to the accompanying drawings. FIG. 1 is a block diagram for showing the structure of a DVD recorder as a typical example of a random-accessible information recording/reproducing apparatus according to the embodiments of the present invention.

This DVD recorder comprises structures that can be applied separately or in common to each embodiment described below. That is, the DVD recorder comprises: a thirty-seconds skipping device M1 as an example of a specific-time skipping device that skips a reading-out position of information (video/audio) from a DVD (Digital Versatile Disc) over a prescribed specific time; a reproduction period list reader M2 for reading out a reproduction period list from the DVD; and a reproduction period list modifier M3 which modifies the reproduction period list using the skip start point and the skip end point in the reproduction period list and deletes the skip period from the reproduction period.

Further, the DVD recorder comprises: a recorded information editor M4 for deleting the recorded information that corresponds to the skip period from the DVD using the skip start point and the skip end point when the thirty-seconds skip is carried out during the reproduction of the information; a scene-change detector M5 for detecting a scene-change point when recording video; a marking device M6 for marking a specific point; a marking searcher M7 for searching a marked point; a marking eraser M8 for erasing the marking from the marked point; a brilliance-difference judging device M9 for detecting a point where a difference of the video brilliance between the previous frame exceeds a prescribed value when recording the video; an audio mode switching detector M10 for detecting a point where an audio signal switches from/to monaural, stereo, dual sound when recording the video; and a silence detector M11 for detecting a part where the audio signal is silent for a prescribed time when recording the video. Furthermore, the DVD recorder comprises an information recording unit and an information reproducing unit as the information recording/reproducing devices.

First Embodiment

Referring to FIG. 2-FIG. 5, there is described a control method of recording/reproducing actions performed in the information recording/reproducing apparatus (DVD recorder or the like) according to a first embodiment of the present invention. First, various forms of the relative positional relations between the skip start point Ss/the skip end point Se of the skip period S and the start point Ks/the end point Ke of the reproduction period K will be described by referring to FIG. 2.

Figure 2A:
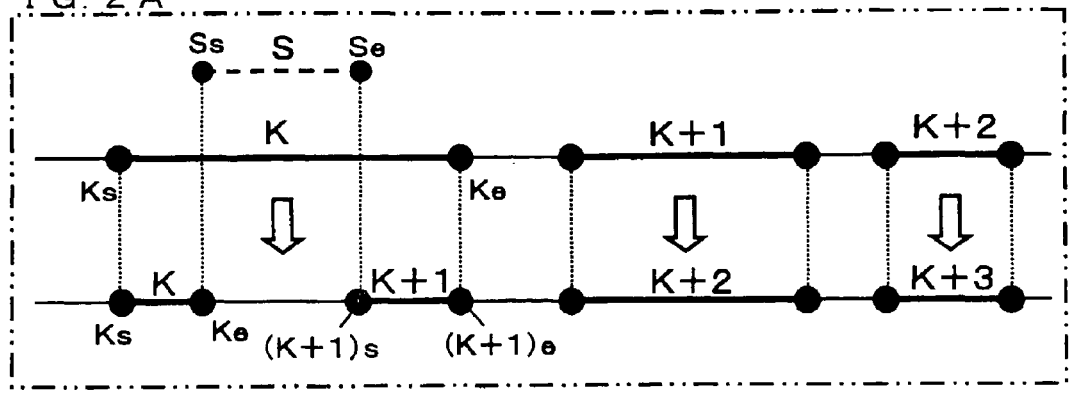
FIGS. 2A-2D are illustrations for describing various forms of relative positional relations between start points/end points of skip period and start points/end points of reproduction period according to a first embodiment of the present invention.

The form shown in FIG. 2A corresponds to the state where both the skip start point Ss and the skip end point Se are within the range of the reproduction period K. In that case, it is necessary for restricting the reproduction of the skip period S to update the old reproduction period K, i.e. to delete the part that corresponds to the skip period S in the old reproduction period K. In the new reproduction period K, the start point Ks remains as the original start point Ks but the end point Ke is altered to the skip start point Ss (see step S11 of FIG. 4). Then, the new reproduction period (K+1) is newly formed, while the start point (K+1) s is set as the skip end point Se and the end point (K+1) e of the new reproduction point (K+1) is set as the end point Ke of the old reproduction period K (steps S9-S10 of FIG. 4). Furthermore, the old reproduction period (K+1) is set down to a new reproduction period (K+2), the old reproduction period (K+2) to a new reproduction period (K+3), the old reproduction period (K+3) to a new reproduction period (K+4) so as to move down the reproduction period numbers after the old reproduction period (K+1) (step S8 of FIG. 4).

Figure 2B:
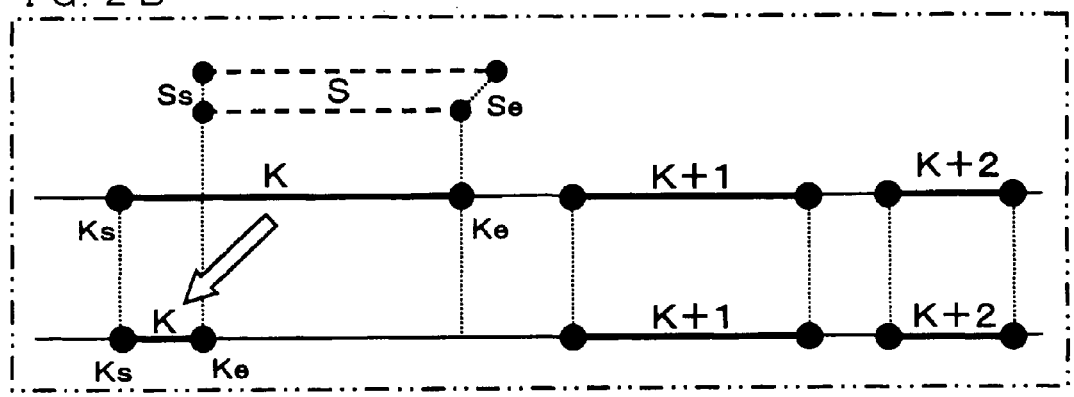

The form shown in FIG. 2B corresponds to the state where the skip start point Ss is within the range of the reproduction period K and the skip end point Se is at the end point Ke of the reproduction period K or the outside thereof. In that case, it is necessary for restricting the reproduction of the skip period S to delete the part that corresponds to the skip period S in the old reproduction period K. In the new reproduction period K, the start point Ks remains as the original start point Ks but the end point Ke is altered to the skip start point Ss (see step S12 of FIG. 4). It is unnecessary to alter the reproduction period numbers after the old reproduction period (K+1).

Figure 2C:
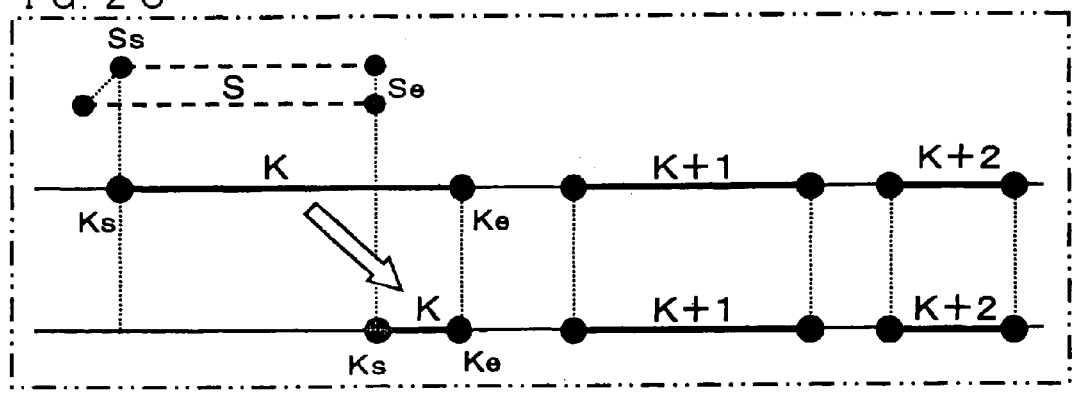

The form shown in FIG. 2C corresponds to the state where the skip end point Se is within the range of the reproduction period K and the skip start point Ss is at the start point Ks of the reproduction period K or the inside thereof. In that case, it is necessary for restricting the reproduction of the skip period S to delete the part that corresponds to the skip period S in the old reproduction period K. In the new reproduction period K, the end point Ke remains as the original end point Ke but the start point Ks thereof is altered to the skip end point Se (see step S15 of FIG. 4). It is unnecessary to alter the reproduction period numbers after the old reproduction period (K+1).

Figure 2D:
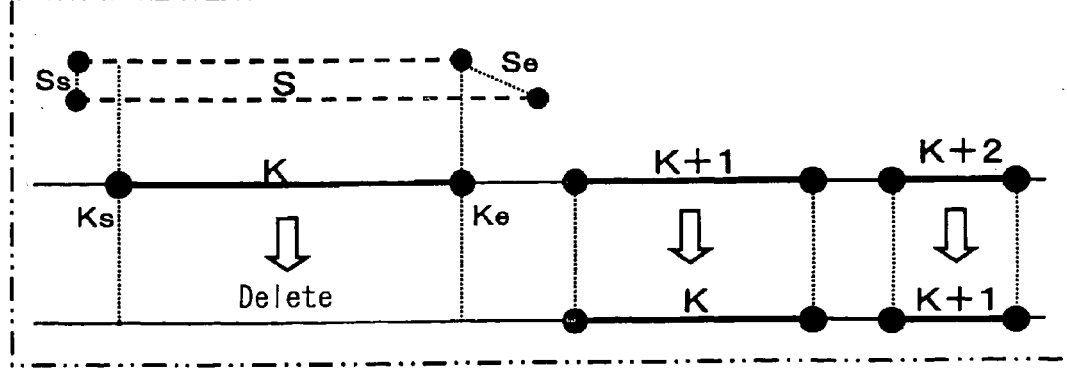

The form shown in FIG. 2D corresponds to the state where the entire region of the reproduction period K falls within the range of the skip period S. In that case, it is necessary for restricting the reproduction of the skip period S to delete the old reproduction period K entirely and form a new reproduction period K separately (see steps S16-S17 of FIG. 4). That is, the old reproduction period (K+1) is shifted to a new reproduction period K, the old reproduction period (K+2) to a new reproduction period (K+1), and the old reproduction period (K+3) to a new reproduction period (K+2). In short, the reproduction period numbers are moved up after the old reproduction period (K+1).

The form shown in FIG. 2D corresponds to the case where the skip start point Ss coincides with the start point Ks of the reproduction period K, and the skip end point Se is at the end point Ke of the reproduction period K or before that. The form of FIG. 2D also corresponds to the case where the skip start point Ss comes before the start point Ks of the reproduction period K, and the skip end point Se comes after the end point Ke of the reproduction period K or coincides with the end point Ke.

Next, action of the DVD recorder according to the embodiment, which is structured as described above, will be described by referring to the flowcharts of FIG. 3 and FIG. 4. First, when the thirty-seconds skip is carried out during the video reproduction performed by the DVD recorder (step S1), the reproduction period list B is searched for checking whether or not the entire or a part of the skip period is included therein (steps S2, S3).

Based on the search result of the reproduction period list B performed in the steps S2 and S3, various kinds of processing in the followings is carried out.

(1-1 Processing)
  The skip start point Ss is included in a certain reproduction period K within the reproduction period list B (Yes in step S3)
  The start point Ks of the reproduction period K is not the same as the skip start point Ss (No in step S4)
  There is the skip end point Se in the reproduction period K (Yes in step S5)
  The end point Ke of the reproduction period K is not the same as the skip end point Se (Yes in step S6)
  It is possible to add a new reproduction period to the reproduction period list B (Yes in step S7)

If the above-described conditions are all satisfied, as shown in FIG. 2A, the following processing is performed:
  The processing for moving down the reproduction period number by one such as setting the reproduction period (K+1) and thereafter to the reproduction period (K+2) and thereafter (step S8);
  The processing for setting the reproduction start point (K+1) s of the reproduction period (K+1) as the skip end point Se (step S9);
  The processing for forming a new reproduction period (K+1) having the reproduction end point (K+1)e as the end point Ke of the reproduction period K (step S10); and
  The processing for altering the end point Ke of the reproduction period K to the skip start point Ss (step S11).

Figure 5:
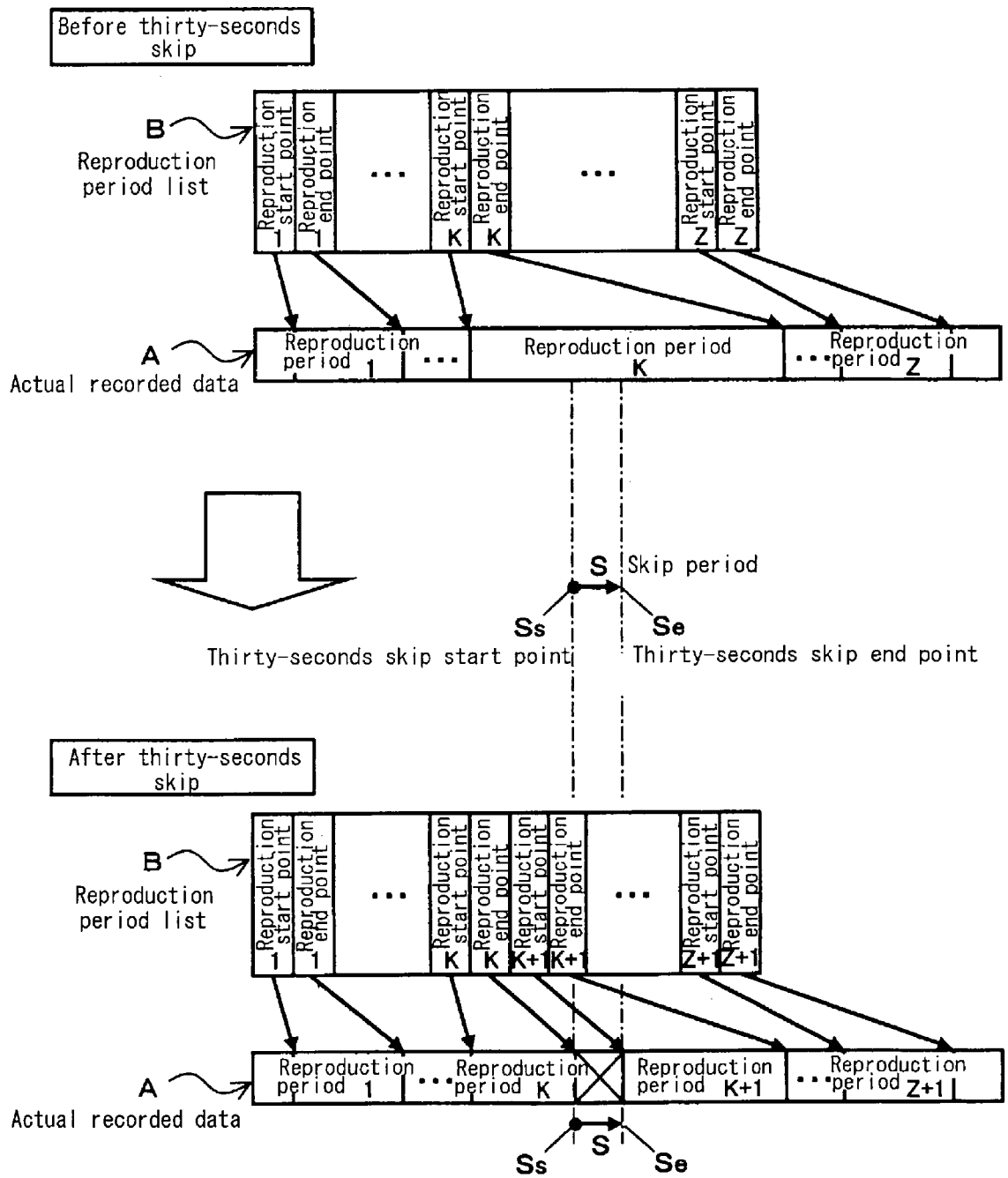
FIG. 5 is an illustration for describing an example of the action of the DVD recorder according to the first embodiment of the present invention.
Figure 6:
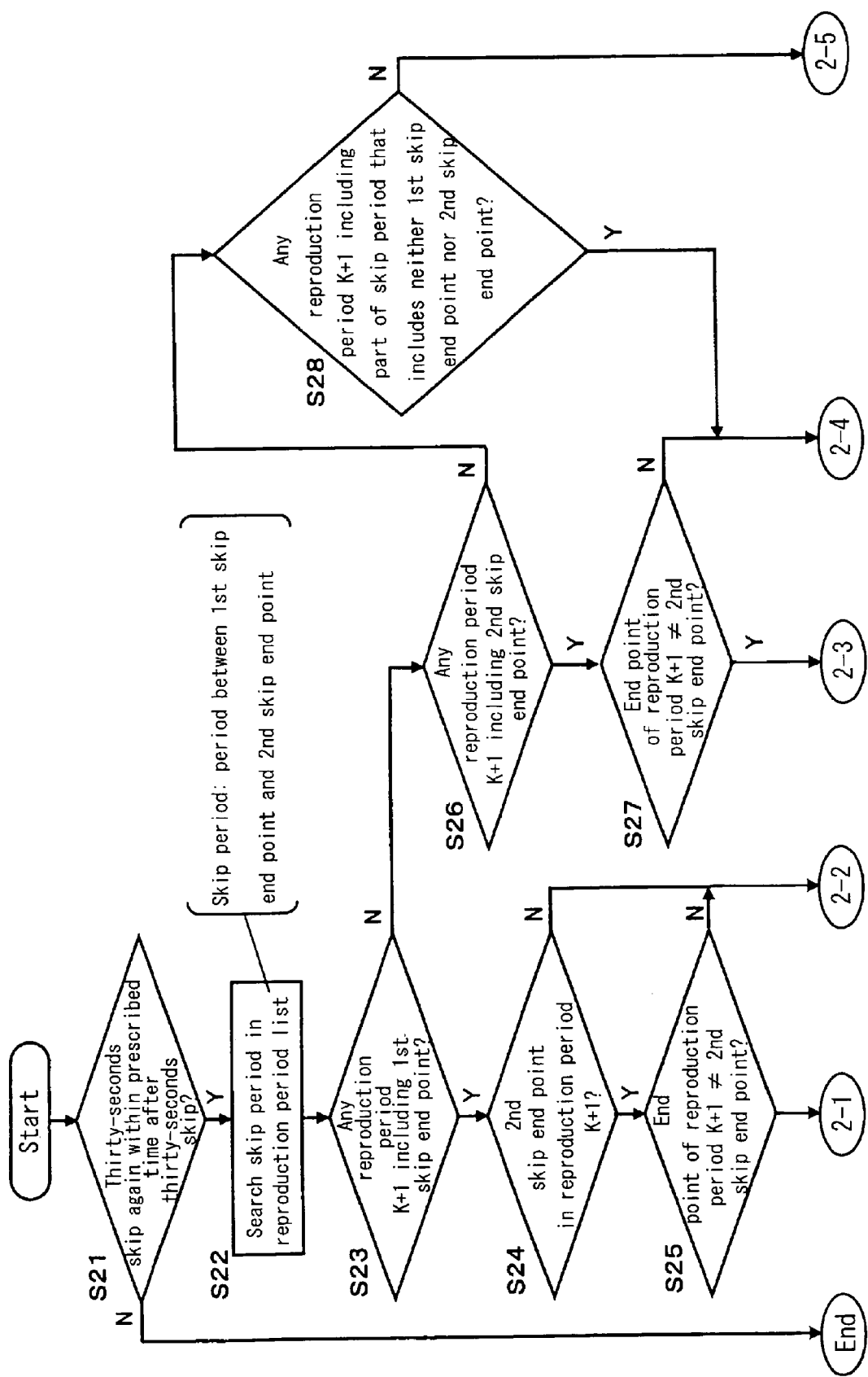
FIG. 6 is a flowchart for showing action of a DVD recorder according to a second embodiment of the present invention.
Figure 7:
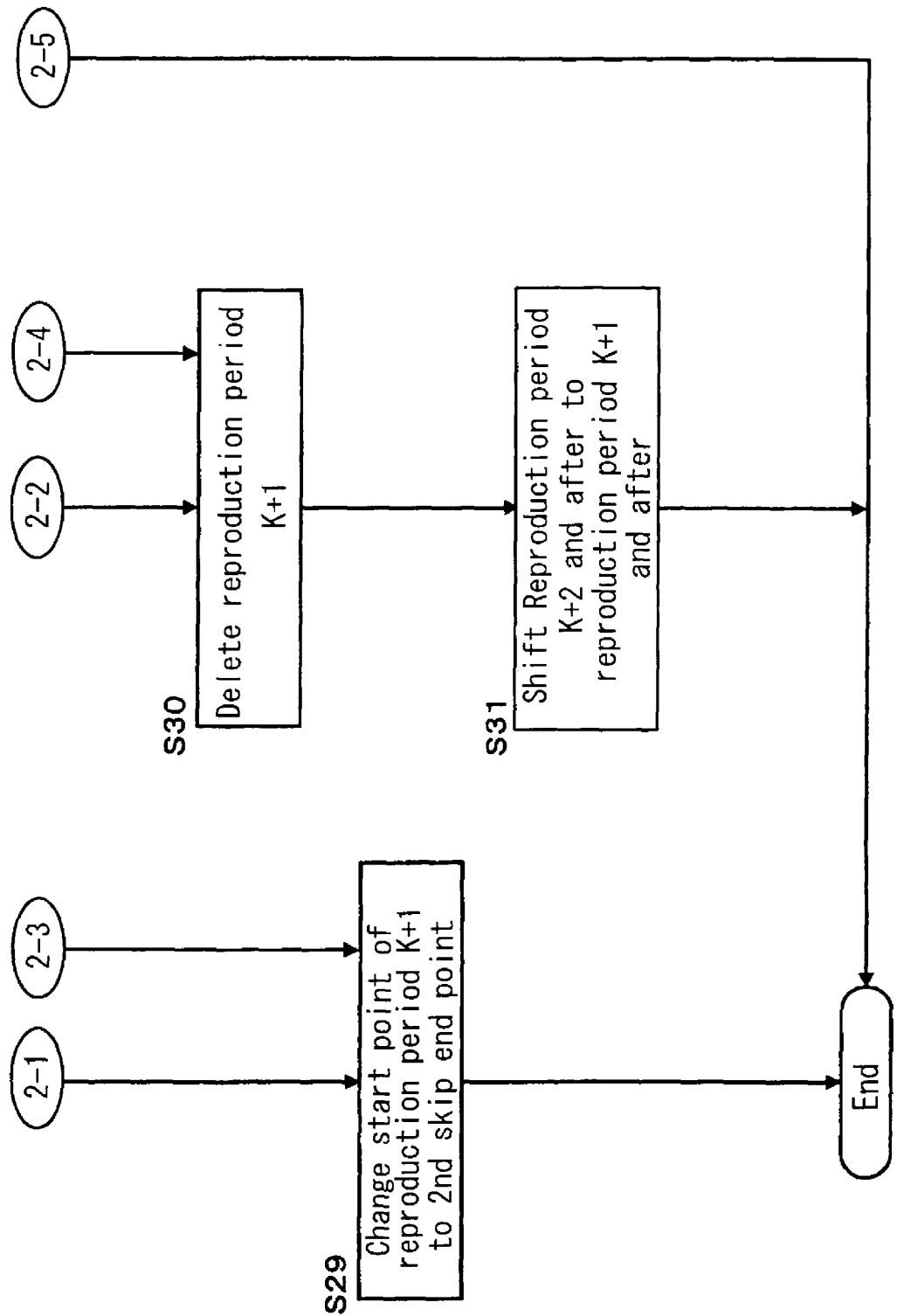
FIG. 7 is a flowchart for showing action of the DVD recorder according to the second embodiment of the present invention.

For comprehending such processing, it is effective to refer to FIG. 5 which shows the relation between the reproduction period list B and the actual recorded data A before and after the thirty-seconds skip. As can be seen from FIG. 5, it is clear that the number of the reproduction period is moved down by one after (K+1).

(1-2 Processing)
  The skip start point Ss is included in a certain reproduction period K within the reproduction period list B (Yes in step S3)
  The start point Ks of the reproduction period K is not the same as the skip start point Ss (No in step S4)
  There is the skip end point Se in the reproduction period K (Yes in step S5)
  The end point Ke of the reproduction period K is not the same as the skip end point Se (Yes in step S6)
  It is not possible to add a new reproduction period to the reproduction period list B (No in step S7)

If the above-described conditions are all satisfied, no processing is performed (end of processing)

(1-3 Processing)
  The skip start point Ss is included in a certain reproduction period K within the reproduction period list B (Yes in step S3)

The start point Ks of the reproduction period K is not the
same as the skip start point Ss (No in step S4).

There is no skip end point Se in the reproduction period K,
or the end point Ke of the reproduction period K is the
same as the skip end point Se (No in step S5 or No in step
S6)

If the conditions are all satisfied, the end point Ke of the
reproduction period K is set as the skip start point Ss (step
S12). FIG. 2B is referred for describing the action herein.

(1-4 Processing)

The skip start point Ss is included in a certain reproduction
period K within the reproduction period list B (Yes in
step S3)

The start point Ks of the reproduction period K is the same
as the skip start point Ss (Yes in step S4)

There is the skip end point Se in the reproduction period K
(Yes in step S13)

The end point Ke of the reproduction period K is not the
same as the skip end point Se (Yes in step S14)

If the conditions are all satisfied, the start point Ks of the
reproduction period K is set as the skip end point Se (step
S15). FIG. 2C is referred for describing the action herein.

(1-5 Processing)

The skip start point Ss is included in a certain reproduction
period K within the reproduction period list B (Yes in
step S3)

The start point Ks of the reproduction period K is the same
as the skip start point Ss (Yes in step S4)

There is no skip end point Se in the reproduction period K,
or the end point Ke of the reproduction period K is the
same as the skip end point Se (No in step S13 or No in
step S14)

If the conditions are all satisfied, the following processing is
carried out:

The reproduction period is deleted (step S16); and
The reproduction period (K+1) and thereafter is moved up
by one as the reproduction period K and thereafter (step
S17). FIG. 2D is referred for describing the action
herein.

(1-6 Processing)

The skip start point Ss is not included (No in step S3)
There is the reproduction period K including the skip end
point Se present in the reproduction period list B (Yes in
step S18)

The end point Ke of the reproduction period K is not the
same as the skip end point Se (Yes in step S19)

If the conditions are all satisfied, the start point Ks of the
reproduction period K is set as the skip end point Se (step
S15). FIG. 2C is referred for describing the action herein.

(1-7 Processing)

The skip start point Ss is not included (No in step S3)
There is the reproduction period K including the skip end
point Se present in the reproduction period list B, and the
end point Ke of the reproduction period K is the same as
the skip end point Se (Yes in step S18, No in step S19),
or there is no reproduction period K including the skip
end point Se in the reproduction period list B, and there
is no reproduction period K including a part of the skip
period that includes neither skip start point Ss nor skip
end point Se (No in step S18, Yes in step S20)

If the conditions are all satisfied, the reproduction period K is
deleted (step S16) and the processing for moving up the
reproduction period (K+1) and thereafter by one as the repro-
duction period K and thereafter is carried out (step S17). FIG.
2D is referred for describing the action herein.

(1-8 Processing)

The skip start point Ss is not included (No in step S3)
There is no reproduction period K including the skip end
point Se present in the reproduction period list B (No in
step S18)

There is no reproduction period K including a part of the
skip period that includes neither the skip start point Ss
nor the skip end point Se (No in step S20)

If the conditions are all satisfied, no processing is carried out
(end of processing).

At the time of reproduction, it is possible for the user to
select either to reproduce the actually-recorded data entirely
or to reproduce the data according to the reproduction period
list B that is formed automatically.

In this embodiment, when the specific-time skip (thirty-
seconds skip) is carried out during the reproduction of infor-
mation, the reproduction period list is modified using the skip
start point and the skip end point and the skip period is deleted
from the reproduction period. Thus, by simply performing the
specific-time skip once while reproducing the information, it
is possible thereafter to automatically skip the part that has
been skipped for a specific time when the information is
reproduced without going through any other special editing
work.

Second Embodiment

Referring to FIG. 6-FIG. 9, there is described a control
method of recording/reproducing actions performed in the
information recording/reproducing apparatus (DVD recorder
or the like) according to a second embodiment of the present
invention.

When thirty-seconds skip is carried out during the video
reproduction (Yes in step S21) and then successive thirty-
seconds skip is performed within a prescribed time τ (step
S21), searching is performed for checking whether the repro-
duction period list B includes the entire or a part of the period
between the first skip end point Se and the second skip end
point Se (steps S22, S23).

Based on the search result of the reproduction period list B
performed in the steps S22 and S23, each processing in the
followings is carried out.

(2-1 Processing)

The first skip end point Se is included in a certain repro-
duction period (K+1) within the reproduction period list
B (Yes in step S23)

There is the second skip end point Se in the reproduction
period (K+1) (Yes in Step S24)

The end point (K+1) e of the reproduction period (K+1) is
not the same as the second skip end point Se (Yes in step
S25)

If the above-described conditions are all satisfied, the start
point (K+1)s of the reproduction period (K+1) is set as the
second skip end point Se (step S29).

Figure 8A:
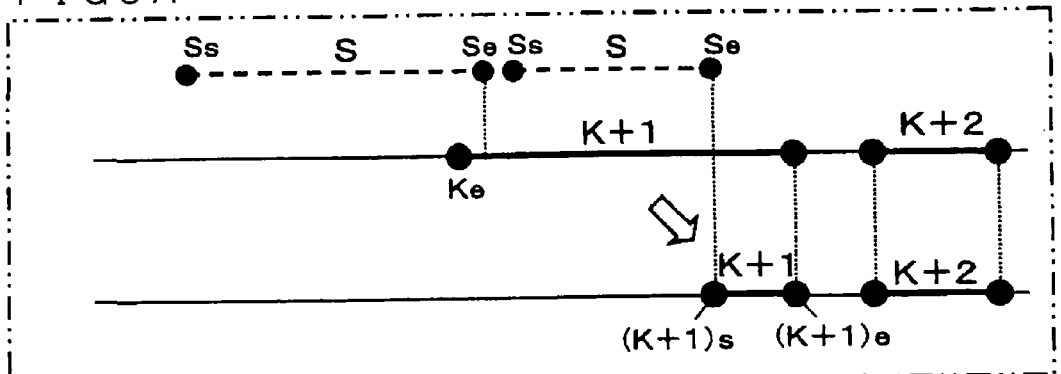
FIGS. 8A-8D are illustrations for describing various forms of relative positional relations between start points/end points of skip period and start points/end points of reproduction period according to the second embodiment of the present invention.

FIG. 8A is referred fro describing the action herein. FIG. 9
that shows the relation between the reproduction period list
and the actual recorded data A before and after the thirty-
seconds skip can also used as a reference. It can be seen that
a part of the front section is deleted in the new reproduction
period (K+1). The period between the first skip end point Se
and the second skip start point Ss is also deleted.

(2-2 Processing)
The first skip end point Se is included in a certain reproduction period (K+1) within the reproduction period list B (Yes in step S23)
There is no second skip end point Se in the reproduction period (K+1), or the end point (K+1)e of the reproduction period (K+1) is the same as the second skip end point Se (No in Step S24 or No in step S25)

Figure 8B:
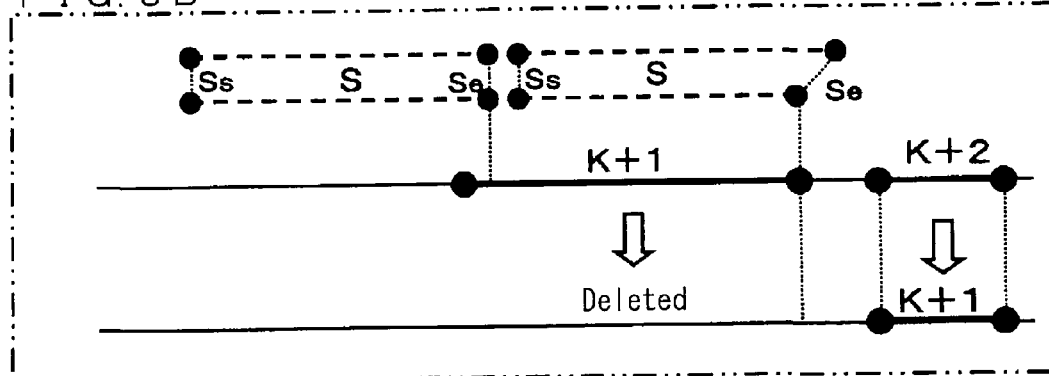

If the above-described conditions are all satisfied, the reproduction period (K+1) is deleted (step S30), and the reproduction period (K+2) and thereafter is moved up by one as the reproduction period (K+1) and thereafter (step S31). FIG. 8B is referred for describing the action herein. In FIG. 8B, the old reproduction period (K+1) is entirely deleted and the period between the first skip end point Se and the second skip start point Ss is deleted as well.
(2-3 Processing)
The first skip end point Se is not included (No in step S23)
There is the reproduction period (K+1) including the second skip end point Se present in the reproduction period list B (Yes in step S26)
The end point (K+1)e of the reproduction period (K+1) is not the same as the second skip end point Se (Yes in step S27)

Figure 8C:
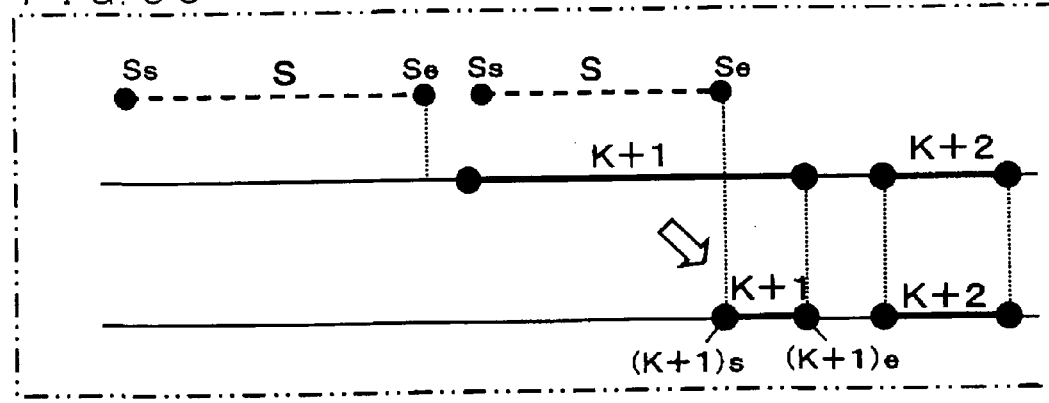

If the conditions are all satisfied, the start point (K+1)s of the reproduction period (K+1) is set as the second skip end point Se (step S29). FIG. 8C is referred for describing the action herein.
(2-4 Processing)
The first skip end point Se is not included (No in step S23)
There is the reproduction period (K+1) including the second skip end point Se present in the reproduction period list B, and the end point (K+1) e of the reproduction period (K+1) is the same as the second skip end point Se (Yes in step S26, No in step S27), or there is no reproduction period (K+1) including the second skip end point Se present in the reproduction period list B, and there is the reproduction period (K+1) including a part of the skip period S that includes neither the first skip end point Se nor the second skip end point Se (No in step S27, Yes in step S28)

Figure 8D:
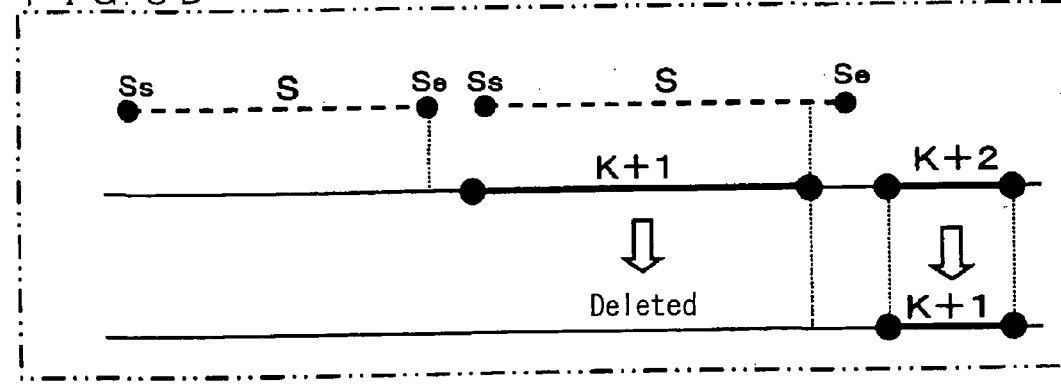

If the conditions are all satisfied, the reproduction period (K+1) is deleted (step S30) and the reproduction period (K+2) and thereafter is moved up by one as the reproduction period (K+1) and thereafter (step S31). FIG. 8D is referred for describing the action herein. In FIG. BD, the old reproduction period (K+1) is entirely deleted.
(2-5 Processing)
The first skip end point Se is not included (No in step S23)
There is no reproduction period (K+1) including the second skip end point Se present in the reproduction period list B (No in step S26)
There is no reproduction period (K+1) including a part of the period between the first skip end point Se and the second skip end point Se (No in step S28)

If the conditions are all satisfied, no processing is carried out (end of processing)

The prescribed time τ can also be designated by the user in advance at the time of setting initial configuration other than fixing it as one-tenth of specific-time skip (thirty seconds in the embodiments) and the like.

In this embodiment, when the specific-time skip (thirty-seconds skip) is carried out during the information reproduction and then the specific-time skip is performed again within the prescribed time τ, not only the second skip period but also the period between the first specific-time skip end point and the second specific-time skip start point is deleted from the reproduction period by modifying the reproduction period list B. Thus, the period that is reproduced while the user determines to perform the second skip after carrying out the first skip can also be automatically skipped thereafter when the information is reproduced. As a result, it is possible to prohibit reproduction of the information the user originally does not desire to reproduce, and the desired skip action can be achieved.

Third Embodiment

Figure 10:
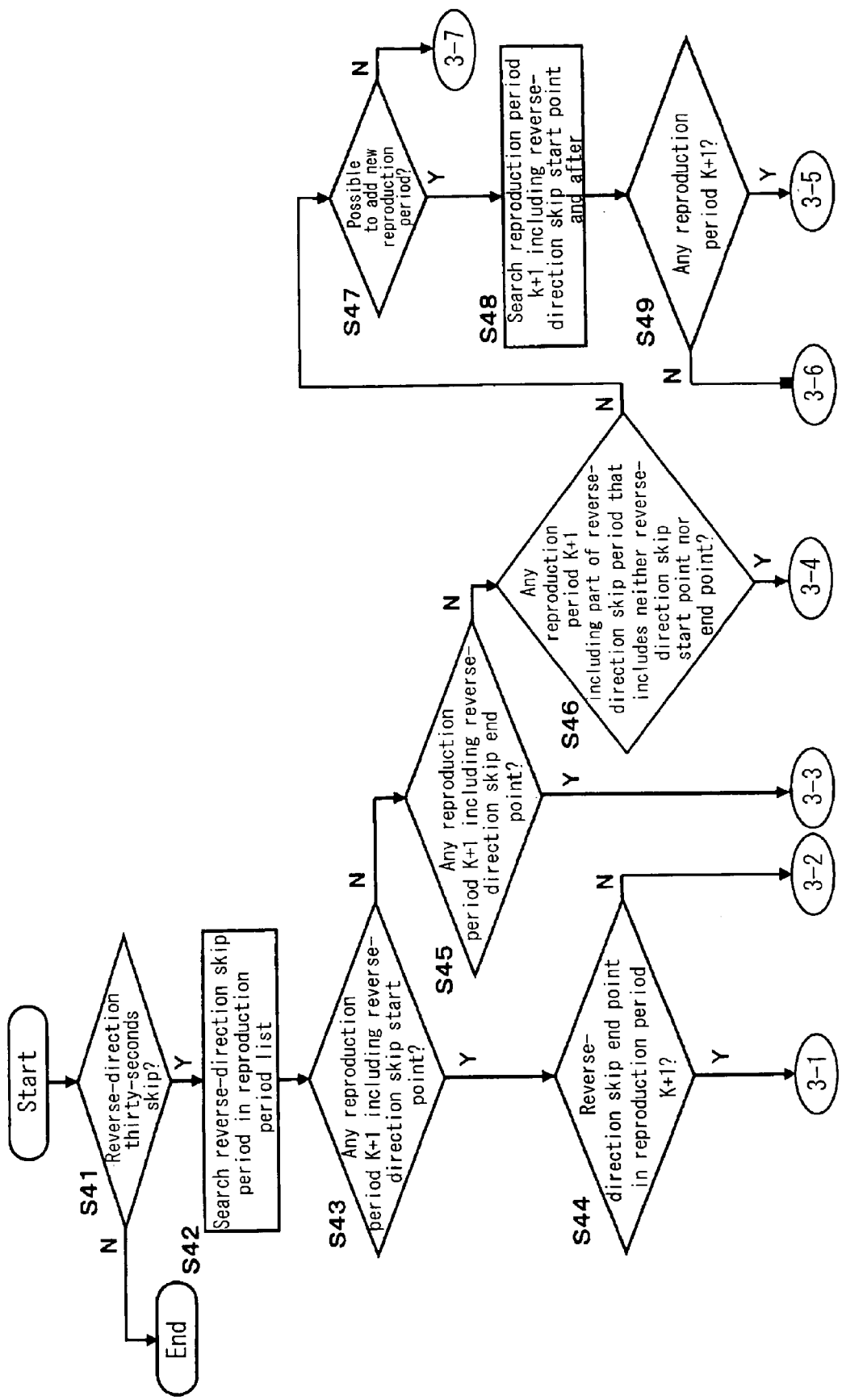
FIG. 10 is a flowchart for showing action of a DVD recorder according to a third embodiment of the present invention.
Figure 11:
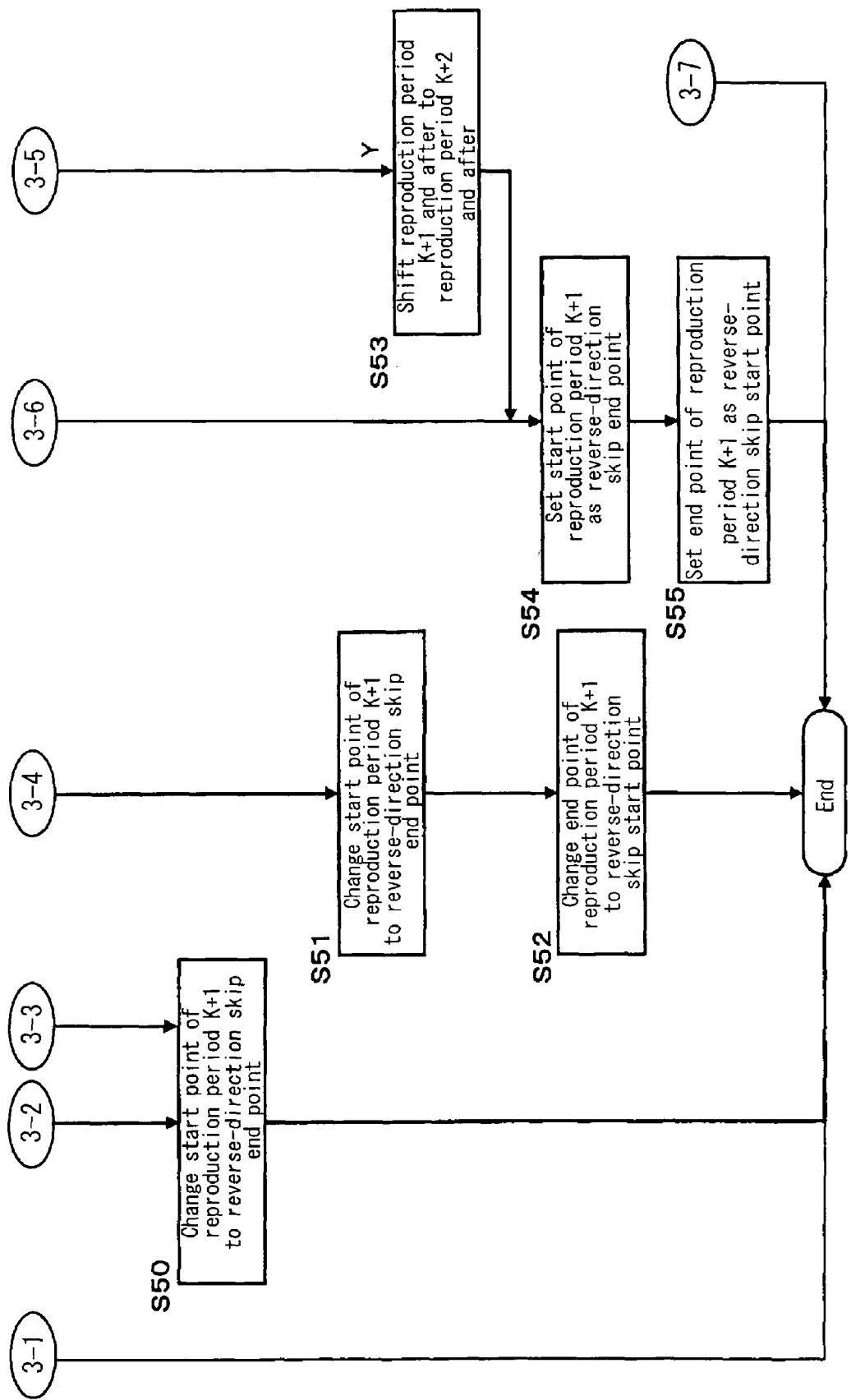
FIG. 11 is a flowchart for showing action of the DVD recorder according to the third embodiment of the present invention.
Figure 12:
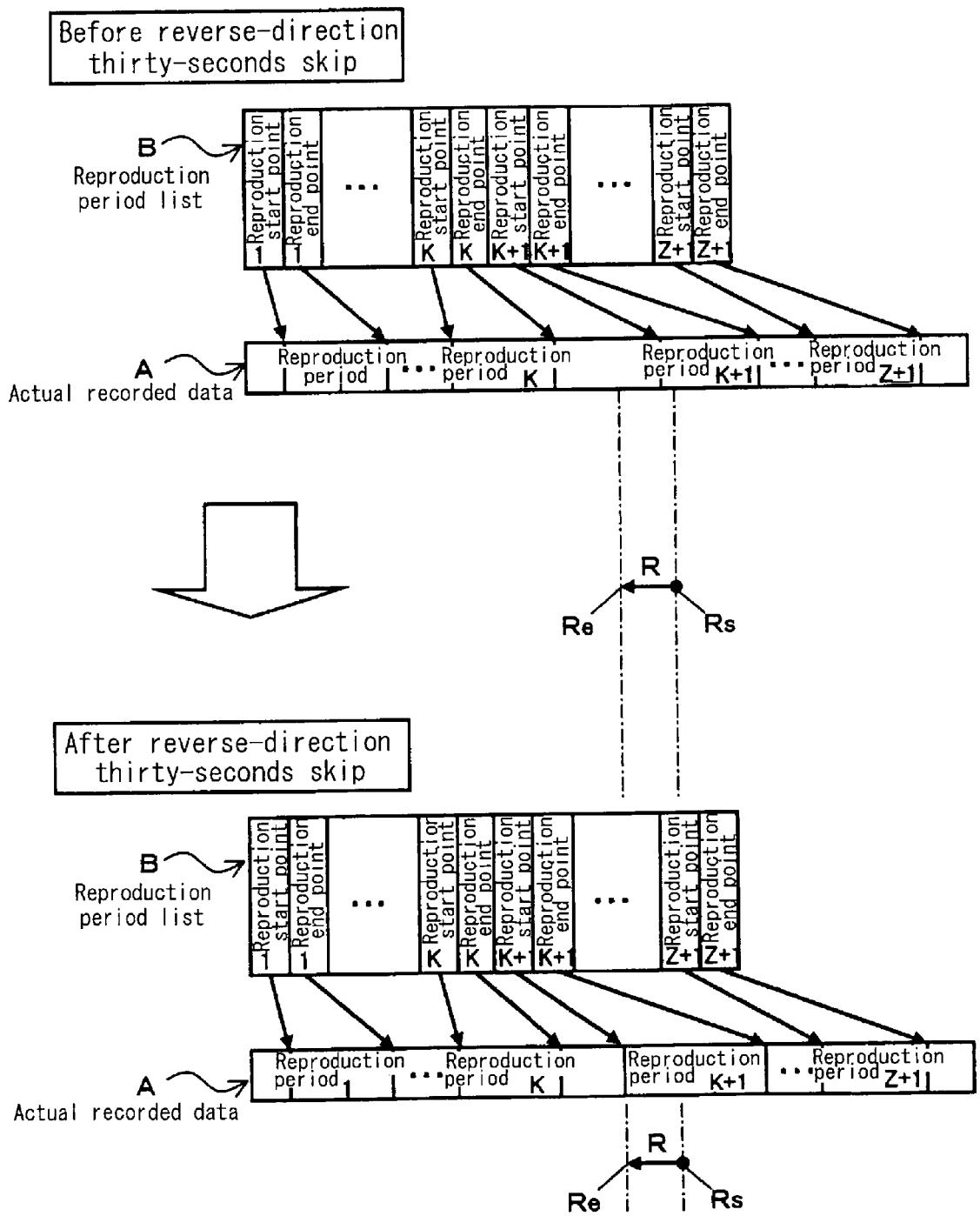
FIG. 12 is an illustration for describing an example of the action of the DVD recorder according to the third embodiment of the present invention.

Referring to FIG. 10-FIG. 12, there is described a control method of recording/reproducing actions performed in the information recording/reproducing apparatus (DVD recorder or the like) according to a third embodiment of the present invention.

When reverse-direction thirty-seconds skip is carried out during video reproduction performed in a DVD recorder that comprises a reverse-direction thirty-seconds skipping device M1 (Yes in step S41), searching is performed for checking whether the entire or a part of a reverse-direction skip period R is included in the reproduction period list B after specifying a reverse-direction skip start point Rs and a reverse-direction end point Re (steps S42, S43).

Based on the search result of the reproduction period list B performed in the steps S42 and S43, various kinds of processing in the followings is carried out.
(3-1 Processing)
There is the reproduction period (K+1) including the reverse-direction skip start point Rs present in the reproduction period list B (Yes in step S43)
There is the reverse-direction skip end point Re in the above-described reproduction period (K+1) (Yes in step S44)

If the above-described conditions are all satisfied, no processing is performed (end of processing).
(3-2 Processing)
There is the reproduction period (K+1) including the reverse-direction skip start point Rs present in the reproduction period list B (Yes in step S43)
There is no reverse-direction skip end point Re in the above-described reproduction period (K+1) (No in step S44)

If the above-described conditions are all satisfied, the start point (K+1)s of the reproduction period (K+1) is set as the reverse-direction skip end point Re (step S50). FIG. 12 can be referred for describing the action herein.
(3-3 Processing)
There is no reproduction period (K+1) including the reverse-direction skip start point Rs present in the reproduction period list B (No in step S43)
There is the reproduction period (K+1) including the reverse-direction skip end point Re in the reproduction period list B (Yes in step S45)

If the above-described conditions are all satisfied, the start point (K+1)s of the reproduction period (K+1) is set as the reverse-direction skip end point Re (step S50).
(3-4 Processing)
There is no reproduction period (K+1) including the reverse-direction skip start point Rs present in the reproduction period list B (No in step S43)

There is no reproduction period (K+1) including the reverse-direction skip end point Re present in the reproduction period list B (No in step S45)

There is the reproduction period (K+1) that includes a part of the reverse-direction skip period R present in the reproduction period list B (Yes in step S46)

If the above-described conditions are all satisfied, the start point (K+1)s of the reproduction period (K+1) is set as the reverse-direction skip end point Re (step S51), and the end point (K+1)e of the reproduction period (K+1) is set as the reverse-direction skip start point Rs (step S52).

(3-5 Processing)

There is no reproduction period (K+1) including the reverse-direction skip start point Rs present in the reproduction period list B (No in step S43)

There is no reproduction period (K+1) including the reverse-direction skip end point Re present in the reproduction period list B (No in step S45)

There is no reproduction period (K+1) that includes a part of the reverse-direction skip period R present in the reproduction period list B (No in step S46)

It is possible to add a new reproduction period to the reproduction period list B (Yes in step S47)

There is the reproduction period (K+1) including the reverse-direction skip start point Rs and thereafter (Yes in step S49)

If the above-described conditions are all satisfied, the reproduction period (K+1) and thereafter is moved down by one as the reproduction period (K+2) and thereafter (step S53). Then, the start point (K+1)s of the reproduction period (K+1) is set as the reverse-direction skip end point Re (step S54), and the end point (K+1)e of the reproduction period (K+1) is set as the reverse-direction skip start point Rs (step S55).

(3-6 Processing)

There is no reproduction period (K+1) including the reverse-direction skip start point Rs present in the reproduction period list B (No in step S43)

There is no reproduction period (K+1) including the reverse-direction skip end point Re present in the reproduction period list B (No in step S45)

There is no reproduction period (K+1) that includes a part of the reverse-direction skip period R present in the reproduction period list B (No in step S46)

It is possible to add a new reproduction period to the reproduction period list B (Yes in step S47)

There is no reproduction period (K+1) including the reverse-direction skip start point Rs and thereafter (No in step S49)

If the above-described conditions are all satisfied, the reproduction period (K+1) is added at the end of the reproduction period list B. Then, the start point (K+1)s of the reproduction period (K+1) is set as the reverse-direction skip end point Re (step S54), and the end point (K+1) e of the reproduction period (K+1) is set as the reverse-direction skip start point Rs (step S55).

(3-7 Processing)

There is no reproduction period (K+1) including the reverse-direction skip start point Rs present in the reproduction period list B (No in step S43)

There is no reproduction period (K+1) including the reverse-direction skip end point Re present in the reproduction period list B (No in step S45)

There is no reproduction period (K+1) that includes a part of the reverse-direction skip period R present in the reproduction period list B (No in step S46)

It is not possible to add a new reproduction period to the reproduction period list B (No in step S47)

If the above-described conditions are all satisfied, no processing is performed (end of processing).

In this embodiment, when specific-time skip (thirty-seconds skip) in the reverse direction is carried out during the information reproduction and the reverse-direction skip period or a part thereof is not included in the reproduction period list B, the reproduction period list B is modified so that the reverse-direction skip period is not deleted from the reproduction period. With this, by performing the reverse-direction skip, the part the user originally desires to reproduce can be reproduced thereafter as information without automatic skip in action.

Fourth Embodiment

Figure 13:
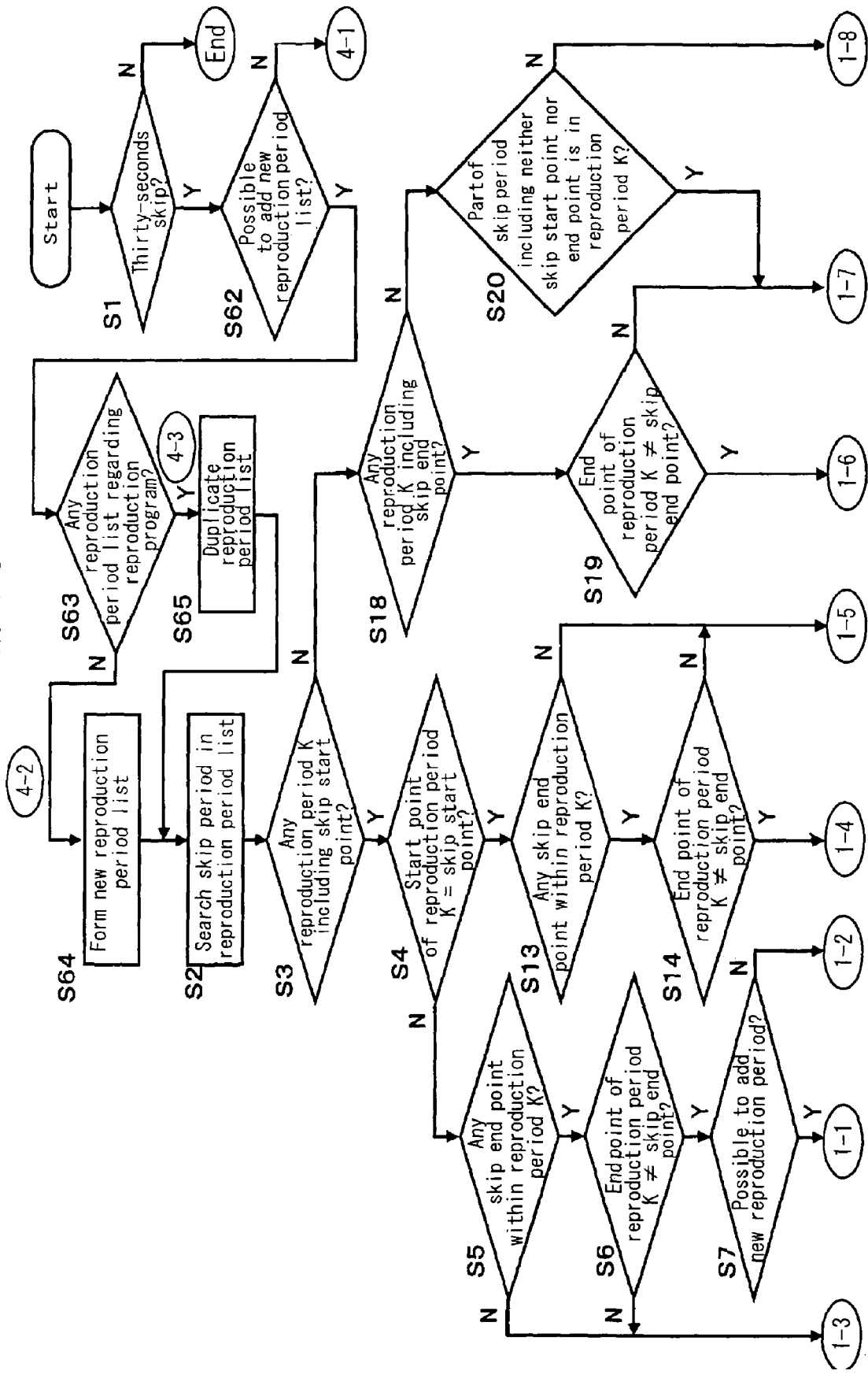
FIG. 13 is a flowchart for showing action of a DVD recorder according to a fourth embodiment of the present invention.
Figure 14:
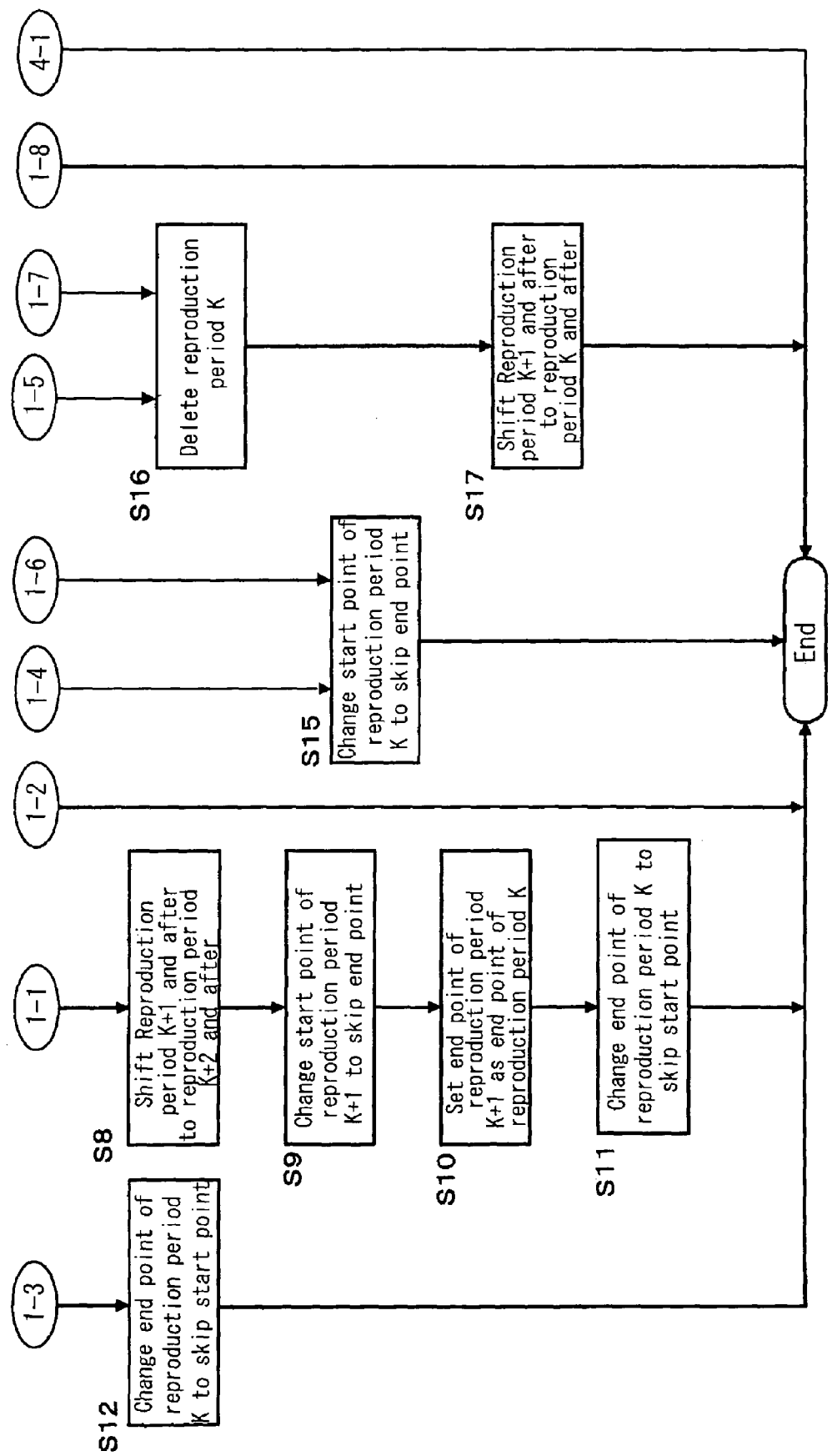
FIG. 14 is a flowchart for showing action of the DVD recorder according to the fourth embodiment of the present invention.

Referring to FIG. 13-FIG. 15, there is described a control method of recording/reproducing actions performed in the information recording/reproducing apparatus (DVD recorder or the like) according to a fourth embodiment of the present invention. FIG. 13 and FIG. 14 correspond to FIG. 2 and FIG. 3 of the first embodiment except that steps S62-S65 are inserted between the steps S1 and S2.

When the thirty-seconds skip is carried out during the video reproduction of the DVD recorder (step S1), first, it is checked to see whether or not a new reproduction period list B can be added (step S62), and then searching is performed to check whether or not there is a reproduction period list B containing a reproduction program (step S63). After performing the above-described search, each processing described below is added further to the processing of the first embodiment based on the search result.

(4-1 processing)

It is not possible to add a new reproduction period list B (No in step S62)

If the above-described condition is satisfied, no processing is performed (end of processing).

(4-2 Processing)

It is possible to add a new reproduction period list B (Yes in step S62)

There is no reproduction period list B containing the reproduction program (No in step S63)

If the above-described conditions are all satisfied, there is formed a reproduction period list B that includes only a reproduction period KI having the top of the corresponding reproduction program as a reproduction start point Ks1 and the end of the reproduction program as a reproduction end point Ke1 (step S64).

(4-3 Processing)

It is possible to add a new reproduction period list B (Yes in step S62)

There is the reproduction period list B including the reproduction program (Yes in step S63)

Figure 3:
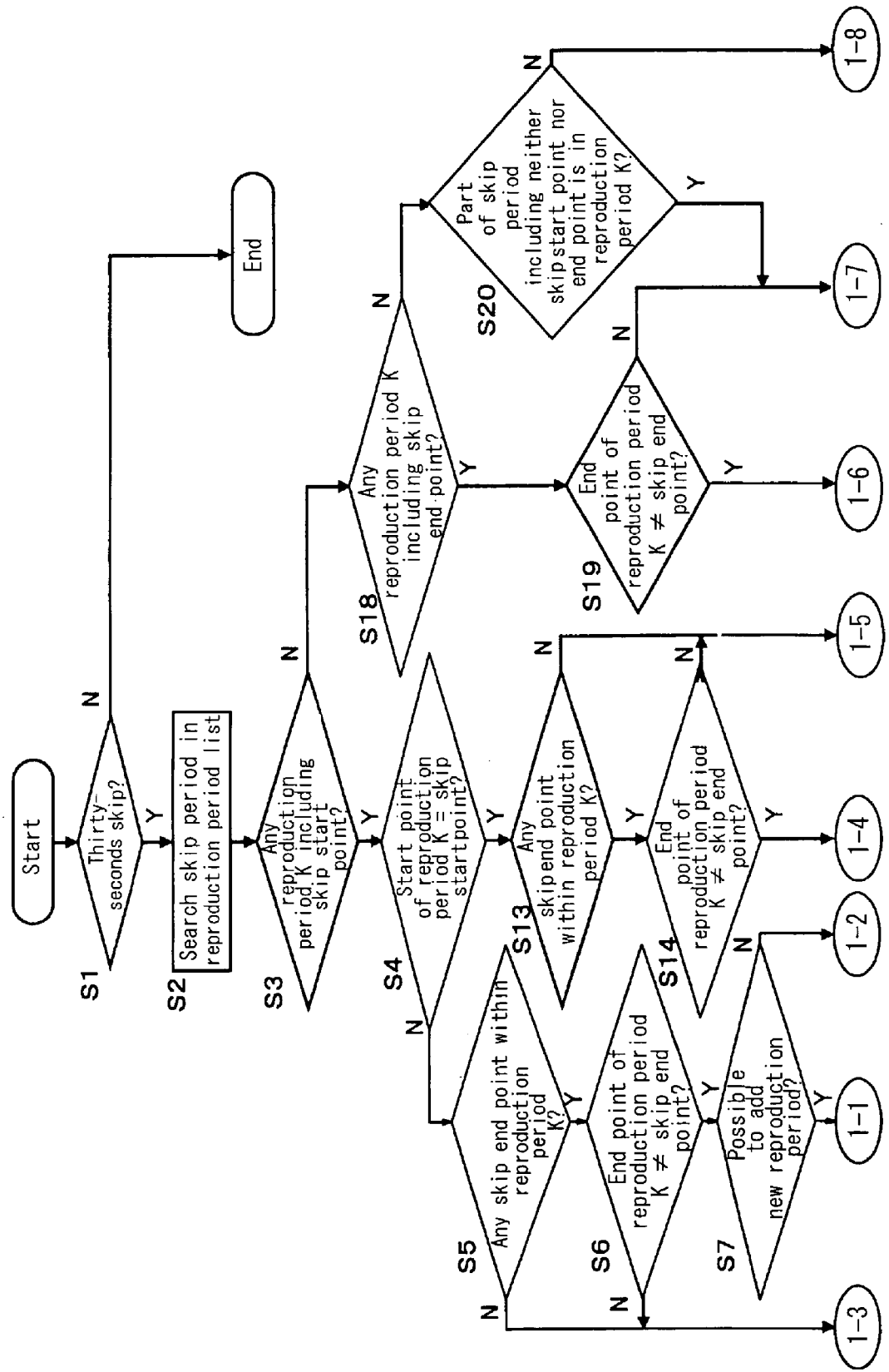
FIG. 3 is a flowchart for showing action of the DVD recorder according to the first embodiment of the present invention.
Figure 4:
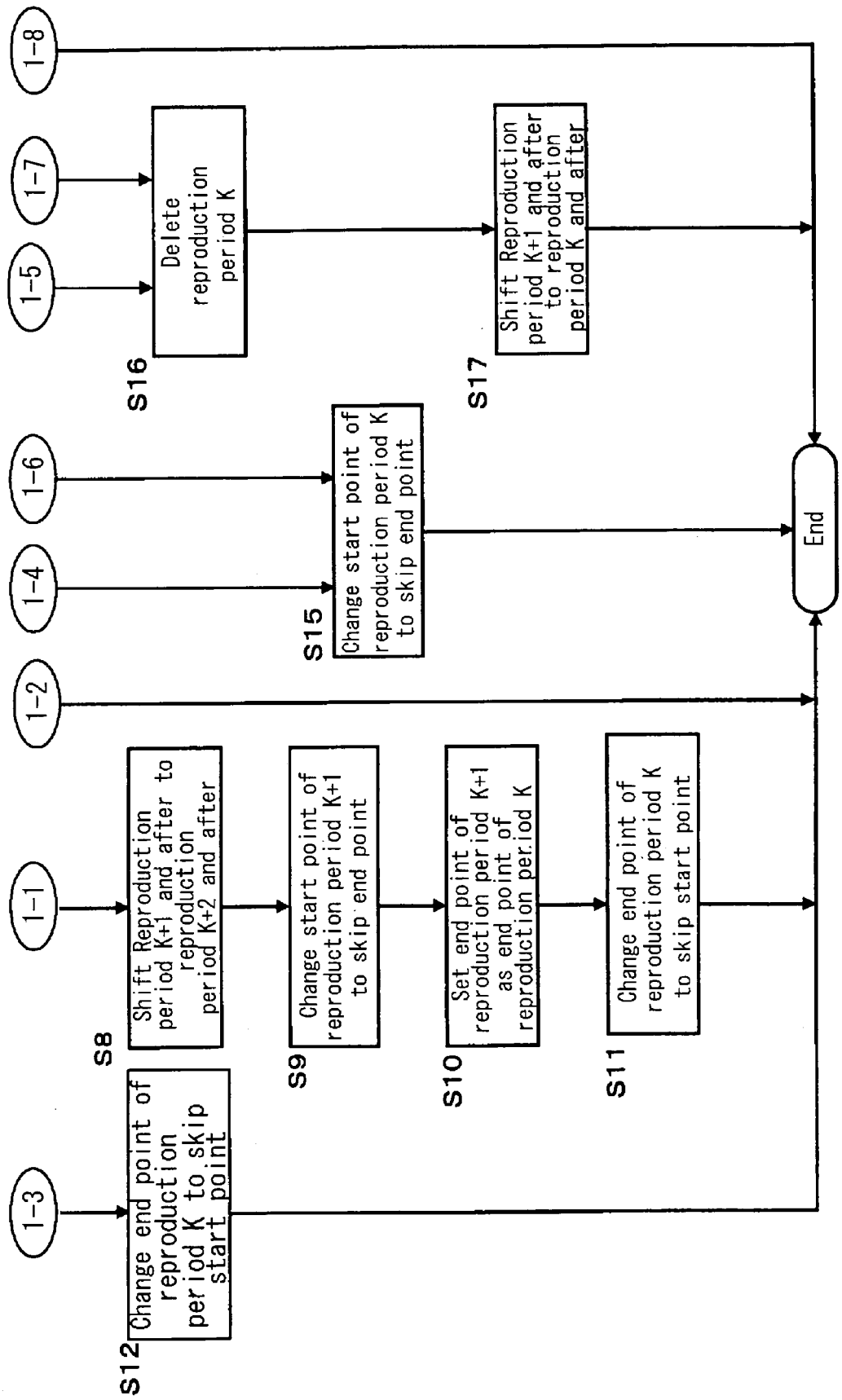
FIG. 4 is a flowchart for showing action of the DVD recorder according to the first embodiment of the present invention.

The processing thereafter is the same as that of the first embodiment shown in FIG. 2 and FIG. 3, so that the description thereof will be omitted. FIG. 15 can be referred for describing the action thereof. "B'" is the duplicated reproduction period list.

In the embodiment, if there already exists the reproduction period list B when a specific-time skip (thirty-seconds skip) is carried out during the information reproduction and the reproduction period list B is to be modified, the existing reproduction period list B is duplicated to be maintained, while other reproduction period list B is modified. With this, it is possible to reflect the skip information to the reproduction period list B while keeping the reproduction list B formed by the user.

Fifth Embodiment

Figure 16:
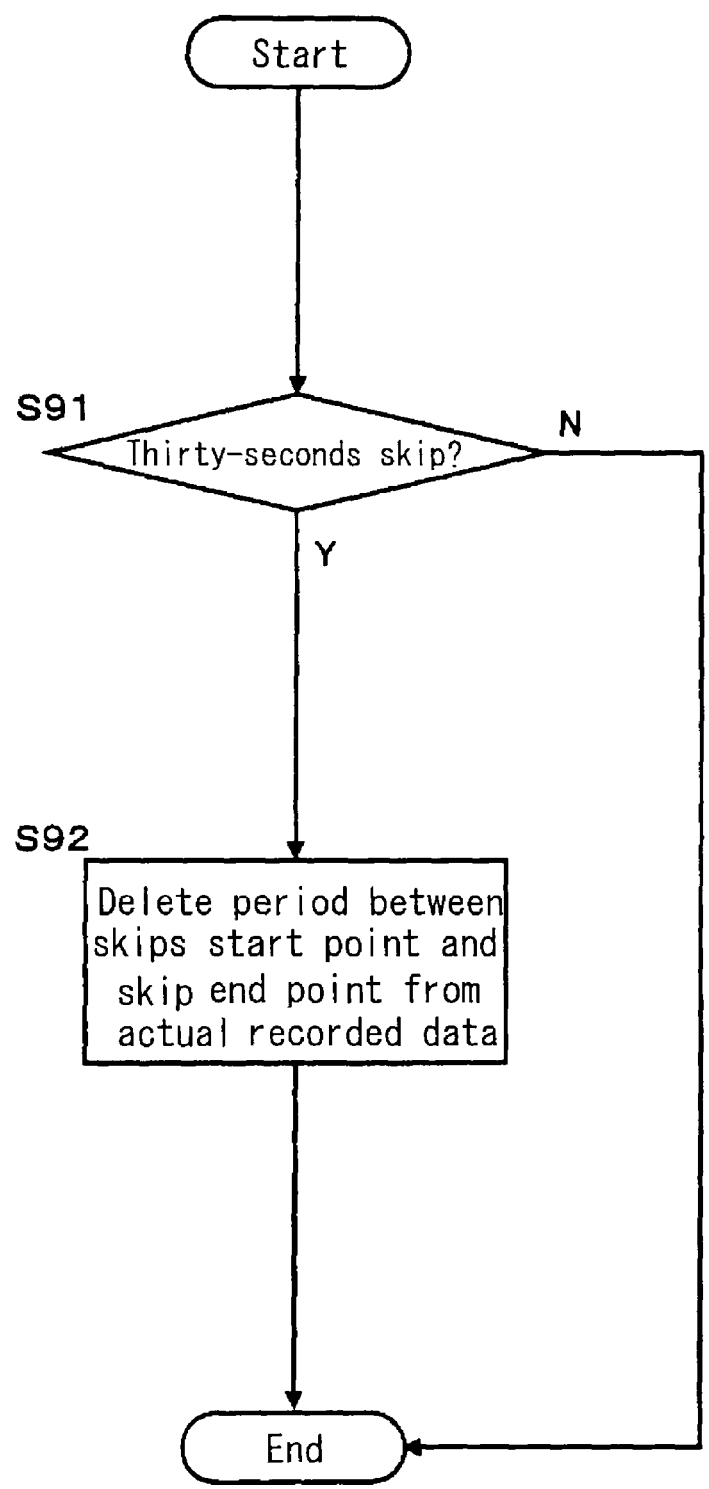
FIG. 16 is a flowchart for showing action of a DVD recorder according to a fifth embodiment of the present invention.
Figure 17:
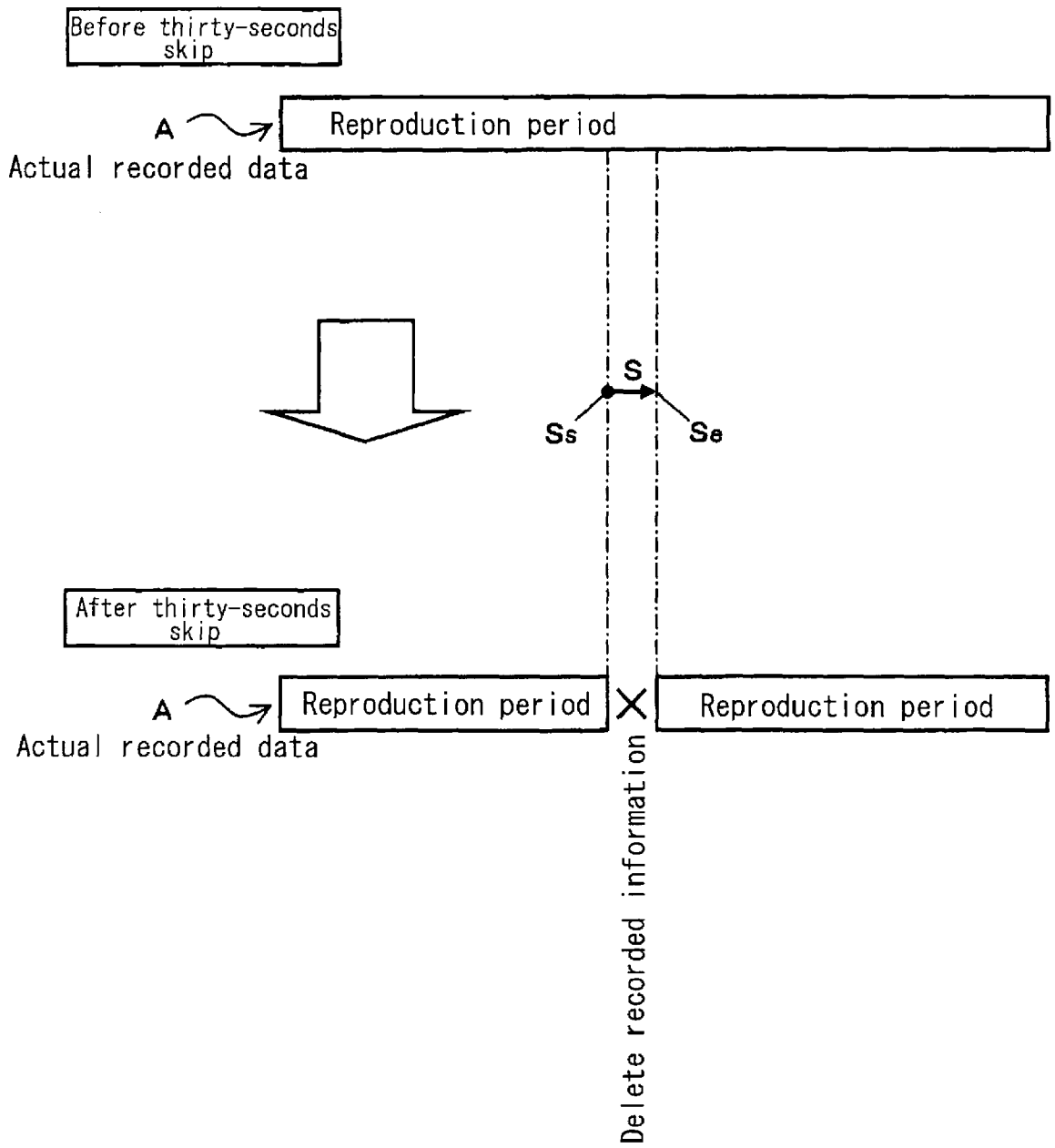
FIG. 17 is an illustration for describing an example of the action of the DVD recorder according to the fifth embodiment of the present invention.

Referring to FIG. 16 and FIG. 17, there is described a control method of recording/reproducing actions performed in the information recording/reproducing apparatus (DVD recorder or the like) according to a fifth embodiment of the present invention. It is checked to see whether or not the thirty-seconds skip is carried out during the video reproduction of the DVD recorder that comprises the thirty-seconds skipping device M1 and the recorded information editor M4. When it is judged that the thirty-seconds skip is carried out (Yes in step S91), the recorded information from the skip start point Ss to the skip end point Se, which is successive in terms of reproduction time, is deleted from the actual recorded data A on the DVD (step S92).

It can be achieved by deleting the successive recorded information in terms of the reproduction time from the skip start point Ss to the skip end point Se when the thirty-seconds skip is carried out.

In the embodiment, when the specific-time skip (thirty-seconds skip) is carried out during the information reproduction performed in the random-accessible information recording/reproducing apparatus, the recorded information corresponding to the skip period is deleted from the recording medium using the skip start point and the skip end point. Thus, by simply carrying out the specific-time skip once during the information reproduction, the part that is skipped for the specific time can be automatically skipped thereafter when the information is reproduced without performing any other special editing work. Further, it becomes possible to delete the recording source at the same time.

Sixth Embodiment

Figure 18:
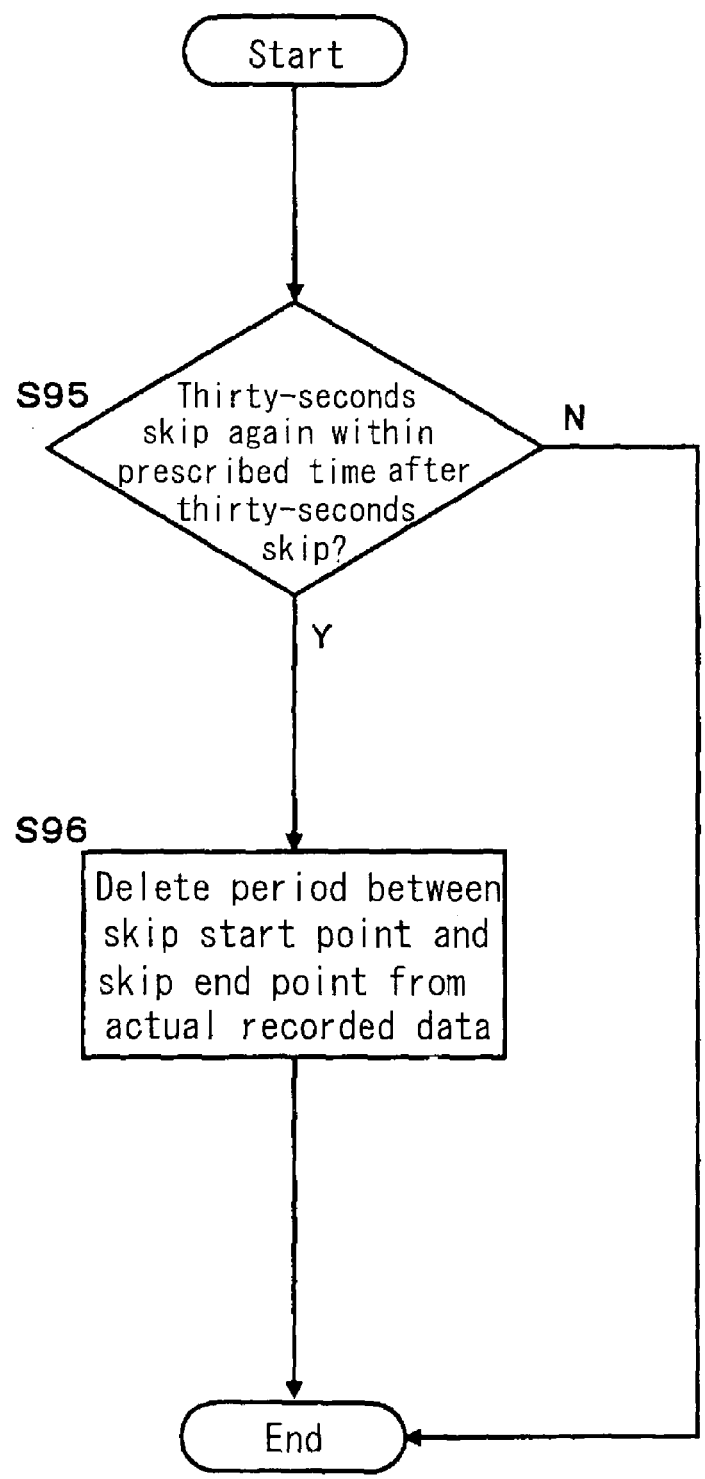
FIG. 18 is a flowchart for showing action of a DVD recorder according to a sixth embodiment of the present invention.
Figure 19:
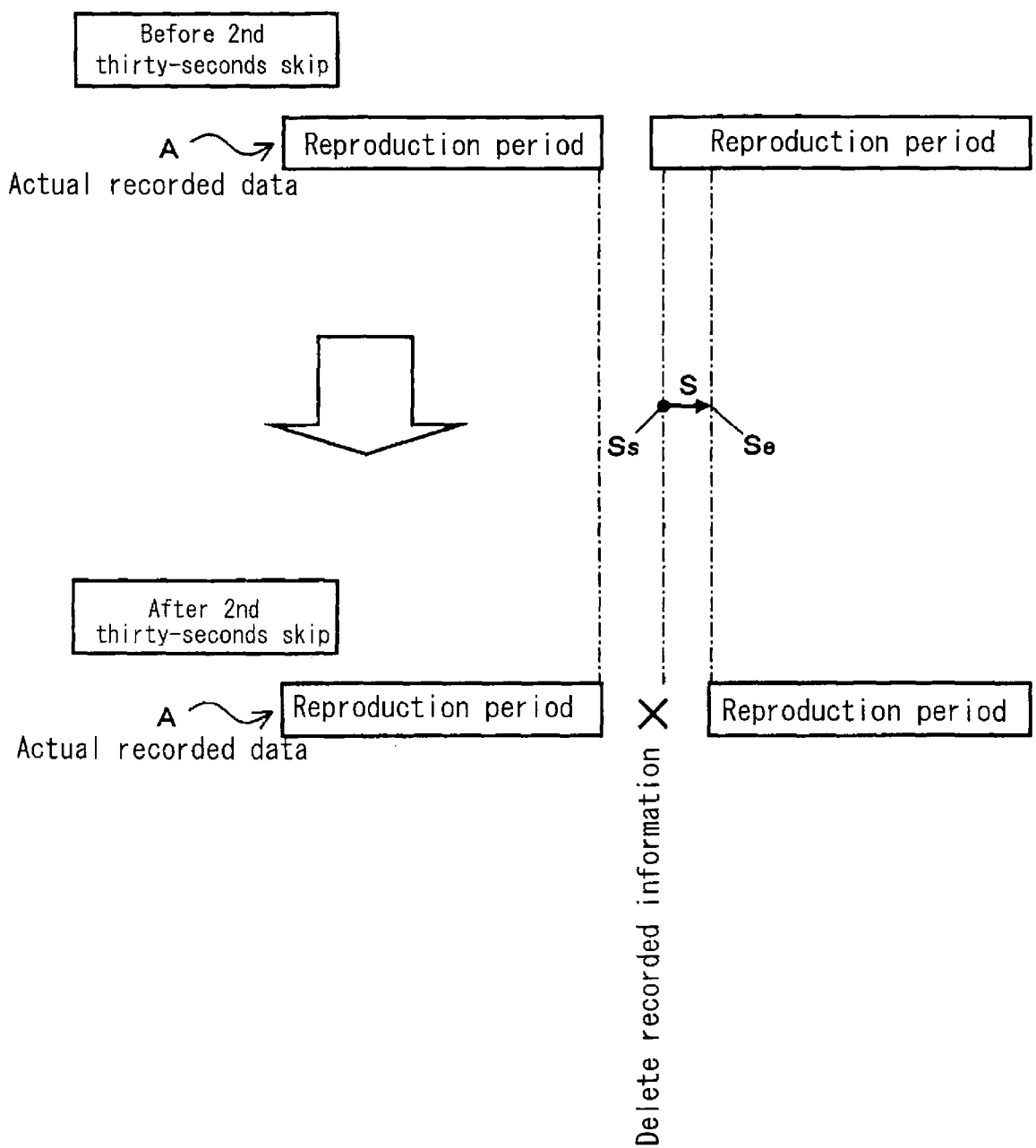
FIG. 19 is an illustration for describing an example of the action of the DVD recorder according to the sixth embodiment of the present invention.

Referring to FIG. 18 and FIG. 19, there is described a control method of recording/reproducing actions performed in the information recording/reproducing apparatus (DVD recorder or the like) according to a sixth embodiment of the present invention. When the thirty-seconds skip is carried out during the video reproduction of the DVD recorder that comprises the thirty-seconds skipping device M1 and the recorded information editor M4, and then next thirty-seconds skip is carried out continuously within a prescribed time τ (Yes in step S95), the first skip end point Se and the second skip end point Se are specified and than the recorded information from the first skip endpoint Se to the second skip endpoint Se, which is successive in terms of reproduction time, is deleted from the actual recorded data A on the DVD (step S96).

The prescribed time τ can also be designated by the user in advance at the time of setting initial configuration other than fixing it as one-tenth of specific-time skip (thirty seconds in the embodiments) and the like.

In this embodiment, the period that is reproduced while the user determines to perform the second skip after carrying out the first skip can also be automatically skipped thereafter when the information is reproduced. Further, it becomes possible to delete the recording source at the same time.

Seventh Embodiment

Figure 20:
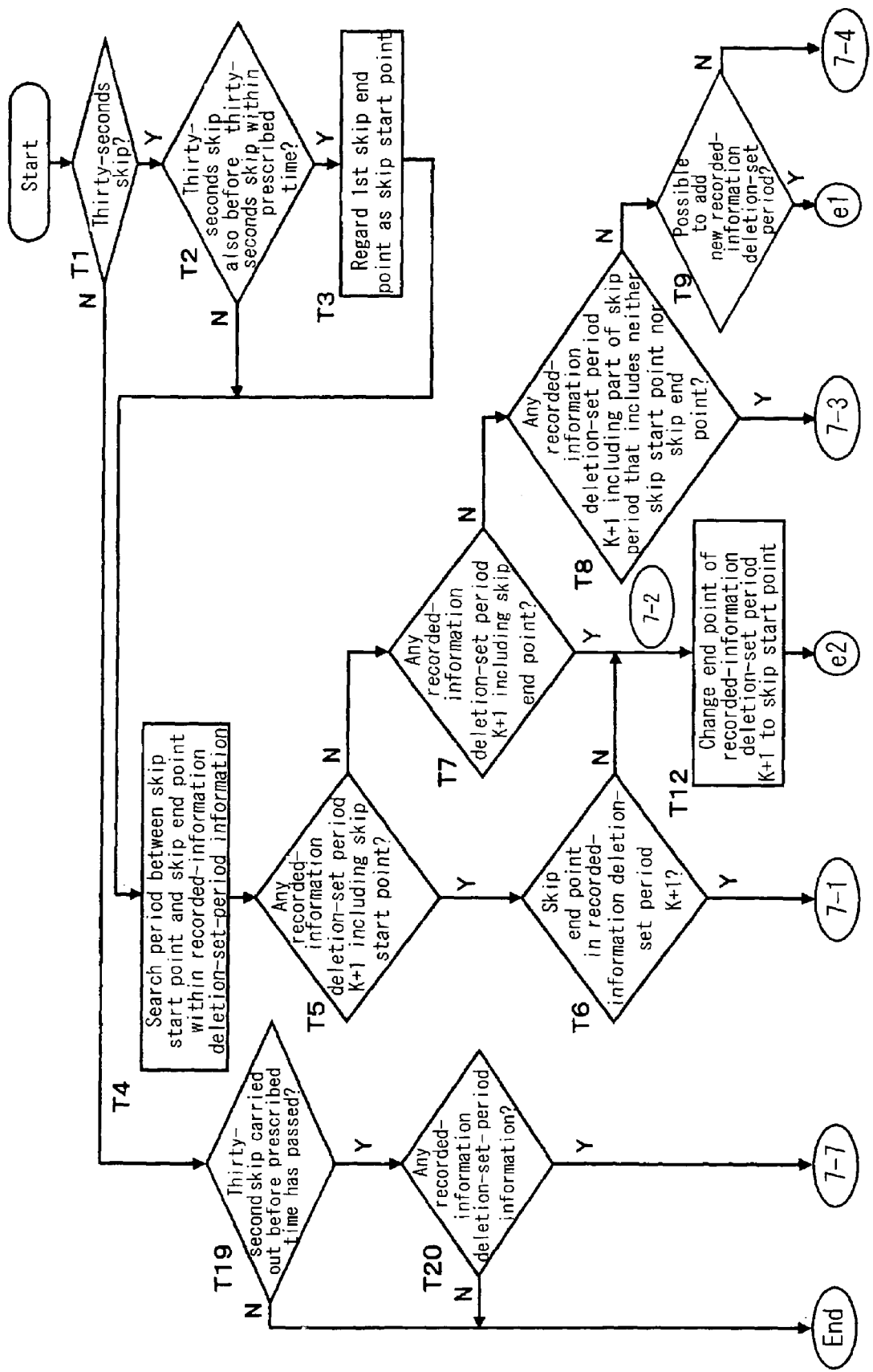
FIG. 20 is a flowchart for showing action of a DVD recorder according to a seventh embodiment of the present invention.
Figure 21:
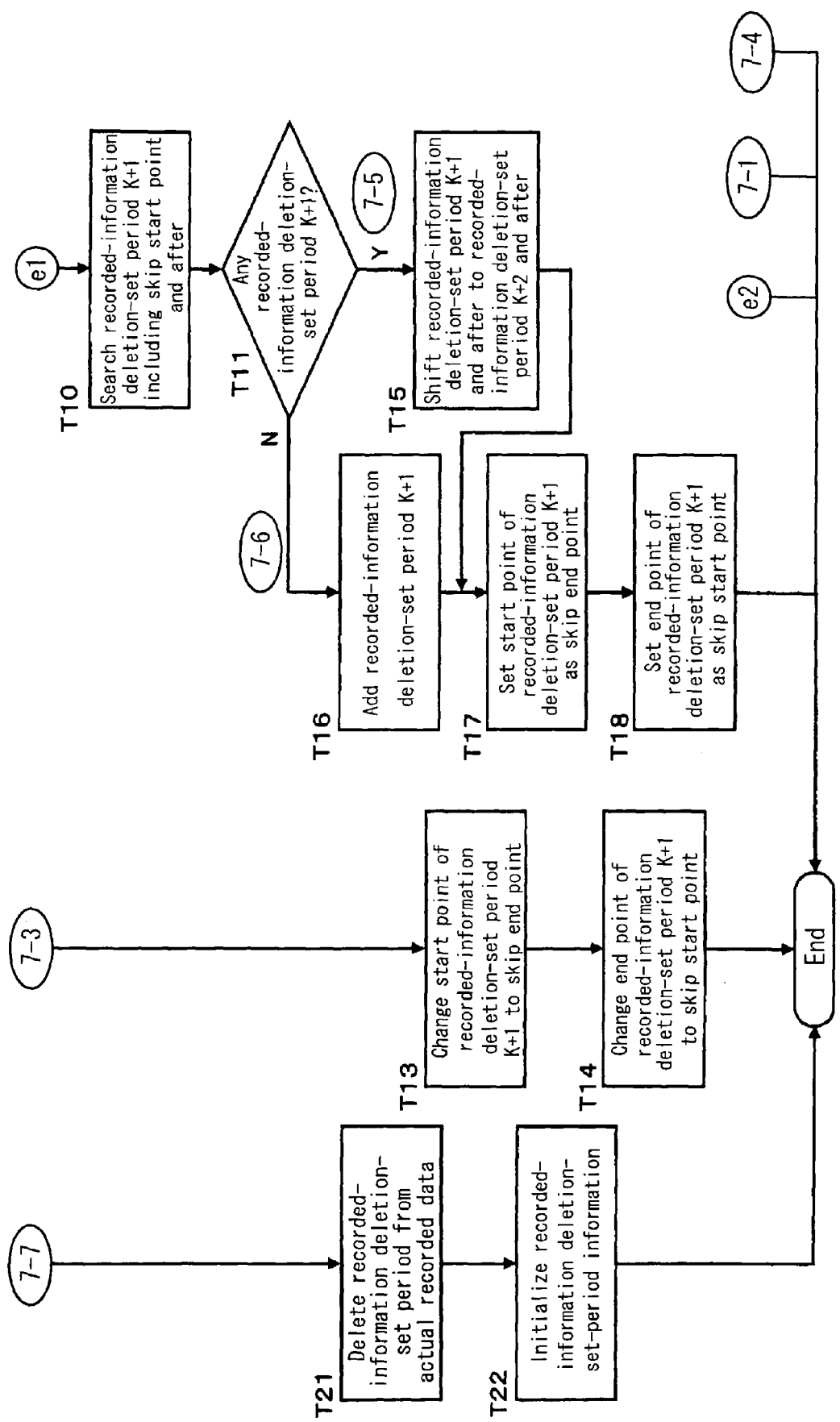
FIG. 21 is a flowchart for showing action of the DVD recorder according to the seventh embodiment of the present invention.
Figure 22:
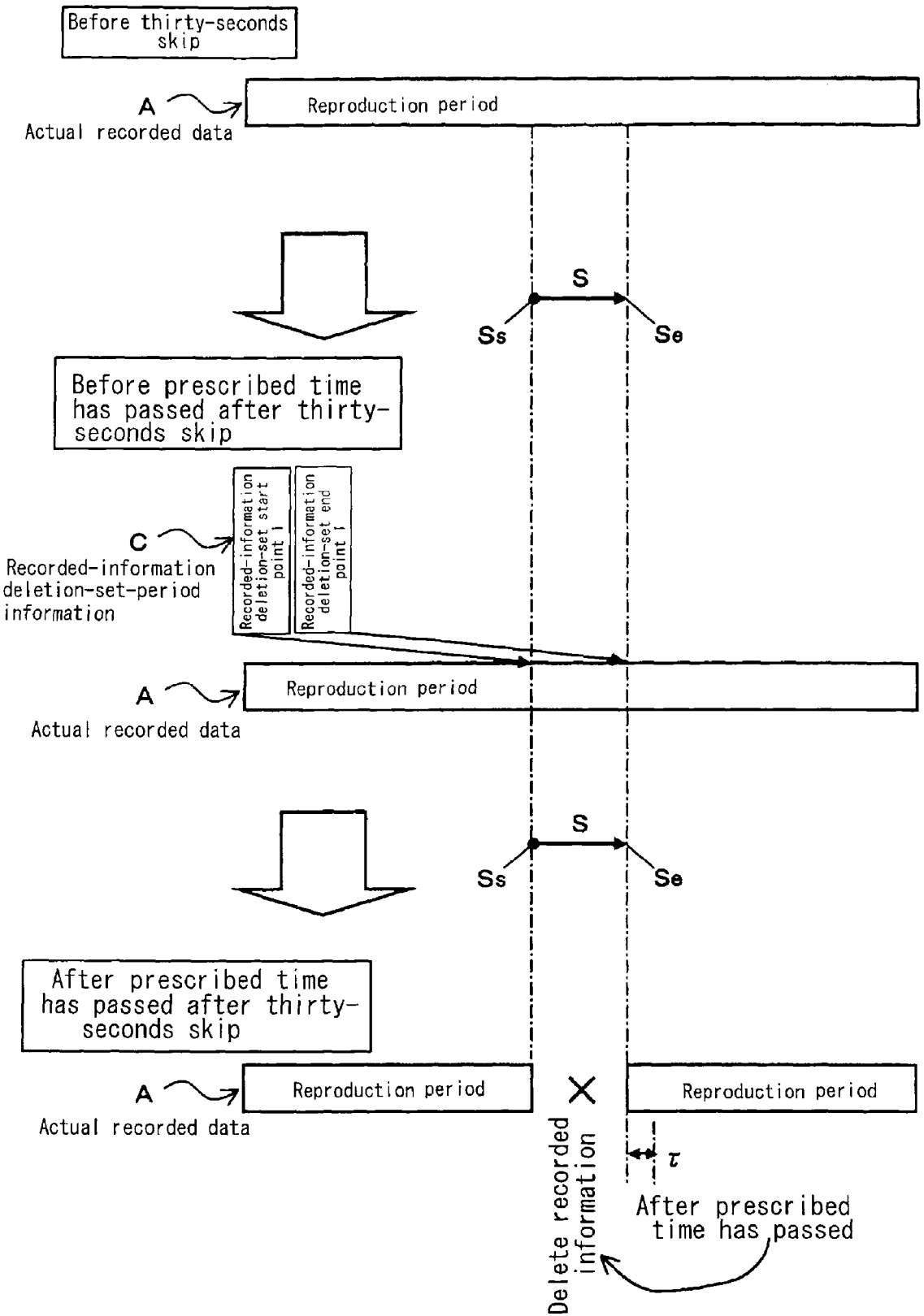
FIG. 22 is an illustration for describing an example of the action of the DVD recorder according to the seventh embodiment of the present invention.

Referring to FIG. 20-FIG. 22, there is described a control method of recording/reproducing actions performed in the information recording/reproducing apparatus (DVD recorder or the like) according to a seventh embodiment of the present invention.

During the video reproduction performed by the DVD recorder that comprises the thirty-seconds skipping device M1, the recorded information editor M4, and a recording/reproducing function of recorded-information deletion-set-period information C, first, detection processing for checking whether or not the thirty-seconds skip is carried out (step T1) is performed, and the detection processing is performed to check whether or not the next thirty-seconds skip is carried out within the prescribed time τ when it is determined in step T1 that the thirty-seconds skip has been carried out (step T2). Based on the result of each processing (steps T1, T2), the following processing is performed.

In the case where the thirty-seconds skip is carried out (Yes in step T1), it is detected in step T2 whether or not there is also the thirty-seconds skip carried out within the specific time τ. When it is Yes in step T2 (when there is the thirty-seconds skip carried out), the processing of regarding the end point Se of the previous thirty-seconds skip as the start point Ss of the current thirty-seconds skip (step T3) is carried out. In the meantime, when it is No in step T2 (there is no thirty-seconds skip carried out), pre-processing, which is to perform no above-described regarding processing of the skip start point, is carried out before the processing described below.

First, there is described the processing of the case where the thirty-seconds skip is carried out (Yes in step T1).

(7-1 Processing)
There already exists a period including the thirty-seconds skip start point Ss as a recorded-information deletion-set period (K+1) (step T4→Yes in step T5)
There is also the thirty-seconds skip end point Se in the recorded-information deletion-set period (K+1) (Yes in step T6)

If the above-described conditions are all satisfied, no processing is performed (end of processing).

(7-2 Processing)
There already exists a period including the thirty-seconds skip start point Ss as the recorded-information deletion-set period (K+1), and there is no thirty-seconds skip end point Se in the recorded-information deletion-set period (K+1) (step T4→Yes in step T5, No in step T6)
There is no period including the thirty-seconds skip start point Ss, and there already exists the period including the thirty-seconds skip end point Se as the recorded-information deletion-set period (K+1) (step T4→No in step T5, and Yes in step T7)

If either one of the above-described conditions is satisfied, the end point of the recorded-information deletion-set period (K+1) is changed to the thirty-seconds skip start point Ss (step T12).

(7-3 Processing)
There is no period including the thirty-seconds skip start point Ss (step T4→No in step T5)
There is no period including the thirty-seconds skip end point Se (No in step T7)
There exists the recorded-information deletion-set period (K+1) including a part of the thirty-seconds skip period S that includes neither the thirty-seconds skip start point Ss nor the thirty-seconds skip end point Se (Yes in step T8)

If the above-described conditions are all satisfied, the start point of the recorded-information deletion-set period (K+1) is changed to the thirty-seconds skip end point Se (step T13), and the end point of the recorded-information deletion-set period (K+1) is changed to the thirty-seconds skip start point Ss (step T14).

(7-4 Processing)
There is no period including the thirty-seconds skip start point Ss (step T4→No in step T5)
There is no period including the thirty-seconds skip end point Se (No in step T7)
There is no recorded-information deletion-set period (K+1) including a part of the thirty-seconds skip period S that includes neither the thirty-seconds skip start point Ss nor the thirty-seconds skip end point Se (No in step T8)
It is not possible to add a new recorded-information deletion-set period Ki (No in step T9)

If the above-described conditions are: all satisfied, no processing is performed (end of processing)

(7-5 Processing)
There is no period including the thirty-seconds skip start point Ss (step T4→No in step T5)
There is no period including the thirty-seconds skip end point Se (No in step T7)
There is no recorded-information deletion-set period (K+1) including a part of the thirty-seconds skip period S that includes neither the thirty-seconds skip start point Ss nor the thirty-seconds skip end point Se (No in step T8)
It is possible to add a new recorded-information deletion-set period Ki (Yes in step T9)
There is the recorded-information deletion-set period (K+1) that includes the skip start point Ss and thereafter (step T10→Yes in step T11)

If the above-described conditions are all satisfied, the recorded-information deletion-set period (K+1) and thereafter is moved down by one as the recorded-information deletion-set period (K+2) and thereafter (step T15), the start point of the recorded-information deletion-set period (K+1) is set as the thirty-seconds skip end point Se (step T17), and the end point of the recorded-information deletion-set period (K+1) is set as the thirty-seconds skip start point Ss (step T18).

(7-6 Processing)
There is no period including the thirty-seconds skip start point Ss (step T4→No in step T5)
There is no period including the thirty-seconds skip end-point Se (No in step T7)
There is no recorded-information deletion-set period (K+1) including a part of the thirty-seconds skip period S that includes neither the thirty-seconds skip start point Ss nor the thirty-seconds skip end point Se (No in step T8)
It is possible to add a new recorded-information deletion-set period Ki (Yes in step T9)
There is no recorded-information deletion-set period (K+1) that includes the skip start point Ss and thereafter (step T10→No in step T11)

If the above-described conditions are all satisfied, the recorded-information deletion-set period (K+1) is added (step T16), the start point of the added recorded-information deletion-set period (K+1) is set as the thirty-seconds skip end point Se (step T17), and the end point thereof is set as the thirty-seconds skip start point Ss (step T18).

Next, there is described the processing of the case where it is judged as "No" in step T1.

(7-7 Processing)
The prescribed time has passed while each of the above-described processing is performed (Yes in step T19)
There exists the recorded-information deletion-set-period information (step T20)

If the above-described conditions are all satisfied, the recorded information corresponding to the period registered to the recorded-information deletion-set-period information C is deleted from the actual recorded data A (step T21), and the recorded-information deletion-set-period information C is formatted (step T22).

The prescribed time τ can also be designated by the user in advance at the time of setting initial configuration other than fixing it as one-tenth of specific-time skip (thirty seconds in the embodiments) and the like.

With the embodiment, even though deletion of the skip period has been set by the specific-time skip (thirty-seconds skip), it is possible for the user to cancel the deletion of the recorded information that corresponds to the skip period from the actual recorded data A as long as it is within the prescribed time τ after the skip.

Eighth Embodiment

Figure 23:
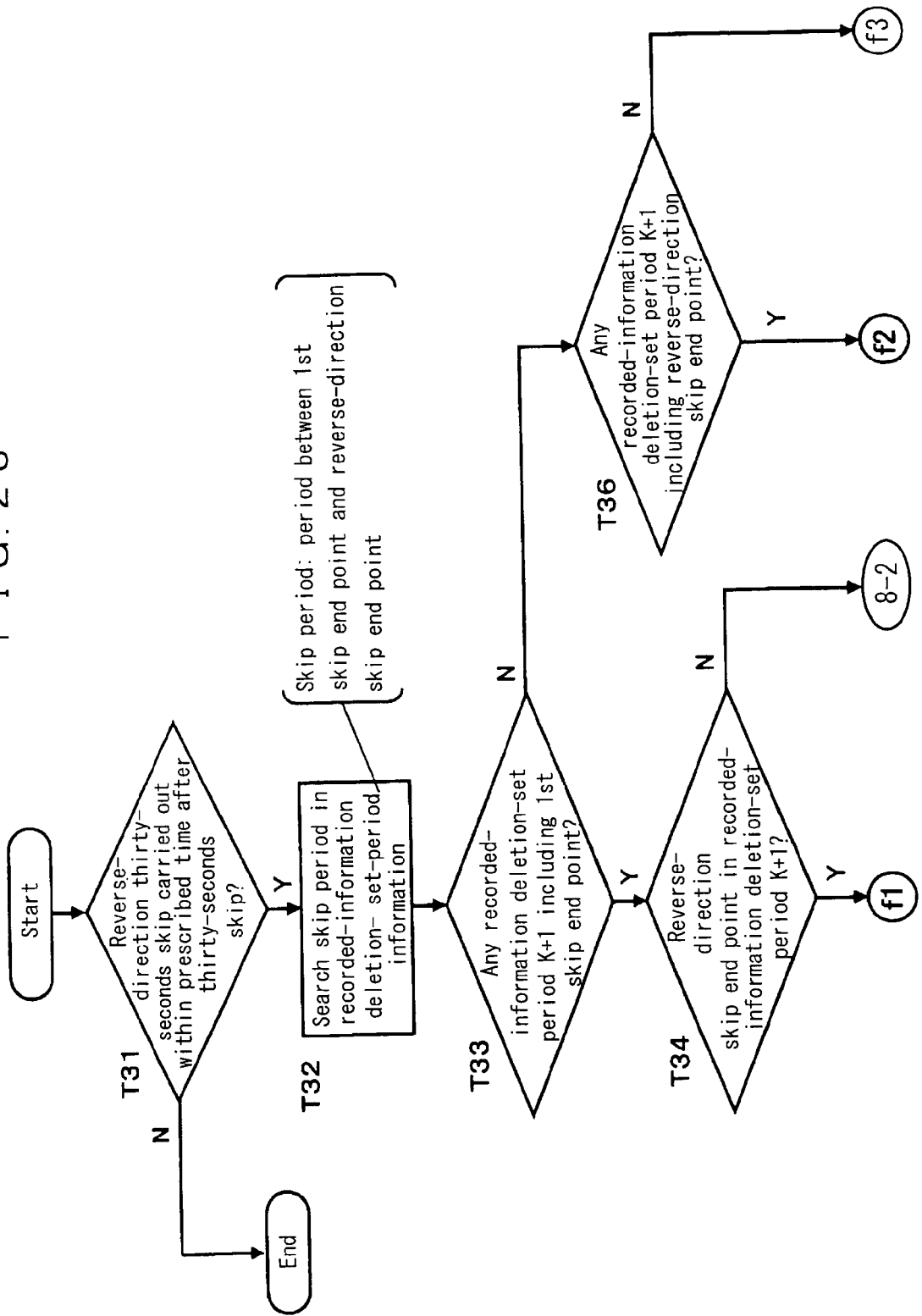
FIG. 23 is a flowchart for showing action of a DVD recorder according to an eighth embodiment of the present invention.
Figure 24:
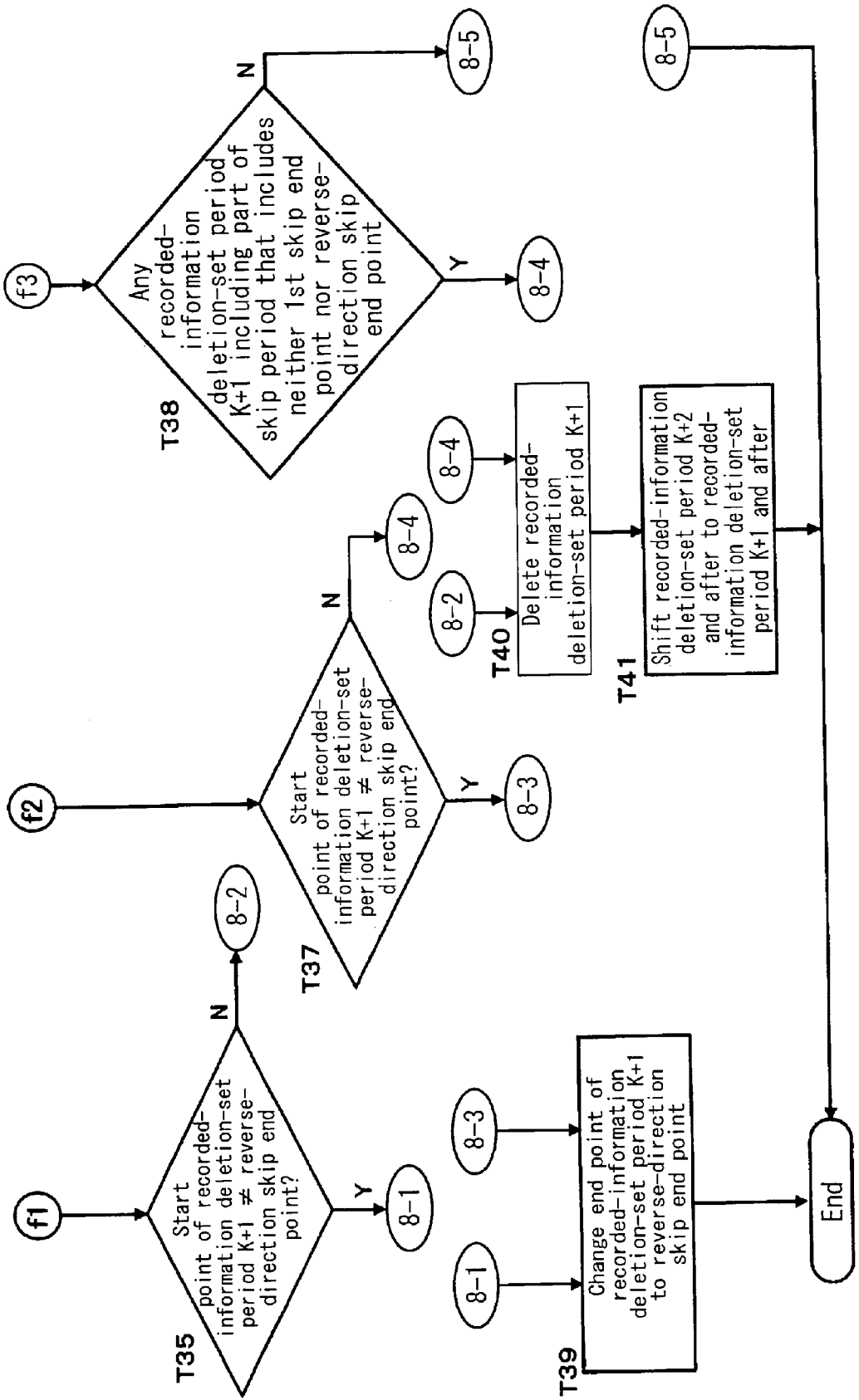
FIG. 24 is a flowchart for showing action of the DVD recorder according to the eighth embodiment of the present invention.
Figure 25:
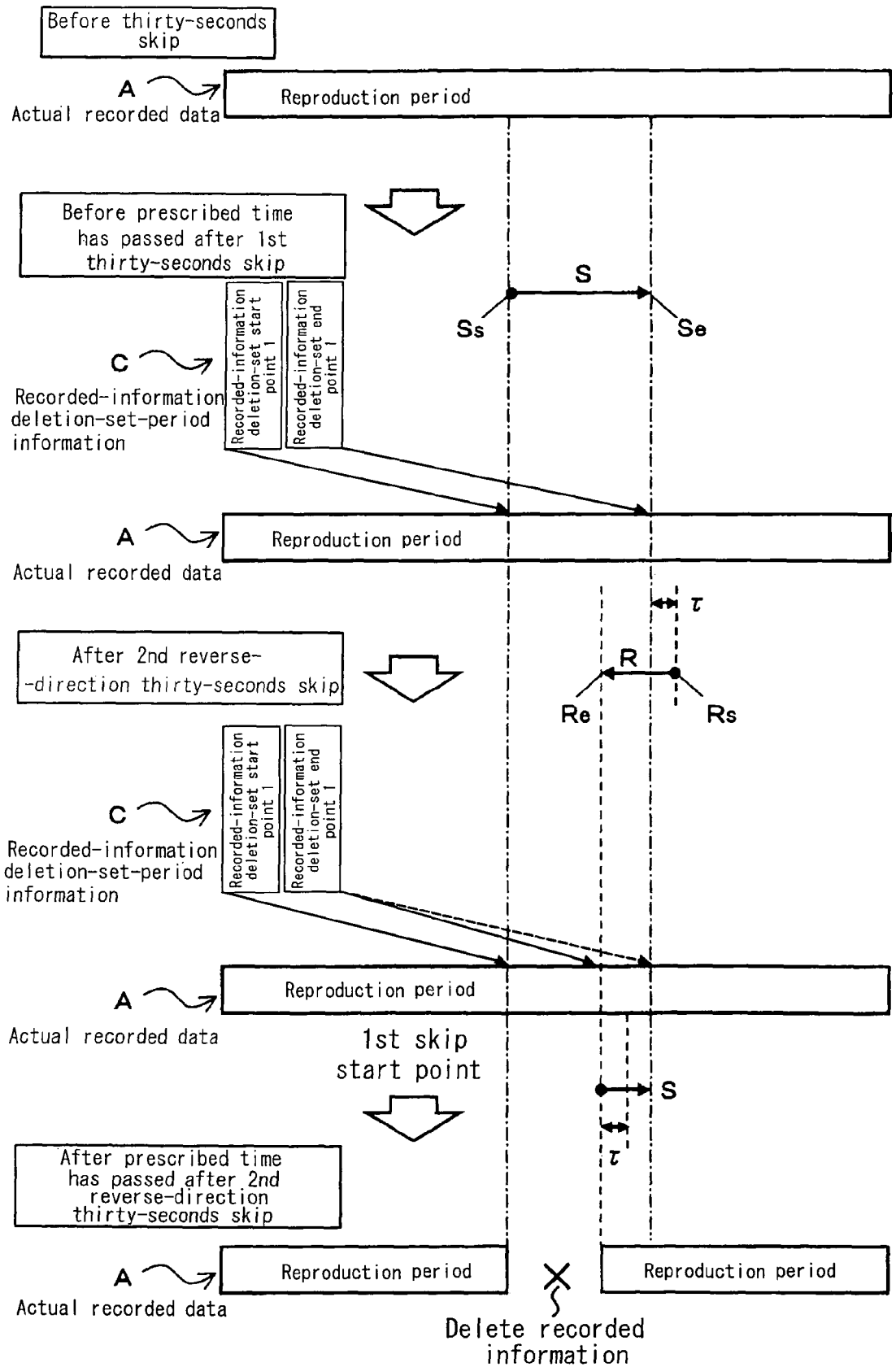
FIG. 25 is an illustration for describing an example of the action of the DVD recorder according to the eighth embodiment of the present invention.

Referring to FIG. 23-FIG. 25, there is described a control method of recording/reproducing actions performed in the information recording/reproducing apparatus (DVD recorder or the like) according to an eighth embodiment of the present invention. When it is confirmed that the thirty-seconds skip is carried out and reverse-direction thirty-seconds skip is successively carried out within the prescribed time τ during the video reproduction of the DVD recorder that comprises the thirty-seconds skipping device M, the recorded information editor M4, and the recording/reproducing function of the recorded-information deletion-set-period information C (Yes in step T31), searching is performed to check whether or not the recorded-information deletion-set-period information C includes the entire or a part of the period (skip period) between the first skip end point Se and the reverse-direction skip end point Re (step T32).

(8-1 Processing)
The first skip end point Se is included in a certain recorded-information deletion-set period (K+1) within the recorded-information deletion-set-period information C (Yes in step T33)
There is the reverse-direction skip end point Re in the recorded-information deletion-set period (K+1) (Yes in step T34)
The start point of the recorded-information deletion-set period (K+1) is not the same as the reverse-direction skip end point Re (Yes in step T35)

If the above-described conditions are all satisfied, the end point of the recorded-information deletion-set period (K+1) is set as the reverse-direction skip end point Re (step T39). By carrying out the reverse-direction thirty-seconds skip within the prescribed time τ after the thirty-seconds skip, the range within the reverse-direction thirty-seconds skip can be eliminated from the deletion target. FIG. 25 can be referred for describing the action thereof.

(8-2 Processing)
The first skip end point Se is included in a certain recorded-information deletion-set period (K+1) within the recorded-information deletion-set-period information C (Yes in step T33)
There is no reverse-direction skip end point Re in the recorded-information deletion-set period (K+1) (No in step T34), or even though there is the reverse-direction skip end point Re in the recorded-information deletion-set period (K+1) (Yes in step T34), the start point of the recorded-information deletion-set period (K+1) is the same as the reverse-direction skip end point Re (No in step T35)

If the above-described conditions are all satisfied, the recorded-information deletion-set period (K+1) is deleted (step T40), and the recorded-information deletion-set period (K+2) and thereafter is moved up by one as the recorded-information deletion-set period (K+1) and thereafter (step T41).

(8-3 Processing)
The first skip end point Se is not included (No in step T33)
The recorded-information deletion-set period (K+1) including the reverse-direction skip end point Re is present in the recorded-information deletion-set-period information C (Yes in step T36)
The start point of the recorded-information deletion-set period (K+1) is not the same as the reverse-direction skip end point Re (Yes in step T37)

If the above-described conditions are all satisfied, the end point of the recorded-information deletion-set period (K+1) is set as the reverse-direction skip end point Re (step T39).

(8-4 Processing)
The first skip end point Se is not included (No in step T33)
The recorded-information deletion-set period (K+1) including the reverse-direction skip end point Re is present in the recorded-information deletion-set-period information C and the start point of the recorded-information deletion-set period (K+1) is the same as the reverse-direction skip end point Re (Yes in step T36, No in step T37), or even though there is no recorded-information deletion-set period (K+1) including the reverse-direction skip end point Re present in the recorded-information deletion-set-period information C, there is the recorded-information deletion-set period (K+1) including a part of the skip period S that includes neither the first skip end point. Se nor the reverse-direction skip end point Re (No in step T36, Yes in step T38)

If the above-described conditions are all satisfied, the recorded-information deletion-set period (K+1) is deleted (step T40), and the recorded-information deletion-set period (K+2) and thereafter is moved up by one as the recorded-information deletion-set period (K+1) and thereafter (step T41).

(8-5 Processing)
The first skip end point Se is not included (No in step T33)
The recorded-information deletion-set period (K+1) including the reverse-direction skip end point Re is not present in the recorded-information deletion-set-period information C (No in step T36)
There is no recorded-information deletion-set period (K+1) including a part of the period between the first skip end point Se and the second skip end point Se (No in step T38)

If the above-described conditions are all satisfied, no processing is performed (end of processing).

After performing each of the above-described processing and the prescribed time τ has passed, the recorded information corresponding to the period registered to the recorded-information deletion-set-period information C is deleted from the actual recorded data A, and the recorded-information deletion-set-period information C is formatted.

The prescribed time τ can also be designated by the user in advance at the time of setting initial configuration other than fixing it as one-tenth of specific-time skip (thirty seconds in the embodiments) and the like.

With the embodiment, even though deletion of the skip period has been set by the specific-time skip (thirty-seconds skip), it is possible for the user to cancel the deletion of the recorded information that corresponds to the skip period from the actual recorded data by carrying out the reverse-direction specific-time skip thereafter.

Ninth Embodiment

Figure 26:
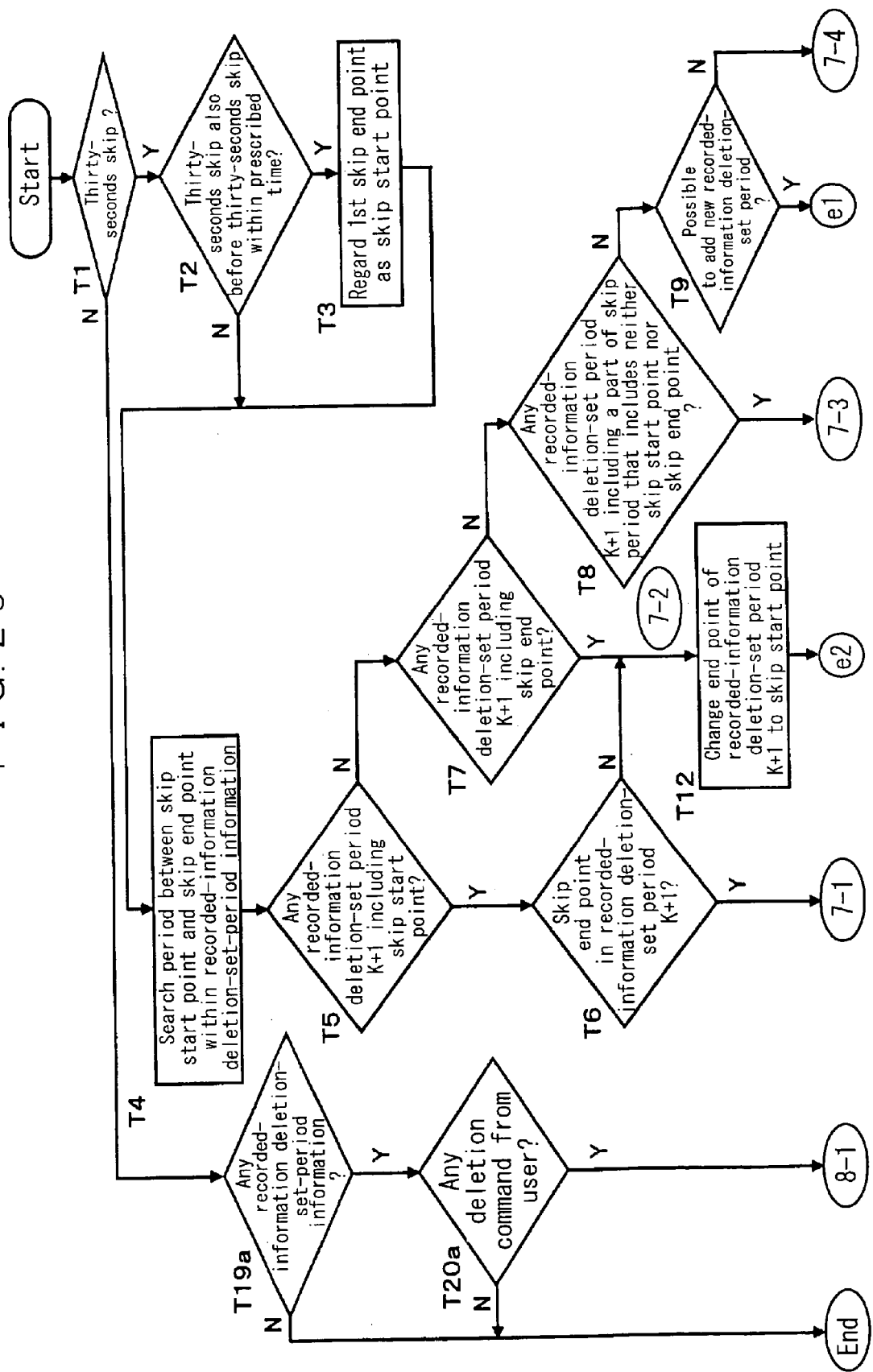
FIG. 26 is a flowchart for showing action of a DVD recorder according to a ninth embodiment of the present invention.
Figure 27:
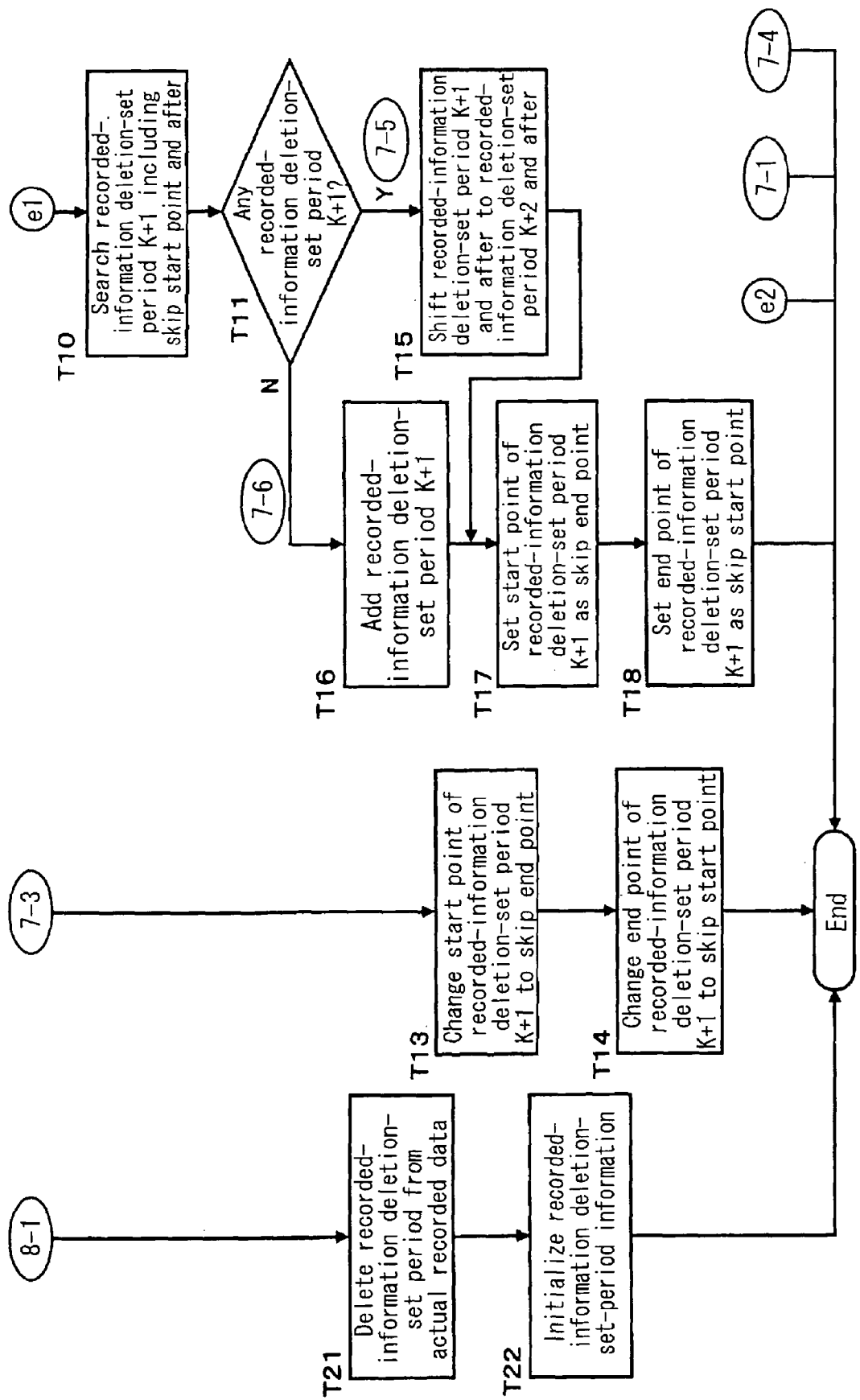
FIG. 27 is a flowchart for showing action of the DVD recorder according to the ninth embodiment of the present invention.
Figure 28:
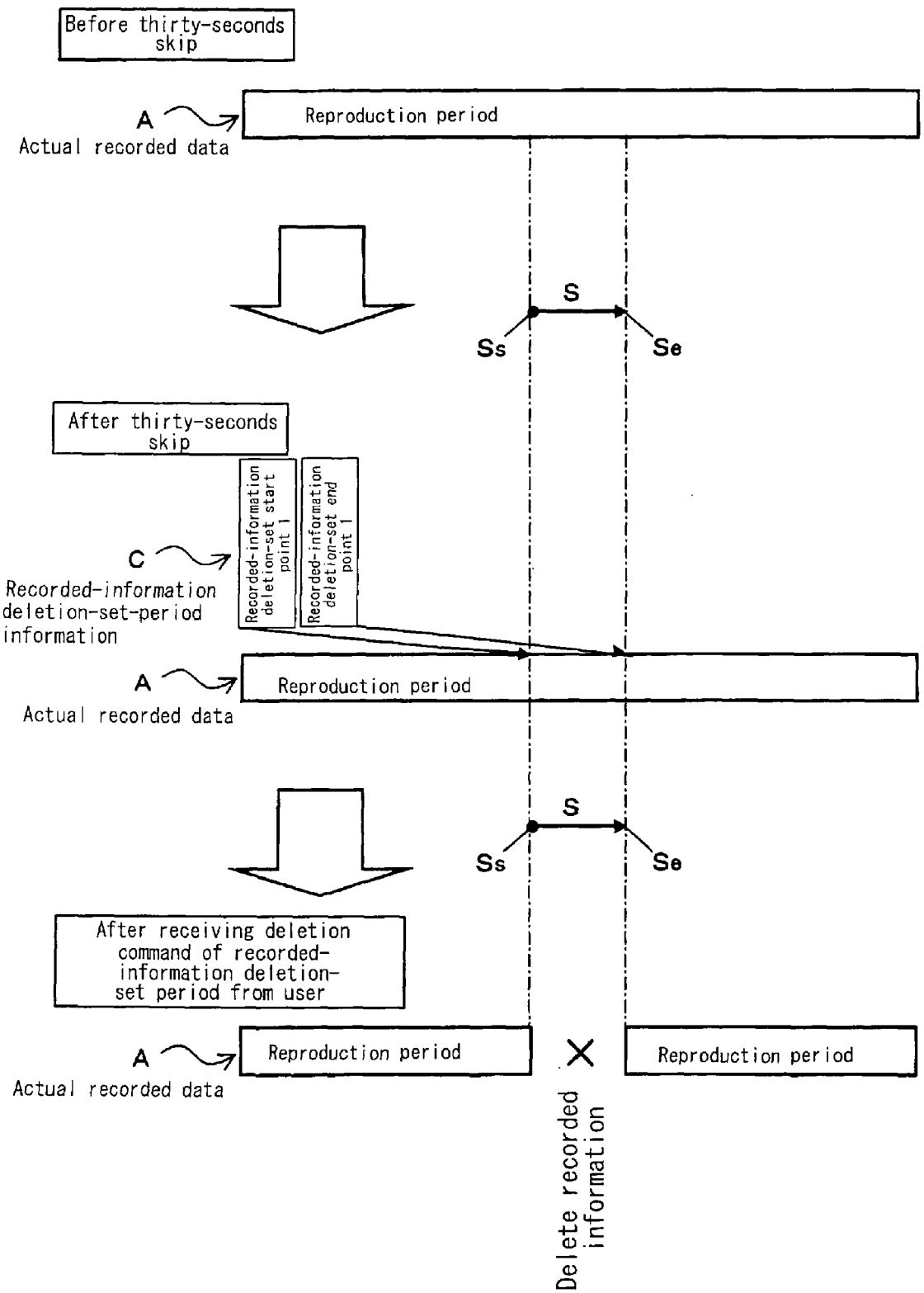
FIG. 28 is an illustration for describing an example of the action of the DVD recorder according to the ninth embodiment of the present invention.

Referring to FIG. 26-FIG. 28, there is described a control method of recording/reproducing actions performed in the information recording/reproducing apparatus (DVD recorder or the like) according to a ninth embodiment of the present invention. FIG. 26 and FIG. 27 correspond to FIG. 20 and FIG. 21 of the seventh embodiment except that steps T19a and T20a are provided in stead of the steps T19 and T20.

The processing of this embodiment is basically the same as that of the seventh embodiment, however, the processing of 7-7 in the seventh embodiment is replaced with the processing of 8-1 to be described below.

(8-1 Processing)
Presence of the recorded-information deletion-set-period information is detected for confirming that the same processing as that of the seventh embodiment has been performed (Yes in step T19)
It is checked to confirm that the user has designated deletion of the recorded information that corresponds to the recorded-information deletion-set period Ki from the actual recorded data A (Yes in step T20a)

If the above-described conditions are all satisfied, the recorded information corresponding to the recorded-information deletion-set period Ki that is registered to the recorded-information deletion-set-period information C is deleted from the actual recorded data A collectively (step T21), and the recorded-information deletion-set-period information C is formatted (step T22). The prescribed time τ is of the same concept as that of the seventh embodiment.

With the embodiment, it is possible for the user to collect the recorded-information deletion-set-period information C based on the skip information and delete the unnecessary information from the actual recorded data A collectively. Thus, it is possible to avoid accidental deletion of the skip period from the actual recorded data A to be automatically carried out while the user is not aware of it.

Tenth Embodiment

Figure 29:
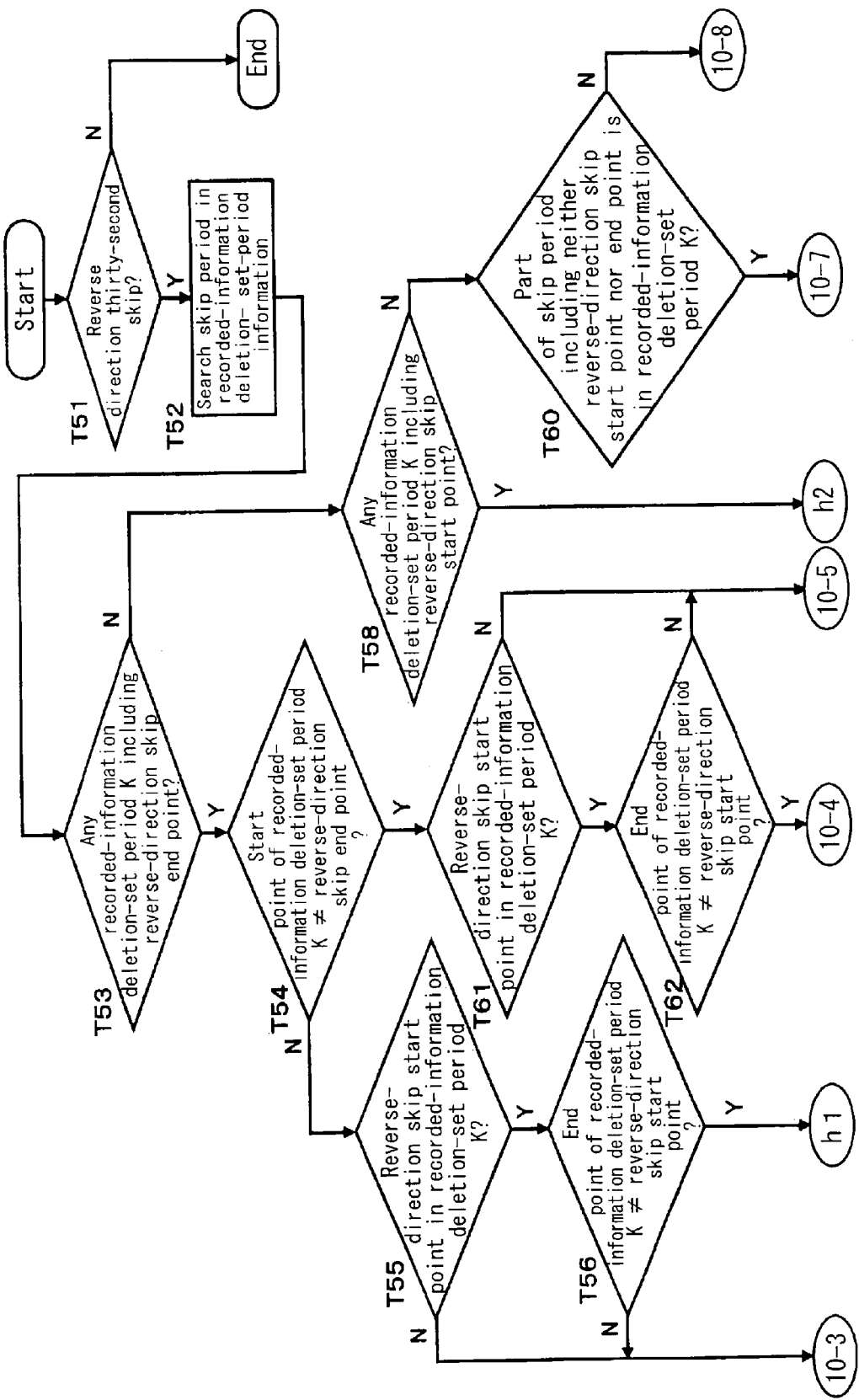
FIG. 29 is a flowchart for showing action of a DVD recorder according to a tenth embodiment of the present invention.
Figure 30:
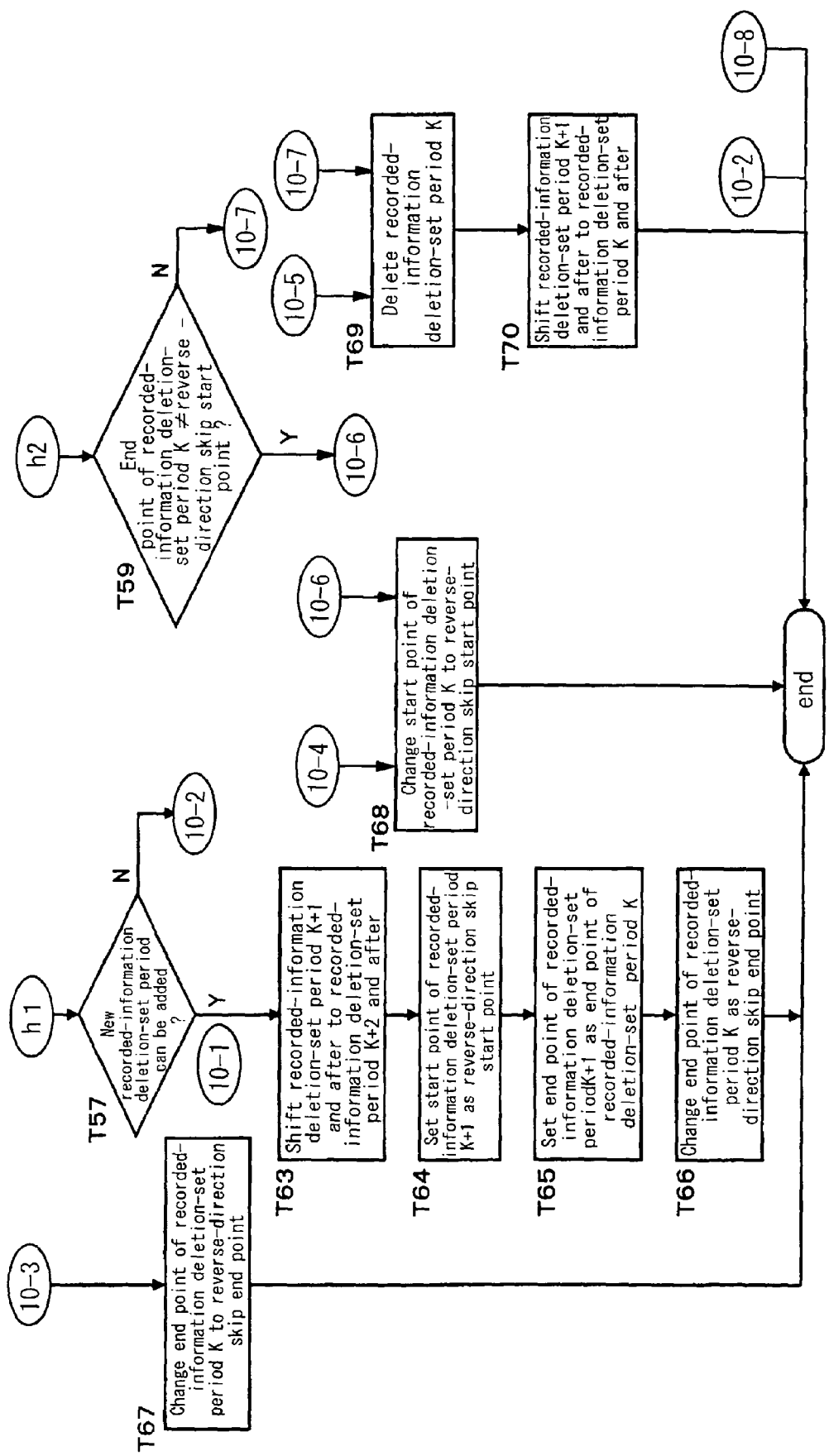
FIG. 30 is a flowchart for showing action of the DVD recorder according to the tenth embodiment of the present invention.
Figure 31:
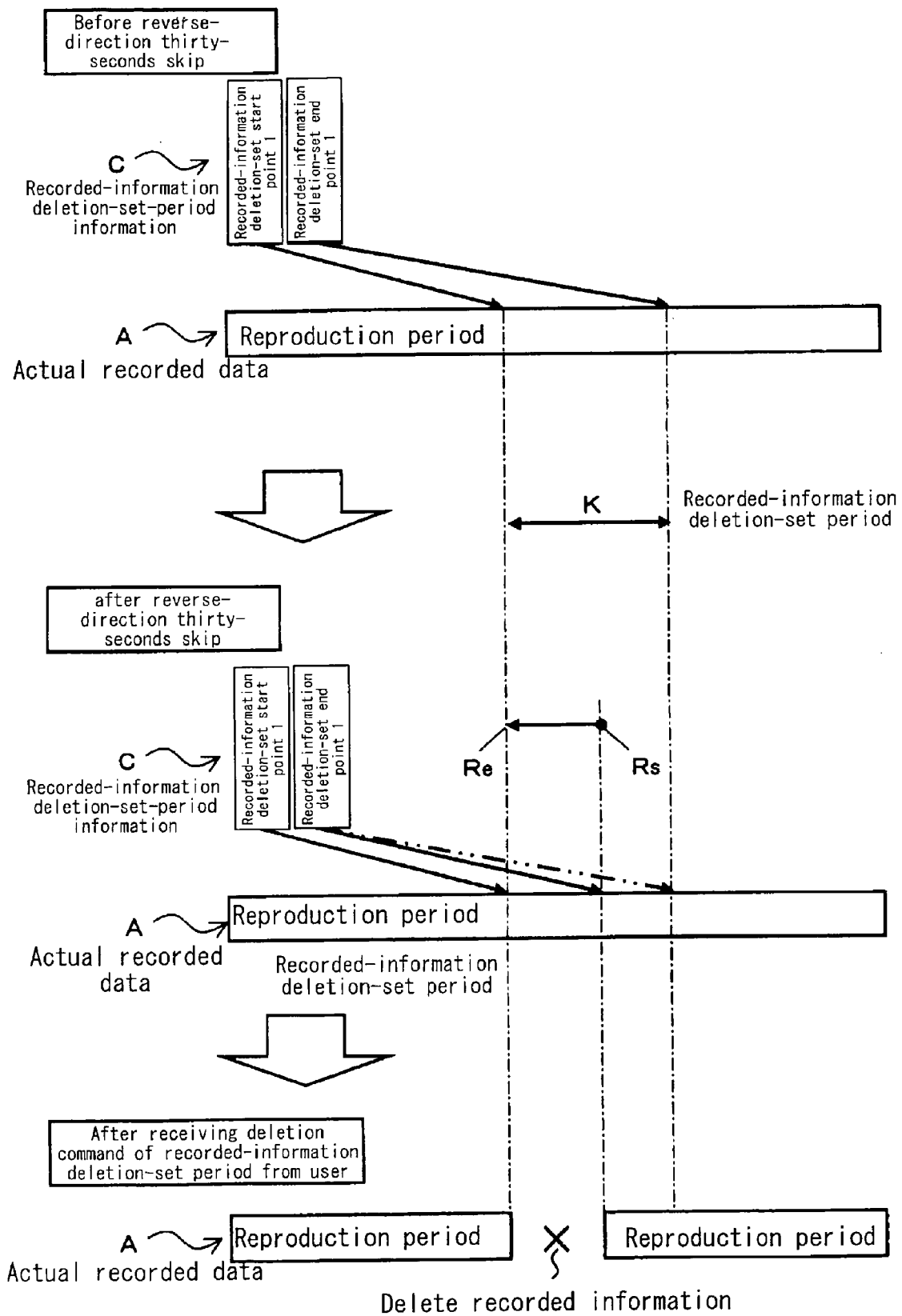
FIG. 31 is an illustration for describing an example of the action of the DVD recorder according to the tenth embodiment of the present invention.

Referring to FIG. 29-FIG. 31, there is described a control method of recording/reproducing actions performed in the information recording/reproducing apparatus (DVD recorder or the like) according to a tenth embodiment of the present invention.

During the video reproduction performed by the DVD recorder that comprises the thirty-seconds skipping device M1, the recorded information editor M4, and a recording/reproducing function of recorded-information deletion-set-period information C, first, detection processing for checking whether or not the reverse-direction thirty-seconds skip is carried out (step T51) is performed. When it is determined that the reverse-direction thirty-seconds skip has been carried out (Yes in step T51), searching processing is performed for checking whether or not the deletion-setting-period information C includes the entire or a part of the period where the reverse-direction skip is carried out (step T52). Based on the result of each processing, the following processing is performed. When it is determined that the reverse-direction thirty-seconds skip has not been carried out, the processing is ended.

(10-1 Processing)
The reverse-direction skip end point Re is included in a certain recorded-information deletion-set period K within the deletion-setting-period information C (step T52→Yes in step T53)
The start point Ks of the recorded-information deletion-set period K is not the same as the reverse-direction skip end point Re (No in step T54)
There is the reverse-direction skip start point Rs in the recorded-information deletion-set period K (Yes in step T55)
The end point Ke of the recorded-information deletion-set period K is not the same as the reverse-direction skip start point Rs (Yes in step T56)
It is possible to add a new recorded-information deletion-set period Ki to recorded-information deletion-set-period information C (Yes in step T57)

If the above-described conditions are all satisfied, each of the following processing is performed.
The recorded-information deletion-set period (K+1) and thereafter is moved down by one as the recorded-information deletion-set period (K+2) and thereafter (step T63)
The start point (K+1)s of the recorded-information deletion-set period (K+1) is set as the reverse-direction skip start point Rs (step T64)
There is formed a new recorded-information deletion-set period (K+1) having the end point Ke(K+1)e of the recorded-information deletion-set period (K+1) as the end point Ke of the recorded-information deletion-set period K (step T65)
The end point Ke of the new recorded-information deletion-set period K is set as the reverse-direction skip end point Re (step T66)

(10-2 Processing)
The reverse-direction skip end point Re is included in a recorded-information deletion-set period K within the deletion-setting-period information C (Yes in step T53)
The start point Ks of the recorded-information deletion-set period K is not the same as the reverse-direction skip end point Re (No in step T54)
There is the reverse-direction skip start point Rs in the recorded-information deletion-set period K (Yes in step T55)
The end point Ke of the recorded-information deletion-set period K is not the same as the reverse-direction skip start point Rs (Yes in step T56)
It is not possible to add a new recorded-information deletion-set period Ki to recorded-information deletion-set-period information C (No in step T57)

If the above-described conditions are all satisfied, no processing is performed (end of processing).

(10-3 Processing)
The reverse-direction skip end point Re is included in a certain recorded-information deletion-set period K within the deletion-setting-period information C (Yes in step T53)
The start point Ks of the recorded-information deletion-set period K is not the same as the reverse-direction skip end point Re (No in step T54)
There is no reverse-direction skip start point Rs in the recorded-information deletion-set period K (No in step T55), or even though there is the reverse-direction skip start point Rs in the recorded-information deletion-set period K (Yes in step T55), the end point Ke of the recorded-information deletion-set period K is the same as the reverse-direction skip start point Rs (No in step T56)

If the above-described conditions are all satisfied, the end point Ke of the recorded-information deletion-set period K is set as the reverse-direction skip end point Re (step T67)

(10-4 Processing)
The reverse-direction skip end point Re is included in a certain recorded-information deletion-set period K within the deletion-setting-period information C (Yes in step T53)
The start point Ks of the recorded-information deletion-set period K is the same as the reverse-direction skip end point Re (Yes in step T54)
There is the reverse-direction skip start point Rs in the recorded-information deletion-set period K (Yes in step T61)
The end point Ke of the recorded-information deletion-set period K is not the same as the reverse-direction skip start point Rs (Yes in step T62)

If the above-described conditions are all satisfied, the start point Ks of the recorded-information deletion-set period K is set as the reverse-direction skip start point Rs (step T68).

(10-5 Processing)
The reverse-direction skip end point Re is included in a certain recorded-information deletion-set period K within the deletion-setting-period information C (Yes in step T53)
The start point Ks of the recorded-information deletion-set period K is the same as the reverse-direction skip end point Re (Yes in step T54)
There is no reverse-direction skip start point Rs in the recorded-information deletion-set period K (No in step T61), or even though there is the reverse-direction skip start point Rs in the recorded-information deletion-set period K, the end point Ke of the recorded-information deletion-set period K is the same as the reverse-direction skip start point Rs (Yes in step T61, No in step T62)

If the above-described conditions are all satisfied, each of the following processing is performed.
The recorded-information deletion-set period K is deleted (step T69)
The recorded-information deletion-set period (K+1) and thereafter is moved up by one as the recorded-information deletion-set period K and thereafter (step T70)

(10-6 Processing)
The reverse-direction skip end point Re is not included (No in step T53)
There is the recorded-information deletion-set period K including the reverse-direction skip start point Rs in the recorded-information deletion-set-period information C (Yes in step T58)
The end point Ke of the recorded-information deletion-set period K is not the same as the reverse-direction skip start point Rs (Yes in step T59)

If the above-described conditions are all satisfied, the start point Ks of the recorded-information deletion-set period K is set as the reverse-direction skip start point Rs (step T68).

(10-7 Processing)
The reverse-direction skip end point Re is not included (No in step T53)

The recorded-information deletion-set period K including the reverse-direction skip end point Re is present in the recorded-information deletion-set-period information C and the end point Ke of the recorded-information deletion-set period K is the same as the reverse-direction skip start point RS (Yes in step T58, No in step T59), or even though there is no recorded-information deletion-set period K including the reverse-direction skip start point Rs present in the recorded-information deletion-set-period information C, there is the recorded-information deletion-set period K including a part of the skip period S that includes neither the reverse-direction skip end point Re nor the reverse-direction skip start point Rs (No in step T58, Yes in step T60)

If the above-described conditions are all satisfied, the following processing is performed.

The recorded-information deletion-set period K is deleted (step T69)

The recorded-information deletion-set period (K+1) and thereafter is moved up by one as the recorded-information deletion-set period K and thereafter (step T70).

(10-8 Processing)

The reverse-direction skip end point Re is not included (No in step T53)

There is no recorded-information deletion-set period K including the reverse-direction skip start point Rs in the recorded-information deletion-set-period information C (No in step T58)

There is no recorded-information deletion-set period K including a part of the skip period S that includes neither the reverse-direction thirty-seconds skip end point Re nor the reverse-direction thirty-seconds skip start point Rs (No in step T60)

If the above-described conditions are all satisfied, no processing is performed (end of processing).

In this embodiment, when the reverse-direction skip is carried out during the reproduction of information, the period between the end point of the reverse-direction specific-time skip (thirty-seconds skip) and the start point of the reverse-direction specific-time skip (thirty-seconds skip) out of the recorded-information deletion-set period K that is registered to the recorded-information deletion-set-period information C is deleted from the recorded-information deletion-set-period information C. Thereby, even though once registered to be set as the collective deletion target, deletion of the part the user desires to reproduce can be cancelled by the reverse-direction specific-time skip, and other unwanted part can be collectively deleted. Thus, it is possible to avoid deletion of the recorded information the user originally desires to reproduce only because it is in the period where the reverse-direction skip has been carried out.

Eleventh Embodiment

Figure 32:
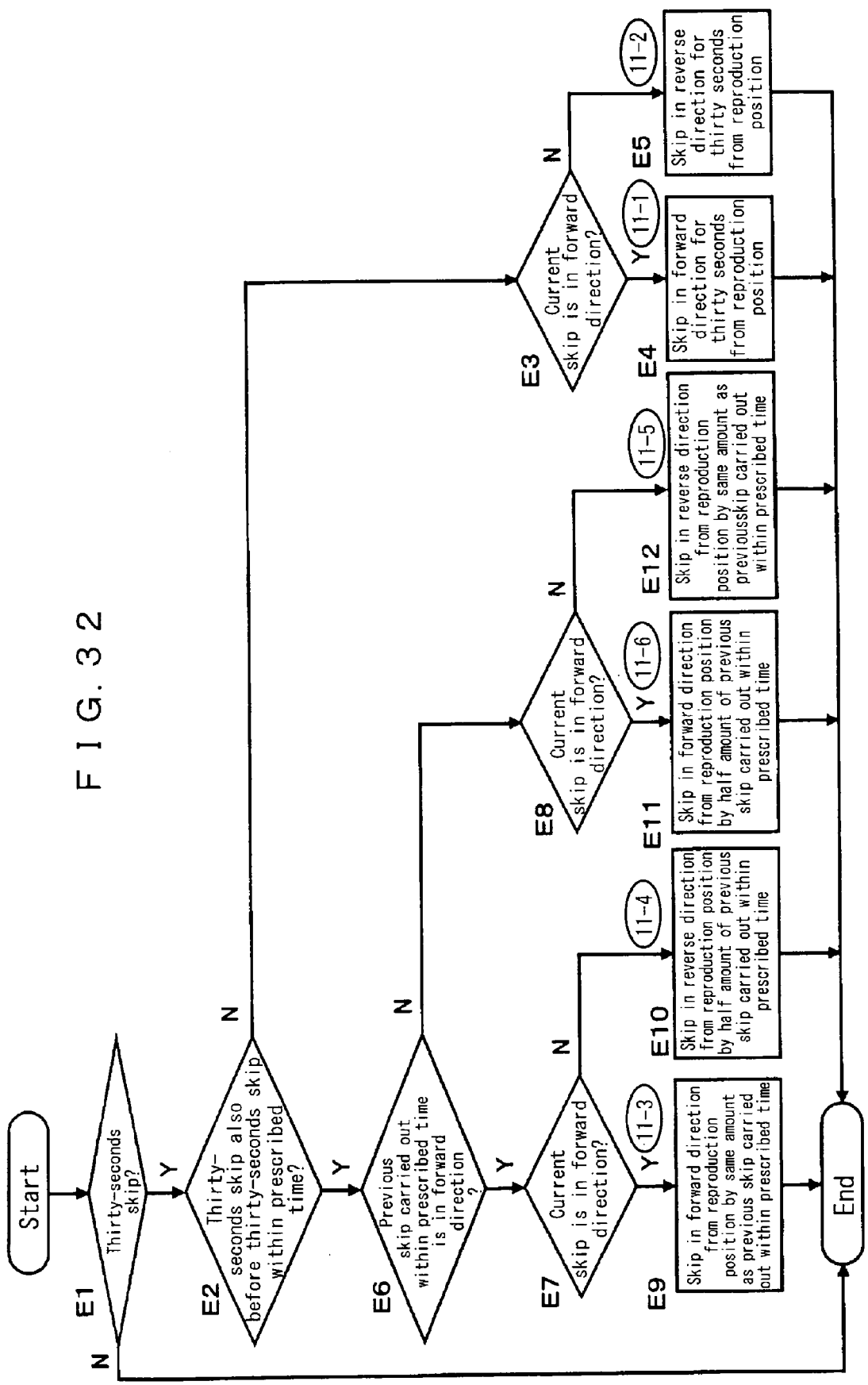
FIG. 32 is a flowchart for showing action of a DVD recorder according to an eleventh embodiment of the present invention.
Figure 33:
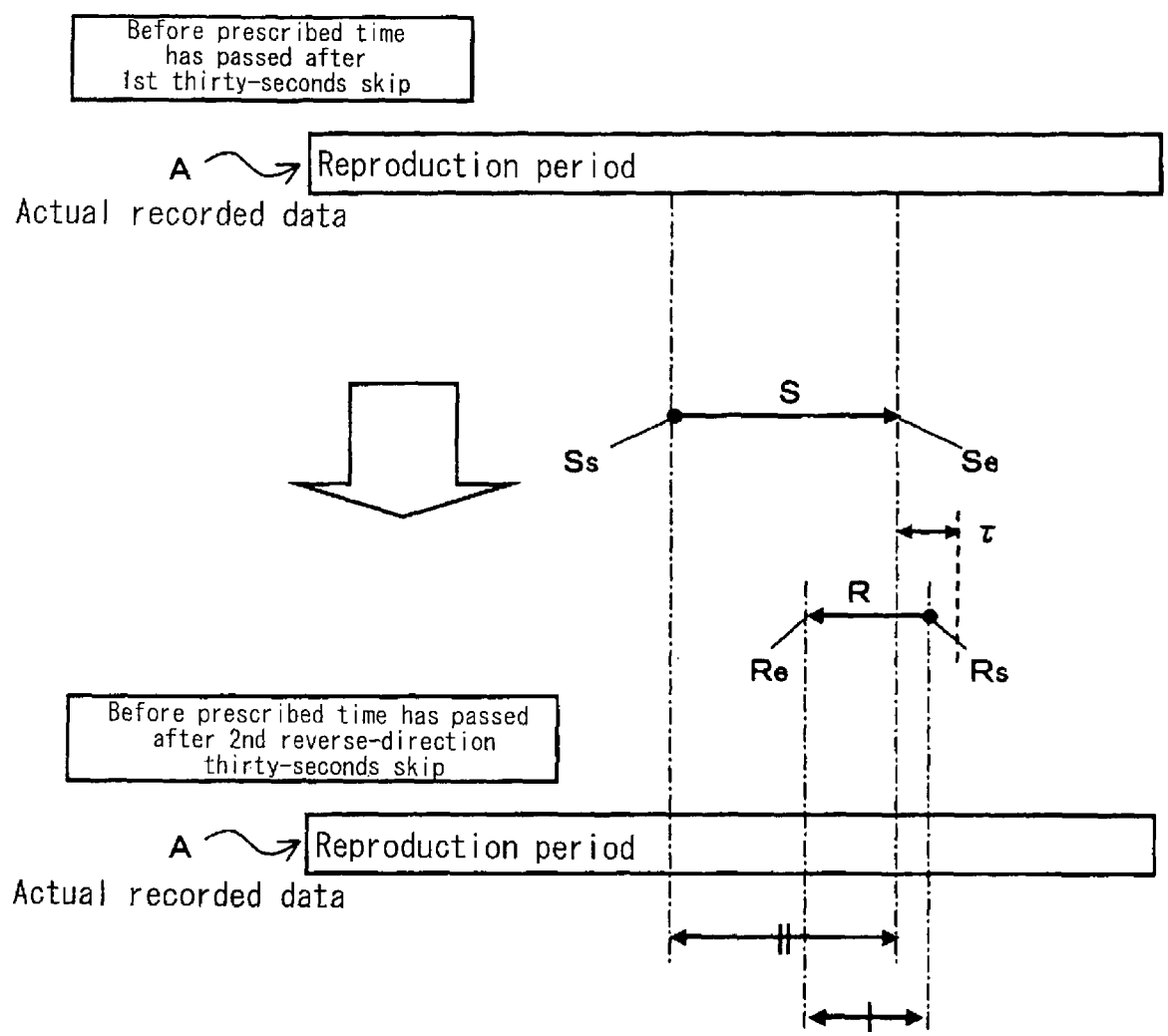
FIG. 33 is an illustration for describing an example of the action of the DVD recorder according to the eleventh embodiment of the present invention.

Referring to FIG. 32 and FIG. 33, there is described a control method of recording/reproducing actions performed in the information recording/reproducing apparatus (DVD recorder or the like) according to an eleventh embodiment of the present invention. The information recording/reproducing apparatus of the embodiment comprises the thirty-seconds skipping device M1.

(11-1 Processing)

The detected thirty-seconds skip is the first skip (Yes in step E1, No in step E2)

The thirty-seconds skip is the forward-direction skip (Yes in step E3)

If the above-described conditions are all satisfied, forward-direction skip is carried out for thirty seconds from the reproduction position (step E4).

(11-2 Processing)

The detected thirty-seconds skip is the first skip (Yes in step E1, No in step E2)

The thirty-seconds skip is not the forward-direction skip (reverse-direction skip, No in step E3)

If the above-described conditions are all satisfied, reverse-direction skip is carried out for thirty seconds from the reproduction position (step E5).

(11-3 Processing)

Thirty-seconds skip is carried out (Yes in step E1)

After the thirty-seconds skip is carried out, next thirty-seconds skip is successively carried out within the prescribed time τ (Yes in step E2)

The first thirty-seconds skip is in the forward direction (Yes in step E6)

The second thirty-seconds skip is in the forward direction (Yes in step E7)

If the above-described conditions are all satisfied, skip is carried out having the second thirty-seconds skip end point Se set as thirty-seconds later from the start point Ss of the second thirty-seconds skip (step E9).

(11-4 Processing)

Thirty-seconds skip is carried out (Yes in step E1)

After the thirty-seconds skip is carried out, next thirty-seconds skip is successively carried out within the prescribed time τ (Yes in step E2)

The first thirty-seconds skip is in the forward direction (Yes in step E6)

The second thirty-seconds skip is in the reverse direction (No in step E7)

If the above-described conditions are all satisfied, the amount of the second specific-time skip is set as a half the amount of the first specific-time skip, and the end point Se of the second thirty-seconds skip is set as fifteen seconds earlier from the start point Ss of the second thirty-seconds skip for carrying out the skip (step E10). FIG. 33 can be referred for describing the action thereof.

(11-5 Processing)

Thirty-seconds skip is carried out (Yes in step E1)

After the thirty-seconds skip is carried out, next thirty-seconds skip is successively carried out within the prescribed time τ (Yes in step E2)

The first thirty-seconds skip is in the reverse direction (No in step E6)

The second thirty-seconds skip is in the reverse direction (No in step E8)

If the above-described conditions are all satisfied, skip is carried out having the second thirty-seconds skip end point Se set as thirty-seconds earlier from the second thirty-seconds skip start point Ss (step E12).

(11-6 Processing)

Thirty-seconds skip is carried out (Yes in step E1)

After the thirty-seconds skip is carried out, next thirty-seconds skip is successively carried out within the prescribed time τ (Yes in step E2)

The first thirty-seconds skip is in the reverse direction (No in step E6)

The second thirty-seconds skip is in the forward direction (Yes in step E8)

If the above-described conditions are all satisfied, the amount of the second specific-time skip is set as a half the amount of the first specific-time skip, and the end point Se of the second thirty-seconds skip is set as fifteen seconds later from the start point Ss of the second thirty-seconds skip for carrying out the skip (step E11).

The prescribed time τ can also be designated by the user in advance at the time of performing initial configuration other than fixing it as one-tenth of specific-time skip (thirty seconds in the embodiments) and the like.

Further, in order to reduce the amount of the specific-time skip when the direction of the specific-time skip is reversed, it can also be designated by the user in advance at the time of setting initial configuration other than fixing it as one half of the specific-time amount (thirty seconds in the embodiments) and the like as shown by way of example.

With this embodiment, when the specific-time skip (thirty-seconds skip) is carried out during the information reproduction and the specific-time skip is carried out again within the prescribed time τ, the first specific-time skip amount and the second specific-time skip amount are made the same if the first and the second skip directions are in the same directions. In the meantime, the second specific-time skip amount is made less than the first specific-time skip amount if the first and the second skip directions are reversed. With this, it is possible to search the part the user originally desires to reproduce by simply repeating the specific-time skip.

Twelfth Embodiment

Figure 34:
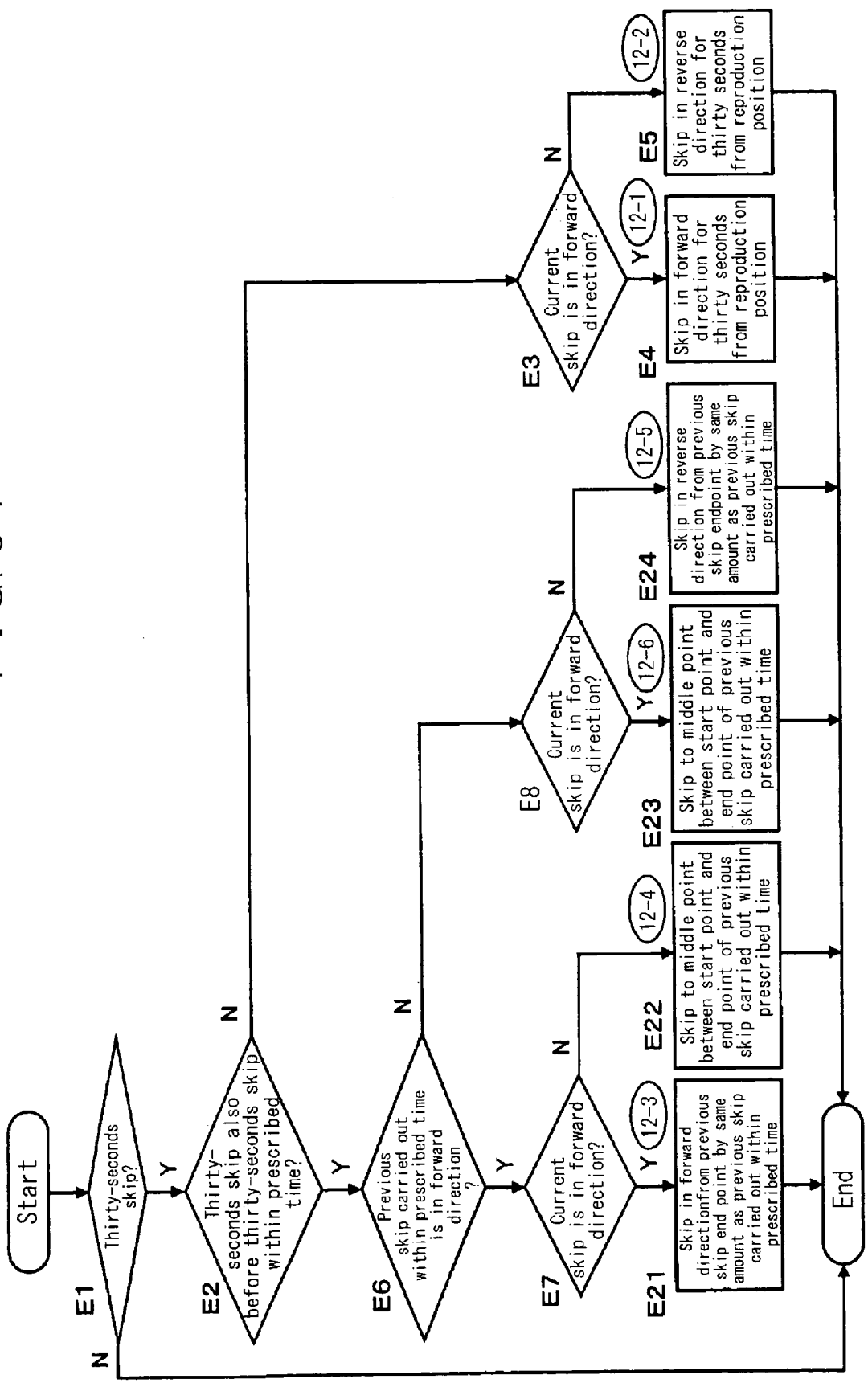
FIG. 34 is a flowchart for showing action of a DVD recorder according to a twelfth embodiment of the present invention.

Referring to FIG. 34 and FIG. 35, there is described a control method of recording/reproducing actions performed in the information recording/reproducing apparatus (DVD recorder or the like) according to a twelfth embodiment of the present invention. FIG. 34 corresponds to FIG. 32 of the eleventh embodiment except that steps E9-E12 are replaced with the steps E21-E24.

(12-1 Processing)
The detected thirty-seconds skip is the first skip (Yes in step E1, No in step E2)
The thirty-seconds skip is the forward-direction skip (Yes in step E3)

If the above-described conditions are all satisfied, forward-direction skip is carried out for thirty seconds from the reproduction position (step E4). The processing of 12-1 is the same as the processing of 11-1 described above.

(12-2 Processing)
The detected thirty-seconds skip is the first skip (Yes in step E1, No in step E2)
The thirty-seconds skip is not the forward-direction skip (No in step E3)

If the above-described conditions are all satisfied, reverse-direction skip is carried out for thirty seconds from the reproduction position (step E5). The processing of 12-2 is the same as the processing of 11-2 described above.

(12-3 Processing)
Thirty-seconds skip is carried out (Yes in step E1)
After the thirty-seconds skip is carried out, next thirty-seconds skip is successively carried out within the prescribed time τ (Yes in step E2)
The first thirty-seconds skip is in the forward direction (Yes in step E6)
The second thirty-seconds skip is in the forward direction (Yes in step E7)

If the above-described conditions are all satisfied, the first thirty-seconds skip end point Se is taken as the second thirty-seconds skip start point Ss, and skip is carried out for thirty seconds starting therefrom in the forward direction (step E21)

(12-4 Processing)
Thirty-seconds skip is carried out (Yes in step E1)
After the thirty-seconds skip is carried out, next thirty-seconds skip is successively carried out within the prescribed time τ (Yes in step E2)
The first thirty-seconds skip is in the forward direction (Yes in step E6)
The second thirty-seconds skip is in the reverse direction (No in step E7)

If the above-described conditions are all satisfied, the middle point between the first thirty-seconds skip start point Ss and the first thirty-seconds skip end point Se is taken as the second thirty-seconds skip end point Se for carrying out the skip (step E22).

(12-5 Processing)
Thirty-seconds skip is carried out (Yes in step E1)
After the thirty-seconds skip is carried out, next thirty-seconds skip is successively carried out within the prescribed time τ (Yes in step E2)
The first thirty-seconds skip is in the reverse direction (No in step E6)
The second thirty-seconds skip is in the reverse direction (No in step E8)

If the above-described conditions are all satisfied, the first thirty-seconds skip end point Se is taken as the second thirty-seconds skip start point Ss, and skip is carried out for thirty seconds starting therefrom in the reverse direction (step E24)

(12-6 Processing)
Thirty-seconds skip is carried out (Yes in step E1)
After the thirty-seconds skip is carried out, next thirty-seconds skip is successively carried out within the prescribed time τ (Yes in step E2)
The first thirty-seconds skip is in the reverse direction (No in step E6)
The second thirty-seconds skip is in the forward direction (Yes in step E8)

If the above-described conditions are all satisfied, the middle point between the first thirty-seconds skip start point Ss and the first thirty-seconds skip end point Se is taken as the second thirty-seconds skip end point Se for carrying out the skip (step E23). FIG. 35 can be referred for describing the action thereof.

The prescribed time τ can also be designated by the user in advance at the time of performing initial configuration other than fixing it as one-tenth of specific-time skip (thirty seconds in the embodiments) and the like.

Further, it is possible for the user to designate, in advance at the time of setting initial configuration, the specified point as the skipped end when the direction of the specific-time skip is reversed other than fixing it as the middle point between the start point Ss and the end point Se of the first specific-time skip as shown by way of example.

With this embodiment, when the specific-time skip (thirty-seconds skip) is carried out during the information reproduction and the specific-time skip is carried out again in the reverse direction within the prescribed time τ, the second specific-time skip end point is set as a specified point between the first specific-time skip start point and the first specific-time skip end point. Thereby, it becomes possible to perform more accurate search while saving the time for determining the cue of the part the user originally desires to reproduce by the second specific-time skip.

Thirteenth Embodiment

Figure 36:
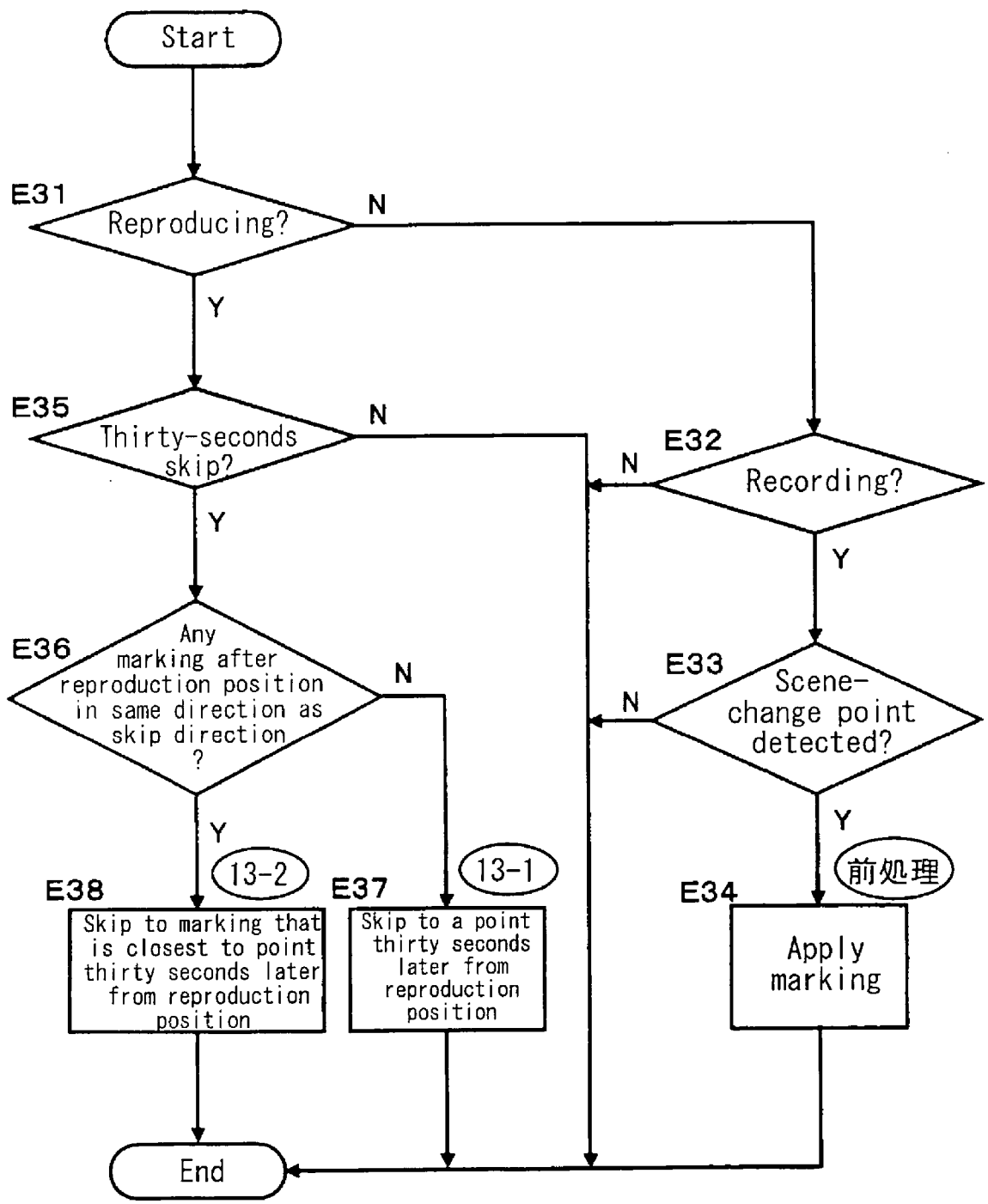
FIG. 36 is a flowchart for showing action of a DVD recorder according to a thirteenth embodiment of the present invention.

Referring to FIG. 36 and FIG. 37, there is described a control method of recording/reproducing actions performed in the information recording/reproducing apparatus (DVD recorder or the like) according to a thirteenth embodiment of the present invention. The DVD recorder according to this embodiment comprises: the thirty-seconds skipping device M1; a scene-change detector M5 for detecting scene-change section at the time of recording video; a marker M6 for applying marking to a specific point; and a marking searcher M7 for searching the marked point.

(Pre-processing)
It is in the process of recording video (No in step E31, Yes in step E32)
It is at a scene-change point (Yes in step E33)

If the above-described conditions are all satisfied, processing of marking the scene-change point is performed as the pre-processing of various processing described below (step E34).

(13-1 processing)
Thirty-seconds skip is carried out during video reproduction (Yes in step E31, Yes in step E35)
There is no marking after the currently reproduced part in the same direction as that of the skip (No in step E36)

If the above-described conditions are all satisfied, it is skipped to the point that is thirty seconds later from the currently reproduced part (step E37).

(13-2 Processing)
Thirty-seconds skip is carried out during video reproduction (Yes in step E31, Yes in step E35)
There is marking after the currently reproduced part in the same direction as that of the skip (No in step E36)

If the above-described conditions are all satisfied, it is not skipped to the point that is thirty seconds later from the currently reproduced part but skipped to the marked point that is closest the point thirty seconds from the currently reproduced part (step E38).

In this embodiment, marking is applied to all the scene-change points detected during recording of the video. When the specific-time skip (thirty-seconds skip) is carried out during the video reproduction, it is skipped not only to the specific-time skipped point but also to the marked point that is closest to the point skipped by the specific time from the currently reproduced part. Thus, it is possible to perform accurate search of the cue of the scene-change point when the specific-time skip is performed.

Fourteenth Embodiment

Figure 38:
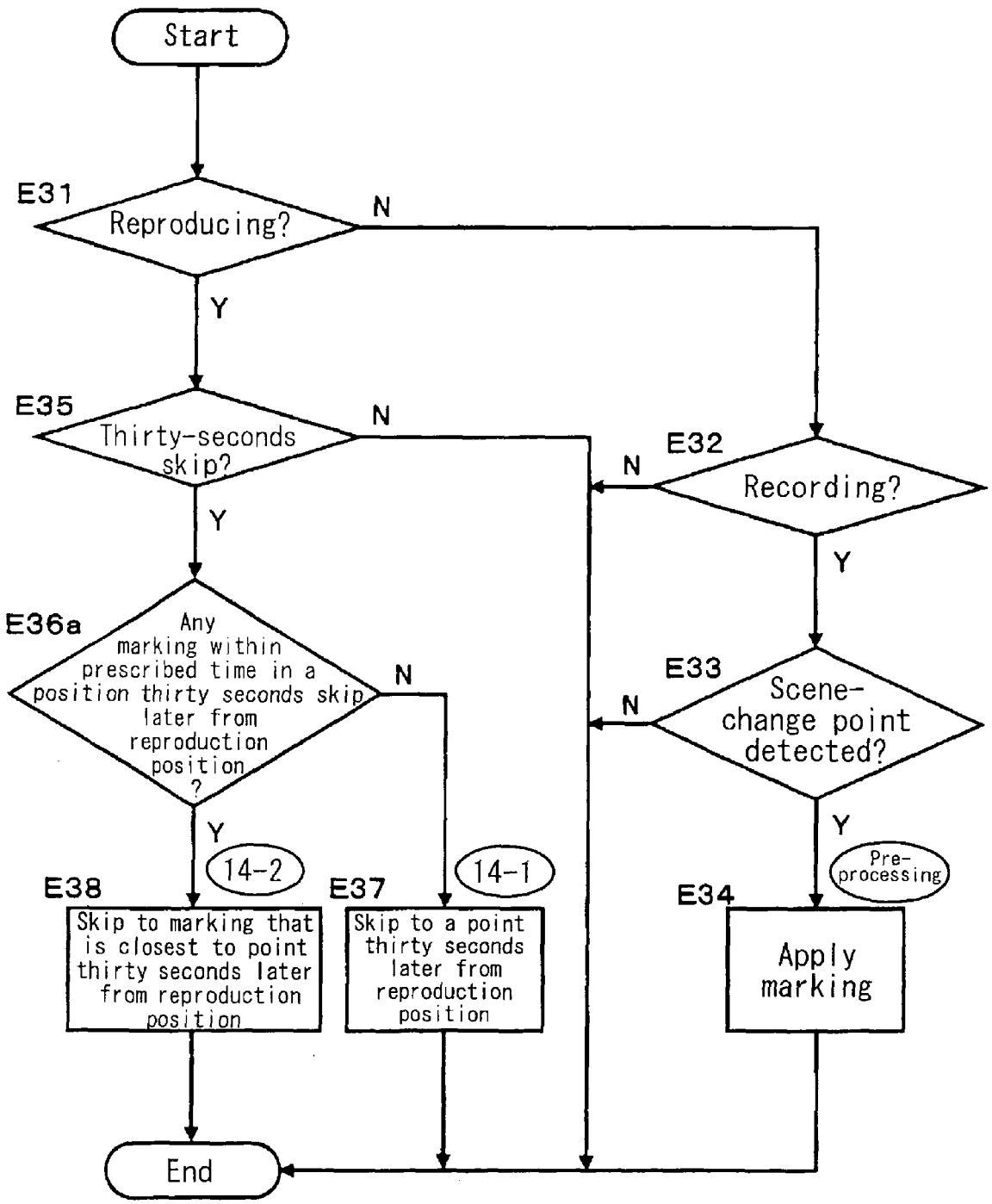
FIG. 38 is a flowchart for showing action of a DVD recorder according to a fourteenth embodiment of the present invention.
Figure 39:
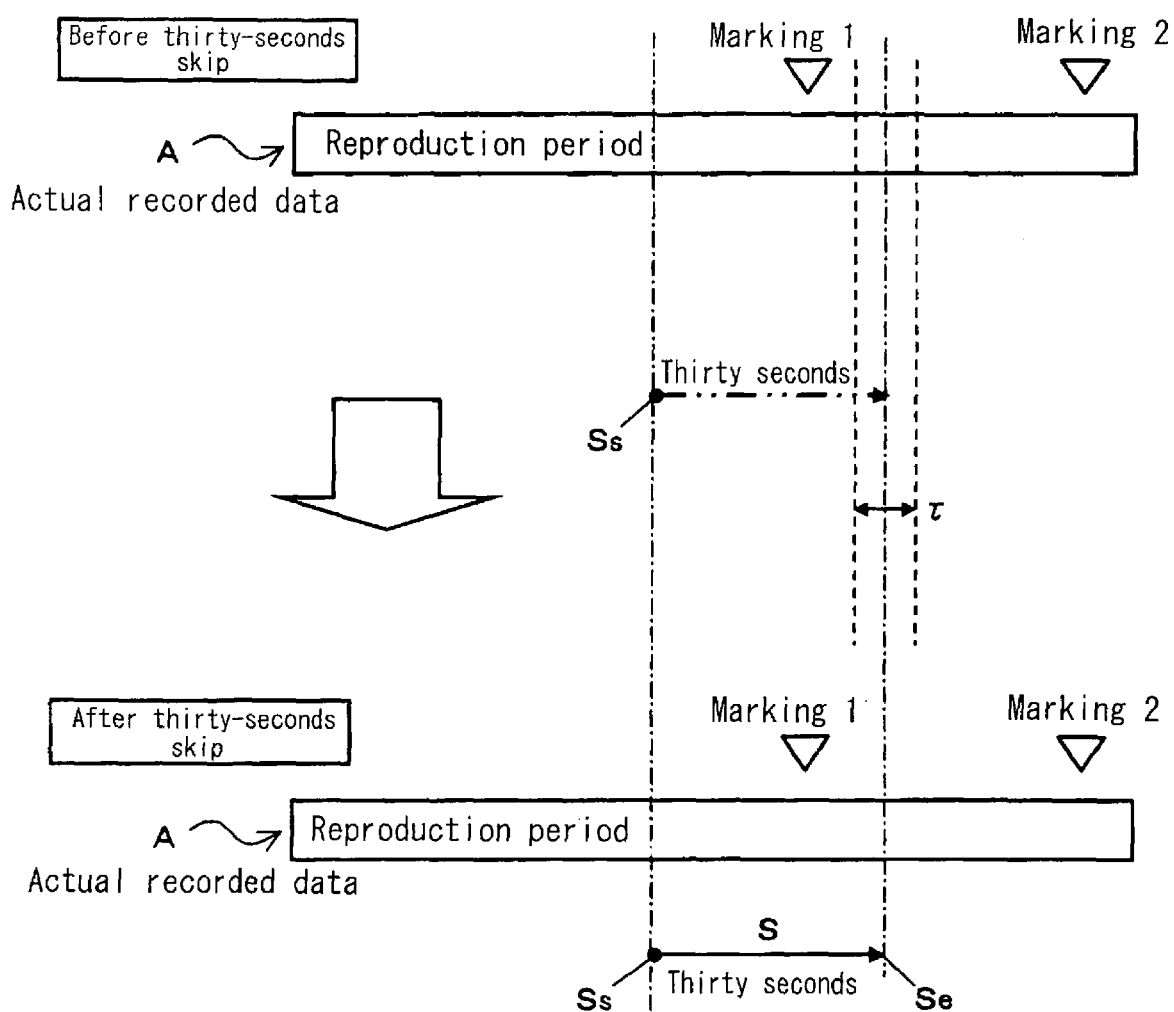
FIG. 39 is an illustration for describing an example of the action of the DVD recorder according to the fourteenth embodiment of the present invention.

Referring to FIG. 38-FIG. 40, there is described a control method of recording/reproducing actions performed in the information recording/reproducing apparatus (DVD recorder or the like) according to a fourteenth embodiment of the present invention. FIG. 38 corresponds to FIG. 36 of the thirteenth embodiment except that step E36 is replaced with step E36a.

The DVD recorder according to the embodiment has the same structural elements as those of the thirteenth embodiment. The pre-processing of this embodiment is the same as that of the thirteenth embodiment.

(14-1 Processing)
Thirty-seconds skip is carried out during video reproduction (Yes in step E31, Yes in step E35)
There is no marked point within the prescribed time τ of the point that is thirty seconds from the currently reproduced part (No in step E36a)

If the above-described conditions are all satisfied, it is skipped to the point that is thirty seconds later from the currently reproduced part (step E37). FIG. 39 can be referred for describing the action thereof.

(14-2 Processing)
Thirty-seconds skip is carried out during video reproduction (Yes in step E31, Yes in step E35)
There is the marked point within the prescribed time τ of the point that is thirty seconds from the currently reproduced part (Yes in step E36a)

If the above-described conditions are all satisfied, it is not skipped to the point that is thirty seconds later from the currently reproduced part but skipped to the marked point that is closest to the point thirty seconds from the currently reproduced part (step E38). FIG. 40 can be referred for describing the action thereof.

The prescribed time τ can also be designated by the user in advance at the time of setting initial configuration other than fixing it as one-tenth of specific-time skip (thirty seconds in the embodiments) and the like.

In this embodiment, marking is applied to all the scene-change points detected during recording of the video. When the specific-time skip (thirty-seconds skip) is carried out during the video reproduction, it is skipped to the specific-time skipped point. Also, it is skipped to the marked point that is closest to the point that is specific time later from the currently reproduced part only when there is the marked point within the prescribed time τ of the point that is specific time later from the currently reproduced part. With this, it is possible to prohibit skipping to the distant point rather than to the specific-time point when carrying out the specific-time skip, while enabling an accurate search of the scene-change point.

Fifteenth Embodiment

Figure 42:
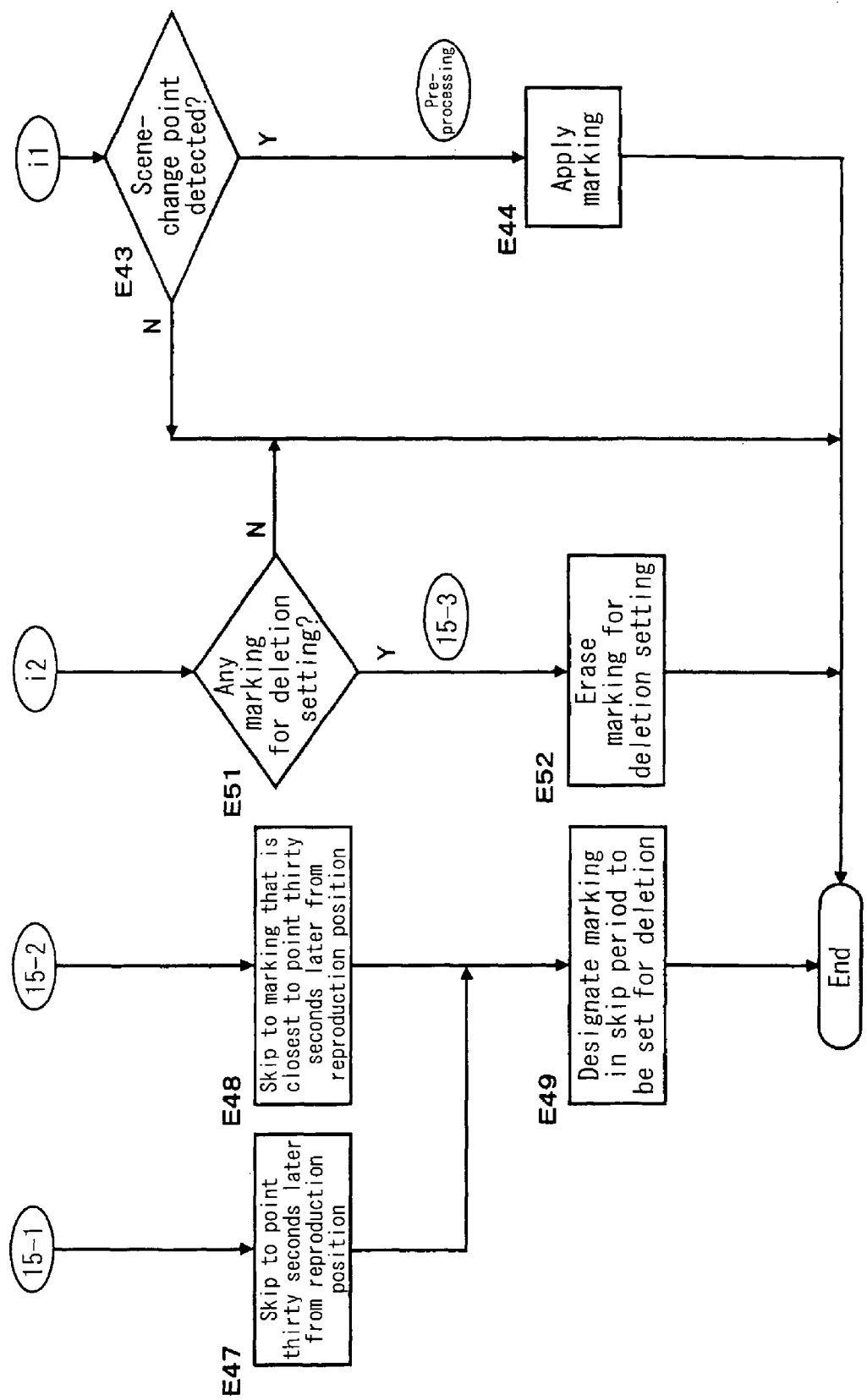
FIG. 42 is a flowchart for showing action of the DVD recorder according to the fifteenth embodiment of the present invention.

Referring to FIG. 41-FIG. 43, there is described a control method of recording/reproducing actions performed in the information recording/reproducing apparatus (DVD recorder or the like) according to a fifteenth embodiment of the present invention. The DVD recorder according to this embodiment comprises: the thirty-seconds skipping device M1; the scene-change detector M5 for detecting scene-change point at the time of recording video; a marker M6 for applying marking to a specific point; a marking searcher M7 for searching the marked point; and a marking eraser M8 for deleting the marking from the marked point.

(Pre-processing)
It is in the process of recording video (No in step E41, Yes in step E42)
The scene-change point is detected (Yes in step E43)

If the above-described conditions are all satisfied, processing of marking the scene-change point is performed as the pre-processing of various processing described below (step E44).

(15-1 Processing)
Thirty-seconds skip is carried out during video reproduction (Yes in step E41, Yes in step E45)
There is no marked point within the prescribed time τ of the skip point that is thirty seconds later from the currently reproduced part (No in step E46)

If the above-described conditions are all satisfied, it is skipped to the point that is thirty seconds later (step E47), and the marking within the skip period is designated to be set for deletion (step E48).

(15-2 Processing)

Thirty-seconds skip is carried out during video reproduction (Yes in step E41, Yes in step E45)

There is the marked point within the prescribed time τ of the skip point that is thirty seconds later from the currently reproduced part (Yes in step E46a)

If the above-described conditions are all satisfied, it is skipped to the marked point that is closest the point thirty seconds from the marked point (step E48), and the marking within the skip period is designated to be set for deletion (step E48).

(15-3 Processing)

Thirty-seconds skip is not carried out over the prescribed time τ during video reproduction (Yes in step E41, Yes in step E45, No in step E45, Yes in step E50))

There is the marking set for deletion (Yes in step E51)

If the above-described conditions are all satisfied, the marking set for deletion is canceled (step E52).

As described above, the scene-change point is marked during recording of the video, however, the marking is canceled if there is no thirty-seconds skip carried out over the prescribed time τ.

The prescribed time τ can also be designated by the user in advance at the time of setting initial configuration other than fixing it as one-tenth of specific-time skip (thirty seconds in the embodiments) and the like.

In this embodiment, when there is the specific-time skip carried out during the reproduction of information, making is deleted from the marked point within the range between the skip start point and the skip end point after the prescribed time τ. Thus, by simply carrying out the specific-time skip, it is possible to automatically cancel the marking undesired by the user among the markings that are automatically applied to the scene-change points at the time of recording the information.

Sixteenth Embodiment

Figure 45:
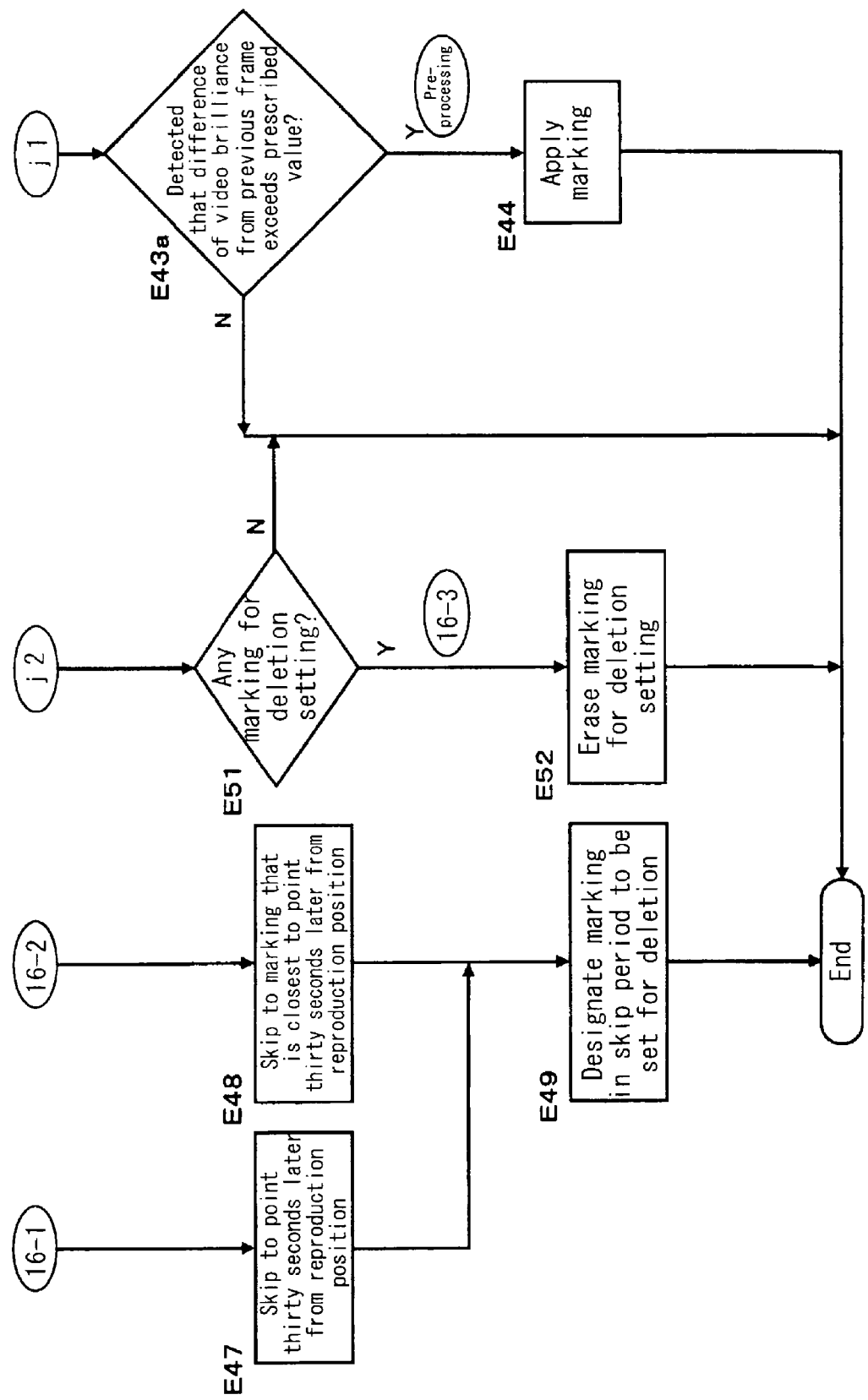
FIG. 45 is a flowchart for showing action of the DVD recorder according to the sixteenth embodiment of the present invention.

Referring to FIG. 44 and FIG. 45, there is described a control method of recording/reproducing actions performed in the information recording/reproducing apparatus (DVD recorder or the like) according to a sixteenth embodiment of the present invention. FIG. 44 corresponds to FIG. 38 of the fifteenth embodiment except that step E43 is replaced with step E43a.

The DVD recorder according to the embodiment corresponds to that of the fifteenth embodiment except that the scene-change detector M5 is replaced with a brilliance-difference judging device M9 that detects the part where the difference of the video brilliance between the previous frame exceeds a prescribed value at the time of recording the video.

(Pre-processing)

It is in the process of recording video (No in step E41, Yes in step E42)

The brilliance-difference judging device M9 detects the part where the difference of the video brilliance between the previous frame exceeds the prescribed value during recording of the video (Yes in step E43a)

If the above-described conditions are all satisfied, the part where the difference of the video brightness exceeds the prescribed value is marked as the pre-processing of various processing described below (step E44).

Other actions are the same as those of the fifteenth embodiment, so that the description thereof will be omitted. In other words, 16-1 processing, 16-2 processing, and 16-3 processing corresponds to 15-1 processing, 15-2 processing, and 15-3 processing, respectively.

In the case of recording compressed moving pictures such as MPEG (Moving Picture Experts Group), it is possible at the time of recording MPEG to detect the frame called I picture (Intra-coded picture) that requires information of other frames and to skip to the frame requiring no information of other frames, which is closest to the point thirty seconds from the currently reproduced part, by carrying out the thirty-seconds skip.

With the embodiment, it is possible to perform an accurate search of the point where the difference of the video brilliance between the previous frame exceeds the prescribed value when the specific-time skip (thirty-seconds skip) is carried out.

Seventeenth Embodiment

Figure 46:
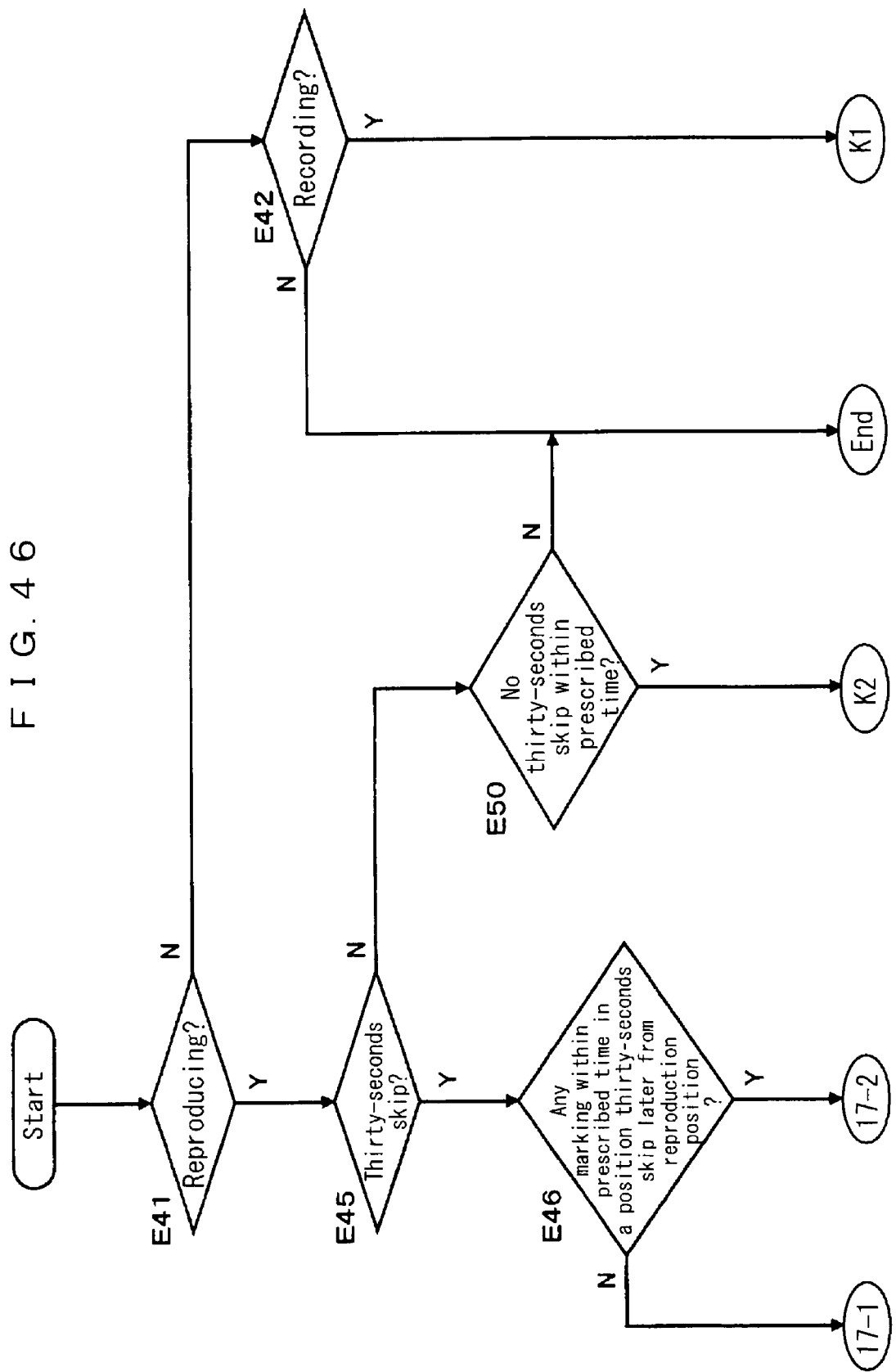
FIG. 46 is a flowchart for showing action of a DVD recorder according to a seventeenth embodiment of the present invention.
Figure 47:
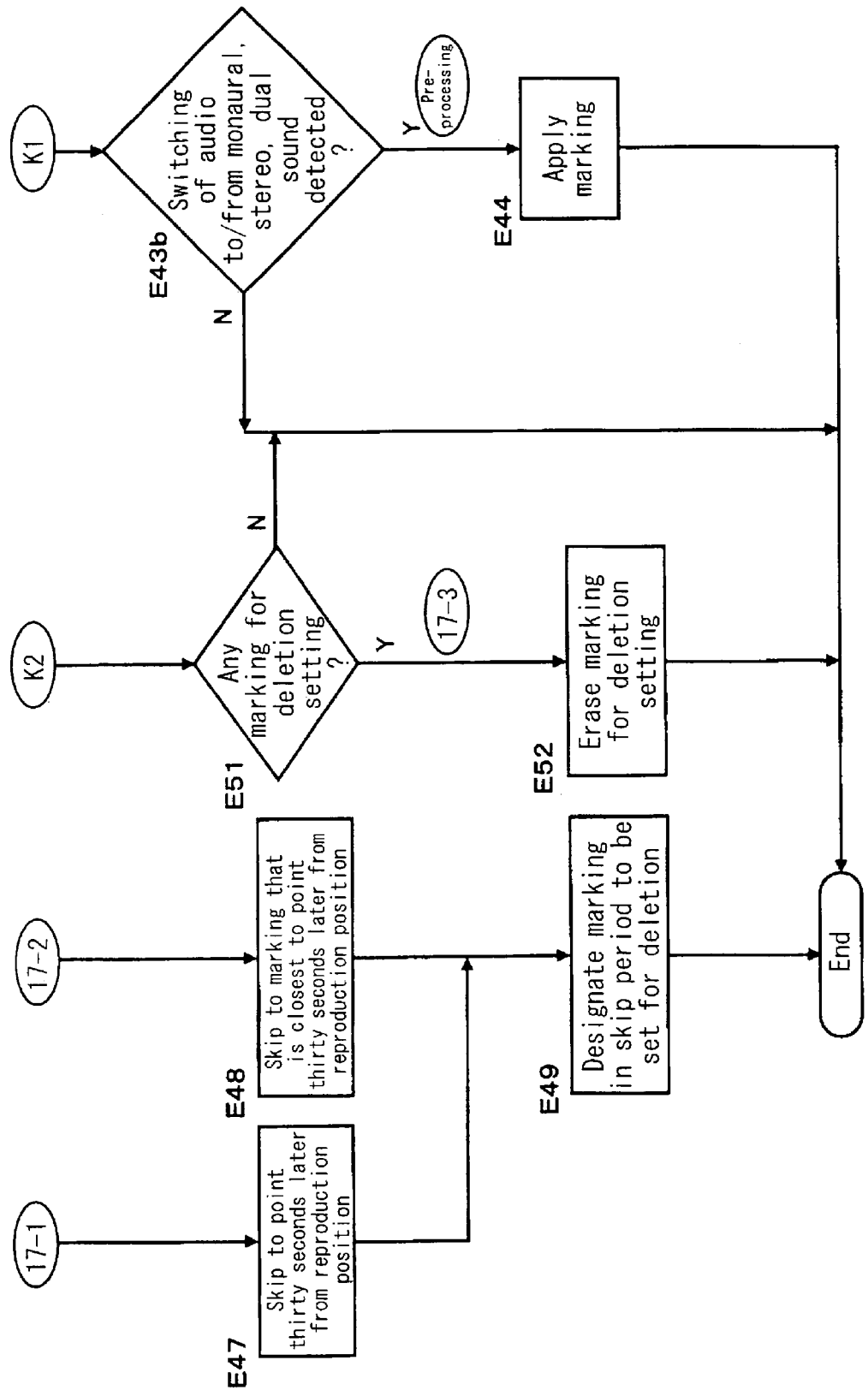
FIG. 47 is a flowchart for showing action of the DVD recorder according to the seventeenth embodiment of the present invention.

Referring to FIG. 46 and FIG. 47, there is described a control method of recording/reproducing actions performed in the information recording/reproducing apparatus (DVD recorder or the like) according to a seventeenth embodiment of the present invention. FIG. 46 corresponds to FIG. 38 of the fifteenth embodiment except that step E43 is replaced with step E43b.

The DVD recorder according to the embodiment corresponds to that of the fifteenth embodiment except that the scene-change detector M5 is replaced with an audio mode change detector M10 that detects the point where the audio signal changes from/to monaural, stereo, and dual sound at the time of recording the video.

(Pre-processing)

It is in the process of recording video (No in step E41, Yes in step E42)

There is detected the point where the audio signal changes from/to monaural, stereo, and dual sound (Yes in step Yes in step E43)

If the above-described conditions are all satisfied, the detected part where the audio signal changes from/to monaural, stereo, and dual sound is marked as the pre-processing of various processing described below (step E44).

The action thereof is the same as that of the fifteenth embodiment, so that the description will be omitted.

With the embodiment, it is possible to perform an accurate search of the change point of the audio signal from/to monaural, stereo, and dual sound when the specific-time skip (thirty-seconds skip) is carried out.

Eighteenth Embodiment

Figure 48:
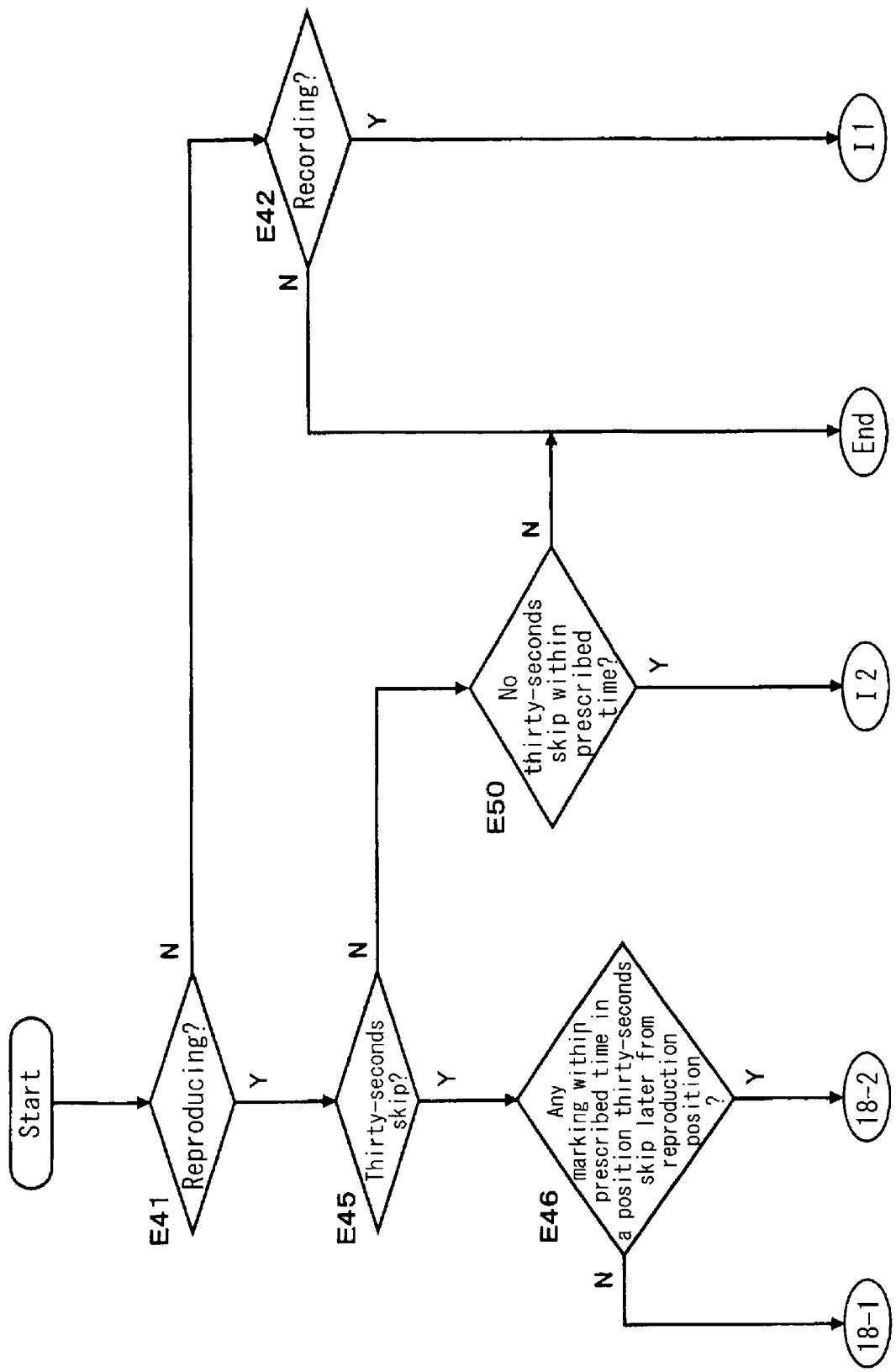
FIG. 48 is a flowchart for showing action of a DVD recorder according to an eighteenth embodiment of the present invention.
Figure 49:
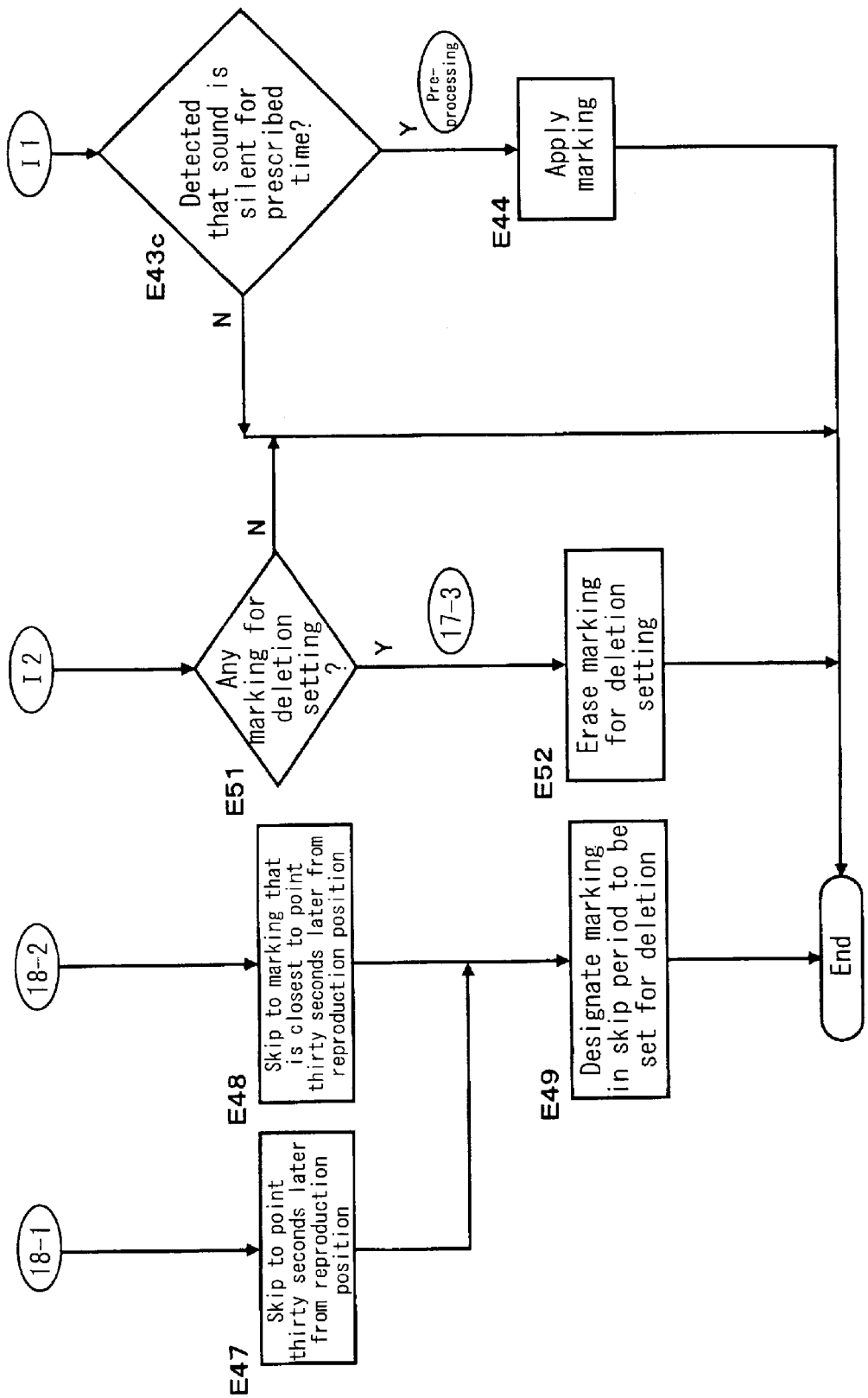
FIG. 49 is a flowchart for showing action of the DVD recorder according to the eighteenth embodiment of the present invention.

Referring to FIG. 48 and FIG. 49, there is described a control method of recording/reproducing actions performed in the information recording/reproducing apparatus (DVD recorder or the like) according to an eighteenth embodiment of the present invention. FIG. 48 corresponds to FIG. 38 of the fifteenth embodiment except that step E43 is replaced with step E43c.

The DVD recorder according to the embodiment corresponds to that of the fifteenth embodiment except that the scene-change detector M5 is replaced with a silence detector M11 that detects the part where the audio signal is silent over the prescribed time τ at the time of recording the video (Pre-processing)

It is in the process of recording video (No in step E41, Yes in step E42)

The silence detector M11 detects the part that has no sound over the prescribed time τ (Yes in step E43c)

If the above-described conditions are all satisfied, the detected part where the audio signal is silent over the prescribed time τ is marked as the pre-processing of various processing described below (step E44).

Other actions are the same as those of the fifteenth embodiment, so that the description will be omitted.

The prescribed time τ can also be designated by the user in advance at the time of performing initial configuration other than fixing it as one-tenth of specific-time skip (thirty seconds in the embodiments) and the like.

With the embodiment, it is possible to perform an accurate search of the part where the audio signal is silent over the prescribed time τ when the specific-time skip (thirty-seconds skip) is carried out.

The present invention has been described in detail by referring to the most preferred embodiments. However, various combinations and modifications of the components are possible without departing from the sprit and the broad scope of the appended claims.

What is claimed is:

1. An information recording/reproducing apparatus, comprising:
   a reproduction period list reader for reading out a reproduction period list from a recording medium;
   a specific-time skipping device that skips a reading-out position of information from said recording medium over a prescribed time; and
   a reproduction period list modifier that deletes a skip period from a reproduction period in said reproduction period list automatically, according to specific-time skip by said specific-time skipping device during reproduction of information from said recording medium, by using a skip start point and a skip end point in said reproduction period list that is read out by said reproduction period list reader when said specific-time skip is carried out by said specific-time skipping device during reproduction of information from said recording medium,
   wherein
   when said specific-time skip is carried out during reproduction of information and said specific-time skip is carried out again within a prescribed time, said reproduction period list modifier deletes second skip period and a period between an end point of first specific-time skip and a start point of second specific-time skip from said reproduction period.

2. An information recording/reproducing apparatus, comprising:
   a specific-time skipping device that skips a reading-out position of information from a recording medium over a prescribed time; and
   a recorded information editor for deleting recorded information that corresponds to recorded-information deletion-set period from said recording medium using a skip start point and a skip end point, wherein
   said recorded information editor registers a period of skip to said recorded-information deletion-set period information when specific-time skip is carried out during reproduction of information, and
   when reverse-direction skip is carried out during reproduction of information, said recorded information editor deletes, among the recorded-information deletion-set period, a period between an end point of said reverse-direction specific-time skip and a start point of said reverse-direction specific-time skip from said recorded-information deletion-set period.

3. The information recording/reproducing apparatus according to claim 2, wherein
   when said specific-time skip is carried out during reproduction of information and said specific-time skip is carried out again within a prescribed time, said recorded information editor deletes recorded information that corresponds to two skip periods and recorded information that corresponds to a period between an end point of first specific-time skip and a start point of second specific-time skip from said recording medium.

4. The information recording/reproducing apparatus according to claim 2, wherein
   said recorded information editor deletes recorded information that corresponds to the recorded-information deletion-set period from said recording medium after a prescribed time.

5. The information recording/reproducing apparatus according to claim 4, wherein
   when said specific-time skip is carried out during reproduction of information and said reverse-direction skip is carried out within a prescribed time, said recorded information editor deletes, among said recorded-information deletion-set period, the period between the end point of said reverse-direction specific-time skip and the start point of said reverse-direction specific-time skip from said recorded-information deletion-set period.

6. The information recording/reproducing apparatus according to claim 2, wherein
   said recorded information editor deletes recorded information that corresponds to recorded-information deletion-set period from said recording medium when there is a deletion command from a user.

7. An information recording/reproducing apparatus, comprising:
   an information recording/reproducing device for recording and reproducing information to/from a recording medium; and
   a specific-time skipping device that skips a reading-out position of information from said recording medium over a prescribed time, wherein
   when said specific-time skip is carried out during reproduction of information and said specific-time skip is carried out again within a prescribed time, said specific-time skipping device sets second specific-time skip amount as same as first specific-time skip amount when directions of said first skip and said second skip are in a same direction, and sets said second specific-time skip amount less than said first specific-time skip amount when directions of said first skip and said second skip are in reverse directions.

8. An information recording/reproducing apparatus, comprising:
   an information recording/reproducing device for recording and reproducing information to/from a recording medium; and
   a specific-time skipping device that skips a reading-out position of information from said recording medium over a prescribed time, wherein
   when said specific-time skip is carried out during reproduction of information and said specific-time skip is carried out again within a prescribed time, said specific-time skipping device performs specific-time skip having second specific-time skip start point as a first specific-time skip end point when directions of said first skip and said second skip are in a same direction, and skips to a specific point between first specific-time skip start point and said first specific-time skip end point when directions of said first skip and said second skip are in reverse directions.

9. An information recording/reproducing apparatus, comprising:
   a scene-change detector for detecting a scene-change point when recording video information to a recording medium;
   a marking device for marking said scene-change point detected by said scene-change detector as a marked point;
   a specific-time skipping device that skips a reading-out position of information from said recording medium over a prescribed time when reproducing information; and
   a marking searcher for searching said marked point when reproducing information, wherein
   during specific-time skip, said specific-time skipping device skips to a point that is specific-time later from a currently reproduced part when said marking searcher does not find said marked point closest to a point that is specific-time later from said currently reproduced part and, when said marking searcher finds said marked point closest to said point that is specific-time later from said currently reproduced part, said specific-time skipping device skips to said marked point.

10. The information recording/reproducing apparatus according to claim 9, further comprising a marking eraser that erases said marking from said marked point that is in a range between skip start point and skip end point after a prescribed time when said specific-time skip is carried out during reproduction of information.

11. The information recording/reproducing apparatus according to claim 9, comprising, instead of said scene-change detector, a brilliance-difference judging device for detecting a point where a difference of video brilliance from a previous frame exceeds a prescribed value when recording information.

12. The information recording/reproducing apparatus according to claim 9, comprising, instead of said scene-change detector, an audio mode switching detector for detecting a change of an audio signal from/to monaural, stereo, dual sound.

13. The information recording/reproducing apparatus according to claim 9, comprising, instead of said scene-change detector, a silence detector for detecting a part where an audio signal is silent for a prescribed time.

14. An information recording/reproducing apparatus, comprising:
   a scene-change detector for detecting a scene-change point when recording video information to a recording medium;
   a marking device for marking said scene-change point detected by said scene-change detector as a marked point;
   a specific-time skipping device that skips a reading-out position of information from said recording medium over a prescribed specific time when reproducing information; and
   a marking searcher for searching said marked point when reproducing information, wherein
   during specific-time skip, said specific-time skipping device skips to a point that is specific-time later from a currently reproduced part when said marking searcher does not find said marked point within a prescribed time of a point that is specific-time later from said currently reproduced part and, when said marking searcher finds said marked point within said prescribed time of said point that is specific-time later from said currently reproduced part, said specific-time skipping device skips to said marked point that is closest to said point that is specific-time later from said currently reproduced part.

15. The information recording/reproducing apparatus according to claim 14, further comprising a marking eraser that erases said marking from said marked point that is in a range between skip start point and skip end point after a prescribed time when said specific-time skip is carried out during reproduction of information.

16. The information recording/reproducing apparatus according to claim 14, comprising, instead of said scene-change detector, a brilliance-difference judging device for detecting a point where a difference of video brilliance from a previous frame exceeds a prescribed value when recording information.

17. The information recording/reproducing apparatus according to claim 14, comprising, instead of said scene-change detector, an audio mode switching detector for detecting a change of an audio signal from/to monaural, stereo, dual sound.

18. The information recording/reproducing apparatus according to claim 14, comprising, instead of said scene-change detector, a silence detector for detecting a part where an audio signal is silent for a prescribed time.

* * * * *